United States Patent
Zhang et al.

(10) Patent No.: US 12,489,889 B2
(45) Date of Patent: Dec. 2, 2025

(54) INTRA-PREDICTION ON NON-DYADIC BLOCKS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 9 days.

(21) Appl. No.: 18/436,146

(22) Filed: Feb. 8, 2024

(65) Prior Publication Data
US 2024/0244191 A1    Jul. 18, 2024

Related U.S. Application Data

(63) Continuation of application No. PCT/CN2022/113238, filed on Aug. 18, 2022.

(30) Foreign Application Priority Data

Aug. 18, 2021    (WO) ................ PCT/CN2021/113232

(51) Int. Cl.
*H04N 19/00*    (2014.01)
*H04N 19/11*    (2014.01)
(Continued)

(52) U.S. Cl.
CPC .......... *H04N 19/11* (2014.11); *H04N 19/159* (2014.11); *H04N 19/176* (2014.11); *H04N 19/593* (2014.11); *H04N 19/70* (2014.11)

(58) Field of Classification Search
None
See application file for complete search history.

(56) References Cited

U.S. PATENT DOCUMENTS

2017/0339404 A1* 11/2017 Panusopone ........... H04N 19/91
2017/0374369 A1* 12/2017 Chuang .................. H04N 19/70
(Continued)

FOREIGN PATENT DOCUMENTS

CN    101895739 A    11/2010
CN    102595140 A    7/2012
(Continued)

OTHER PUBLICATIONS

Document: JVET-N0217 (v2 & v3), Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.

(Continued)

*Primary Examiner* — Zhihan Zhou
(74) *Attorney, Agent, or Firm* — Conley Rose, P.C.

(57) ABSTRACT

A mechanism for processing video data implemented by a video coding apparatus is disclosed. The mechanism determines to apply template-based intra mode derivation (TIMD) to a block based on whether the block is dyadic or non-dyadic, where TMID is associated with intra prediction. A conversion between a visual media data and a bitstream is performed by applying intra prediction to the block based on TIMD.

20 Claims, 23 Drawing Sheets

(51) Int. Cl.
- *H04N 19/159* (2014.01)
- *H04N 19/176* (2014.01)
- *H04N 19/593* (2014.01)
- *H04N 19/70* (2014.01)

(56) References Cited

U.S. PATENT DOCUMENTS

| | | | |
|---|---|---|---|
| 2020/0288168 A1* | 9/2020 | Zhang | H04N 19/189 |
| 2023/0388495 A1 | 11/2023 | Zhang | |
| 2023/0396812 A1 | 12/2023 | Zhang | |
| 2024/0214569 A1* | 6/2024 | Le Leannec | H04N 19/96 |

FOREIGN PATENT DOCUMENTS

| | | |
|---|---|---|
| EP | 3443746 A1 | 2/2019 |
| WO | 2016091161 A1 | 6/2016 |

OTHER PUBLICATIONS

Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 5 pages.
Document: JVET-N0413-r1/v2, "CE8-related: Quantized residual BDPCM," Joint Video Experts Team (JVET) of ITU-T SG 16 WP 3 and ISO/IEC JTC 1/SC 29/WVG 11 14th Meeting: Geneva, CH, Mar. 19-27, 2019, 5 pages.
Document: JVET-N0413-v3 & v4 & v5 & v6, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Sullivan, G., et al., "Overview of the High Efficiency Video Coding (HEVC) Standard", IEEE Transactions on Circuits and Systems for Video Technology, vol. 22, No. 12, Dec. 2012, 20 pages.
Luthra, A., et al., "Overview of the H.264/AVC video coding standard," Proceedings of SPIE vol. 5203 Applications of Digital Image Processing XXVI, Nov. 19, 2003, 15 pages.
Document: JVET-G1001-v1, "Algorithm description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JEM-7.0, Retrieved from the internet: https://jvet.hhi.fraunhofer.de/svn/svn_HMJEMSoftware/tags/ HM-16.6-JEM-7.0, Apr. 29, 2024, 1 page.
Series H: Audiovisual and Multimedia Systems Infrastructure of audiovisual services—Coding of moving video High efficiency video coding, Recommendation ITU-T H.265, Retrieved from the internet: https://www.itu.int/rec/T-REC-H.265, Aug. 2021, 716 pages.
Document: JVET-D0117, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Document: JVET-D0117r1/v3, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Patent for binary tree, Retrieved from the internet: https://patentscope.wipo.int/search/en/detail.jsf; jsessionid=B6F96E719C3DECA6BB5B0830F82F2478.wapp1nCdocId=WO2016091161 recNum=1 maxRec= office=prevFilter= sortOption= queryString= tab=FullText#fig0004, retrieved Apr. 29, 2024, 7 pages.
Document: JVET-J1001-v1, Bross, B., et al., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 40 pages.
Document: JVET-J1001-v2, Bross, B., et al., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 40 pages.
Budagavi, M., et al., "Core Transform Design for the High Efficiency Video Coding (HEVC) Standard," IEEE Journal of Selected Topics in Signal Processing, vol. 7, No. 6, Dec. 2013, 13 pages.
Document: JVET-P0599-v1, Filippov, A., et al., "Non-CE3: Cleanup of interpolation filtering for intra prediction," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-P0599 (v3 & v4), Filippov, A., et al., "Non-CE3: Cleanup of interpolation filtering for intra prediction," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-V0098, Wang, Y., et al., "EE2-related : Template-based intra mode derivation using MPMs," Joint Video Experts Team (JVET) of ITU-T SG 16 WP 3 and ISO/IEC JTC 1/SC 29 22nd Meeting, by teleconference, Apr. 20-28, 2021, 4 pages.
Document: JVET-V0098-v2, Wang, Y., et al., "EE2-related : Template-based intra mode derivation using MPMs," Joint Video Experts Team (JVET) of ITU-T SG 16 WP 3 and ISO/IEC JTC 1/SC 29 22nd Meeting, by teleconference, Apr. 20-28, 2021, 4 pages.
International Search Report from PCT Application No. PCT/CN/2022/113238 dated Nov. 18, 2022, 9 pages.

\* cited by examiner

INTRA-PREDICTION ON NON-DYADIC BLOCKS

CROSS-REFERENCE TO RELATED APPLICATIONS

This application is a continuation of International Patent Application No. PCT/CN2022/113238, filed on Aug. 18, 2022, which claims the priority to and benefits of International Patent Application No. PCT/CN2021/113232, filed on Aug. 18, 2021. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data implemented by a video coding apparatus, comprising: determining to apply template-based intra mode derivation (TIMD) to a block based on whether the block is dyadic or non-dyadic, where TMID is associated with intra prediction; and performing a conversion between a visual media data and a bitstream by applying intra prediction to the block based on TIMD.

Optionally, in the preceding aspect, another implementation of the aspect provides that a syntax element associated with TIMD is included in the bitstream when the block is determined to be dyadic, and wherein the syntax element associated with TIMD is not included in the bitstream when the block is determined to be non-dyadic.

Optionally, in any of the preceding aspects, another implementation of the aspect provides calculating a cost in TIMD using an above template of the block and using a left template of the block, wherein the block has a width (W) and a height (H), wherein a width (W') of the above template is equal to $2^{\lfloor log_2 W \rfloor}$ or $2^{\lceil log_2 W \rceil}$, and wherein a height (H') of the left template is equal to $2^{\lfloor log_2 H \rfloor}$ or $2^{\lceil log_2 H \rceil}$.

Optionally, in any of the preceding aspects, another implementation of the aspect provides that the block has a width (W) and a height (H), wherein the block is coded based on TIMD, wherein a feature (D) of a template used in TIMD is determined based on a reduced width (W1) or a reduced height (H1) when the block or the template is determined to be non-dyadic, where W1 is less than W and H1 is less than H, and wherein the feature D is a direct current (DC) prediction value or a gradient-based value.

Optionally, in any of the preceding aspects, another implementation of the aspect provides that the block is coded based on TIMD, wherein a feature D of a template used in TIMD is determined based on a dyadic number of spatially consecutive neighboring samples when the block or the template is determined to be non-dyadic, wherein the block has a non-dyadic number of neighboring samples and the dyadic number of spatially consecutive neighboring samples is not equal to the non-dyadic number of neighboring samples, and wherein the feature D is a DC prediction value or a gradient-based value.

Optionally, in any of the preceding aspects, another implementation of the aspect provides that a first of the spatially consecutive neighboring samples is positioned at a top left corner of the block.

Optionally, in any of the preceding aspects, another implementation of the aspect provides that a first of the spatially consecutive neighboring samples is not positioned at a top left corner of the block.

Optionally, in any of the preceding aspects, another implementation of the aspect provides that the block is coded based on TIMD, wherein a feature D of a template used in TIMD is determined based on a dyadic number of spatially non-consecutive neighboring samples when the block or the template is determined to be non-dyadic.

Optionally, in any of the preceding aspects, another implementation of the aspect provides that the block has a height (H) and a width (W), wherein the block is coded according to the following when the block or a template used in TIMD is determined to be non-dyadic:

$$D = \frac{P + Q + \text{offset}}{N},$$

$$P = \sum_{k=0}^{W'-1} S(k + xCurr, yCurr - RefLy),$$

$$Q = \sum_{k=0}^{H'-1} S(xCurr - RefLx, yCurr + k), \text{ and}$$

$$N = W' + H'$$

Where D is a DC prediction value, offset is an integer value, S indicates a sample value at a corresponding location, k is a sample index, xCurr is a horizontal coordinate of a top left sample of the block, yCurr is a vertical coordinate of a top left sample of the block, RefLy indicates a reference line row, RefLx indicates a reference line column, W' is a width associated with the block, and H' is a height associated with the block, wherein H' is a dyadic height smaller than H or W' is a dyadic width smaller than W.

Optionally, in any of the preceding aspects, another implementation of the aspect provides that the block is coded based on TIMD, wherein a feature D of a template used in TIMD is determined based on a dyadic number of neighbor samples selected according to a step size function when the block or the template is determined to be non-dyadic.

Optionally, in any of the preceding aspects, another implementation of the aspect provides that the block is coded based on TIMD, wherein a feature D of a template used in TIMD is determined based on a dyadic number of above neighboring samples and a dyadic number of left neighboring samples when the block or the template is determined to be non-dyadic.

Optionally, in any of the preceding aspects, another implementation of the aspect provides that the bitstream includes a codeword indicating a wide angle intra prediction used to code the block, and wherein the codeword indicates a signaled intra prediction (sigpredMode), which can be converted to a final wide angle intra prediction (finalpredMode) when the block or the template is non-dyadic.

Optionally, in any of the preceding aspects, another implementation of the aspect provides that the finalpred- Mode is a function of sigpredMode, a width (W) of the block, and a height (H) of the block.

Optionally, in any of the preceding aspects, another implementation of the aspect provides that the finalpredMode is equal to sigpredMode plus an integer value (M) when W is greater than H and sigpredMode is less than a threshold mode (ThresMode), wherein M is based on whether TIMD is applied, or is based on a number of intra prediction modes used in TIMD.

Optionally, in any of the preceding aspects, another implementation of the aspect provides that the finalpredMode is equal to sigpredMode minus an integer value (M) when W is less than H and sigpredMode is greater than a threshold mode (ThresMode), wherein M is based on whether TIMD is applied, or is based on a number of intra prediction modes used in TIMD.

Optionally, in any of the preceding aspects, another implementation of the aspect provides that the ThresMode is an angle equal to $$\underset{\alpha}{\mathrm{argmin}}\{\tan\alpha \geq H/W\},$$

an angle equal to $$\underset{\alpha}{\mathrm{argmax}}\{\tan\alpha \leq H/W\},$$

a function of a mode difference (modeDiff) and whether TIMD is applied, a function of modeDiff and a number of intra prediction modes used in TIMD, a function of $\lfloor \log_2 W \rfloor$ and $\lfloor \log_2 H \rfloor$, a function of $\lceil \log_2 W \rceil$ and $\lceil \log_2 H \rceil$, or combinations thereof.

Optionally, in any of the preceding aspects, another implementation of the aspect provides that the block is coded according to substitution of unavailable neighboring samples in a template used in TIMD by obtaining a dyadic number of left neighboring samples when a height (H) of the block or template is non-dyadic and obtaining a dyadic number of above neighboring samples when a width (W) of the block or template is non-dyadic.

Optionally, in any of the preceding aspects, another implementation of the aspect provides that the block is coded according to cross-component linear model (CCLM) using neighboring samples in a template used in TIMD by obtaining a dyadic number of left neighboring samples when a height (H) of the block or template is non-dyadic and obtaining a dyadic number of above neighboring samples when a width (W) of the block or template is non-dyadic.

Optionally, in any of the preceding aspects, another implementation of the aspect provides that the block is coded according to a planar intra prediction mode value determined according to a division operation with a divisor based on a width (W) of a template used in TIMD and a height (H) of the template used in TIMD when the block or template is determined to be non-dyadic.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$$predV[x][y] = ((H-1-y)*p[x][-1] + (y+1)*p[-1][H])*W,$$

$$predH[x][y] = ((W-1-x)*p[-1][y] + (x+1)*p[W][-1])*H, \text{ and}$$

$$predSamples[x][y] = (predV[x][y] + predH[x][y] + W*H)/(W*H*2),$$

where H is a height of the template, W is a width of the template, (x, y) are sample coordinates, and p[ ][ ] indicates neighboring samples at a corresponding coordinate.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$$predV[x][y] = ((H-1-y)*p[x][-1] + (y+1)*p[-1][H] + H/2)/H,$$

$$predH[x][y] = ((W-1-x)*p[-1][y] + (x+1)*p[W][-1] + W/2)/W,$$

and $$predSamples[x][y] = (predV[x][y] + predH[x][y] + 1) >> 1,$$

where H is a height of the template, W is a width of the template, (x, y) are sample coordinates, >> is a right shift operator, and p[ ][ ] indicates neighboring samples at a corresponding coordinate.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$$predV[x][y] = ((H-1-y)*p[x][-1] + (y+1)*p[-1][H] + H/2)/H,$$

$$predH[x][y] = ((W-1-x)*p[-1][y] + (x+1)*p[W][-1] + W/2) >> \log2(W),$$

and $$predSamples[x][y] = (predV[x][y] + predH[x][y] + 1) >> 1,$$

where H is a height of the template, W is a width of the template, (x, y) are sample coordinates, >> is a right shift operator, log 2 is a logarithmic function, and p[ ][ ] indicates neighboring samples at a corresponding coordinate.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$$predV[x][y] = ((H-1-y)*p[x][-1] + (y+1)*p[-1][H] + H/2) >> \log2(H),$$

$$predH[x][y] = ((W-1-x)*p[-1][y] + (x+1)*p[W][-1] + W/2)/W,$$

and $$predSamples[x][y] = (predV[x][y] + predH[x][y] + 1) >> 1,$$

where H is a height of the template, W is a width of the template, (x, y) are sample coordinates, >> is a right shift operator, log 2 is a logarithmic function, and p[ ][ ] indicates neighboring samples at a corresponding coordinate.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$predV[x][y] =$ $(((1 << \lfloor Log2(H) \rfloor) - 1 - y) * p[x][-1] + (y + 1) * p[-1][H]) << \lfloor Log2(W) \rfloor,$ $predH[x][y] =$ $(((1 << \lfloor Log2(W) \rfloor) - 1 - x) * p[-1][y] + (x + 1) * p[W][-1]) << \lfloor Log2(H) \rfloor,$ and $predSamples[x][y] =$ $(predV[x][y] + predH[x][y] + (1 << \lfloor Log2(W) \rfloor) * ((1 << \lfloor Log2(H) \rfloor)) >>$ $(\lfloor Log2(W) \rfloor + \lfloor Log2(H) \rfloor + 1),$ where H is a height of the template, W is a width of the template, (x, y) are sample coordinates, >> is a right shift operator, << is a left shift operators, log 2 is a logarithmic function, p[ ][ ] indicates neighboring samples at a corresponding coordinate, and $\lfloor \rfloor$ is a floor function.

Optionally, in any of the preceding aspects, another implementation of the aspect provides that when the block being coded or the template used in TIMD is determined to be non-dyadic, the block is coded according to prediction sample values at a positions (x, y) (predSamples[x][y]) derived according to:

$predV[x][y] =$ $(((1 << \lceil Log2(H) \rceil) - 1 - y) * p[x][-1] + (y + 1) * p[-1][H]) << \lceil Log2(W) \rceil,$ $predH[x][y] =$ $(((1 << \lceil Log2(W) \rceil) - 1 - x) * p[-1][y] + (x + 1) * p[W][-1]) << \lceil Log2(H) \rceil,$ and $predSamples[x][y] =$ $(predV[x][y] + predH[x][y] + (1 << \lceil Log2(W) \rceil) * ((1 << \lceil Log2(H) \rceil)) >>$ $(\lceil Log2(W) \rceil + \lceil Log2(H) \rceil + 1),$ where H is a height of the template, W is a width of the template, (x, y) are sample coordinates, >> is a right shift operator, << is a left shift operators, log 2 is a logarithmic function, p[ ][ ] indicates neighboring samples at a corresponding coordinate, and $\lceil \rceil$ is a ceiling function.

Optionally, in any of the preceding aspects, another implementation of the aspect provides that the TIMD includes a TIMD mode derived from a plurality of most probable modes based on a neighboring template of the block, where the derived TIMD mode is used to predict the block according to intra prediction.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

A fourth aspect relates to a non-transitory computer readable medium storing a bitstream of a video that is generated by the method of any of the preceding aspects, including a method performed by a video processing apparatus.

A fifth aspect relates to a method for storing a bitstream of a video that is generated by the method of any of the preceding aspects, including a method performed by a video processing apparatus.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure is related to image/video coding, and more particularly to intra-coding on some special kinds of blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
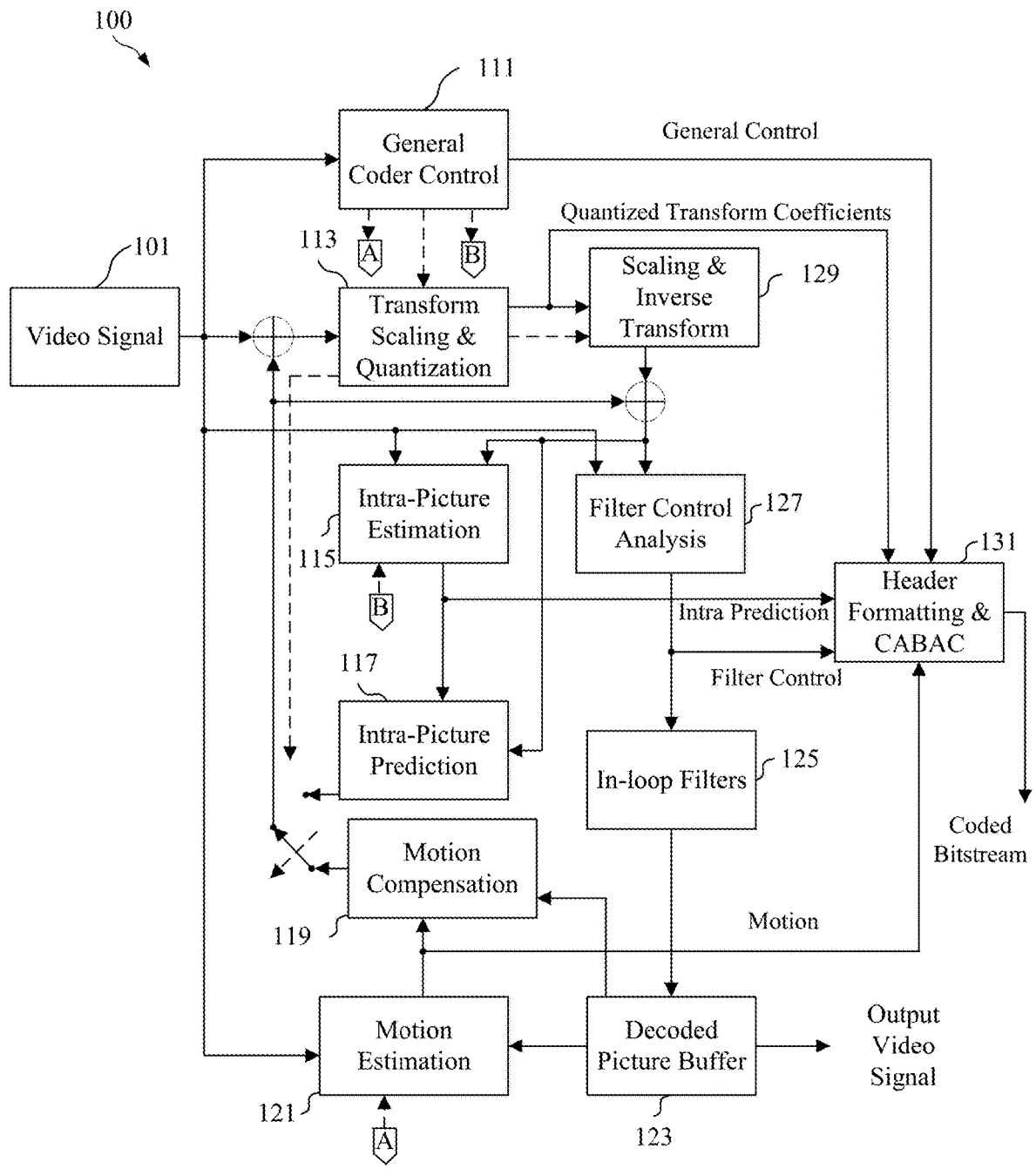
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a coding tree unit (CTU) that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter prediction. A video unit (e.g., a picture, a slice, a CTU, etc.) of the video signal 101 may be divided into multiple blocks. Motion estimation component 121 and the motion compensation component 119 perform inter predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, a video codec, such as codec 100, may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a sample adaptive offset (SAO) filter, and an adaptive loop filter (ALF). Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 2:
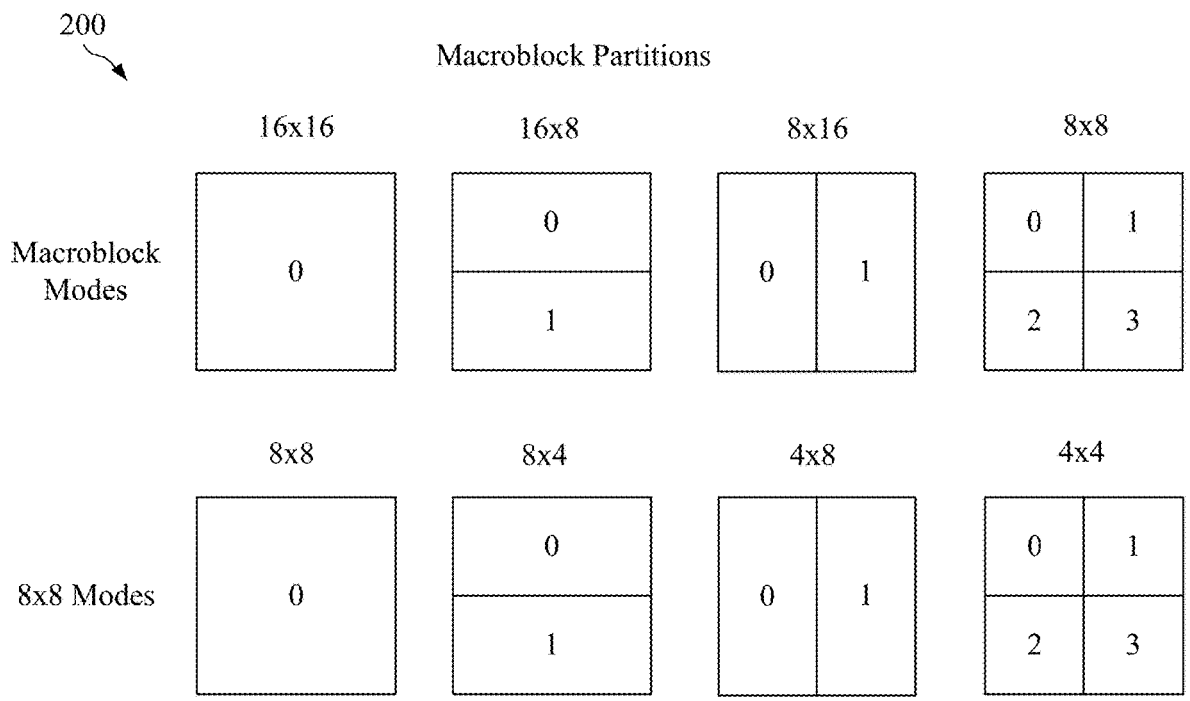
FIG. 2 is a schematic diagram of example macroblock partitions.

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A sample is a luma (light) value or chroma (color) value at a pixel.

Figure 3:
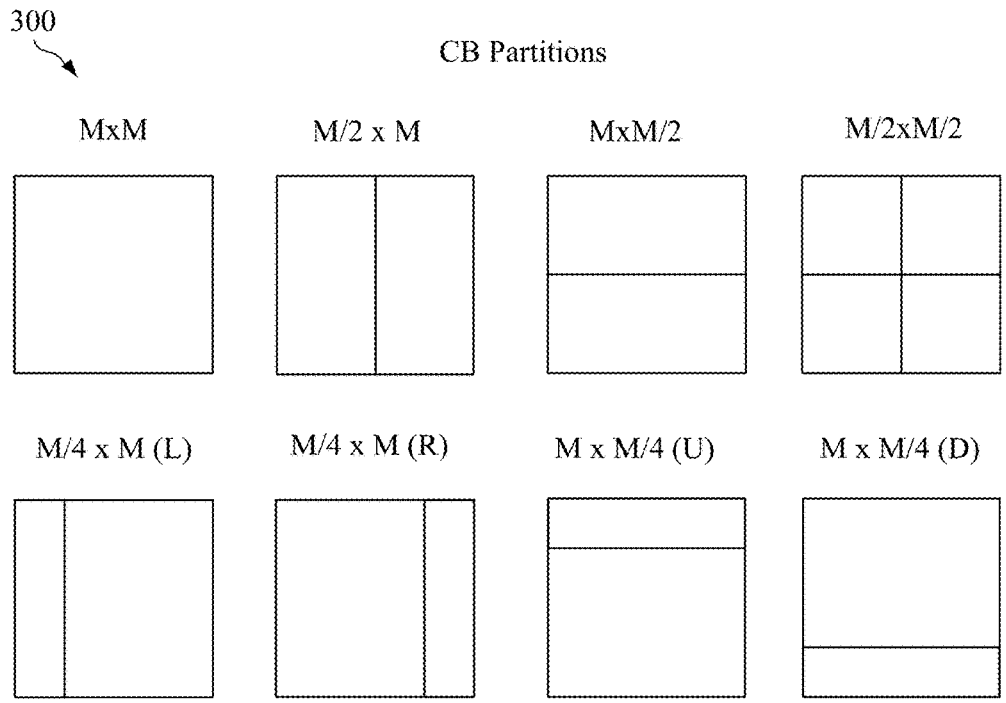
FIG. 3 is a schematic diagram of example modes for partitioning coding blocks, for example according to High Efficiency Video Coding (HEVC).

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figure 4:
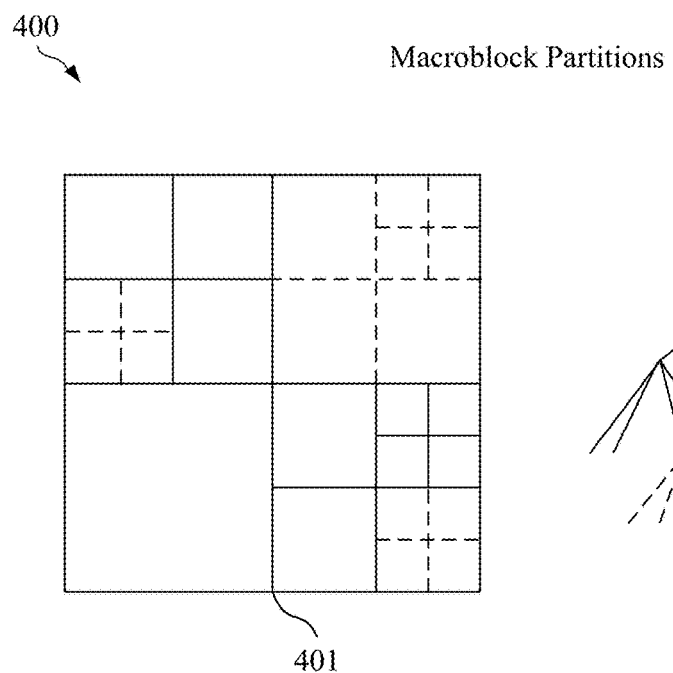
FIG. 4 is a schematic diagram of example method for partitioning a picture for coding residual.
Figure 4:
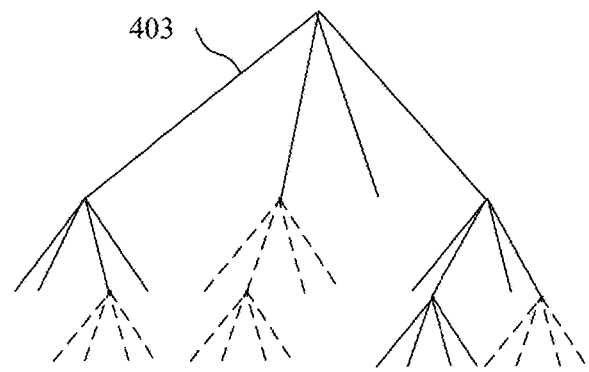

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

Figure 5:
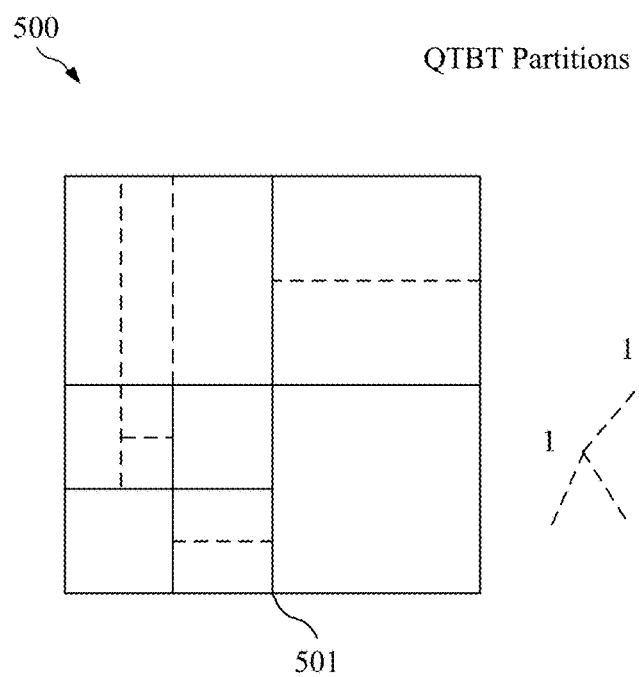
FIG. 5 is a schematic diagram of example method for partitioning a picture, for example according to a quad tree binary tree (QTBT) structure.
Figure 5:
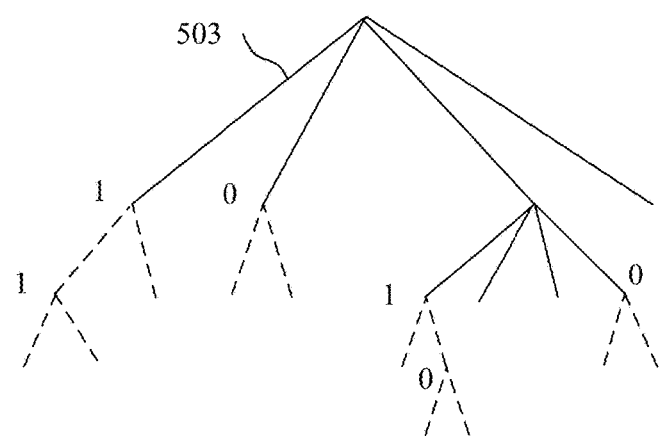

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signaled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 6:
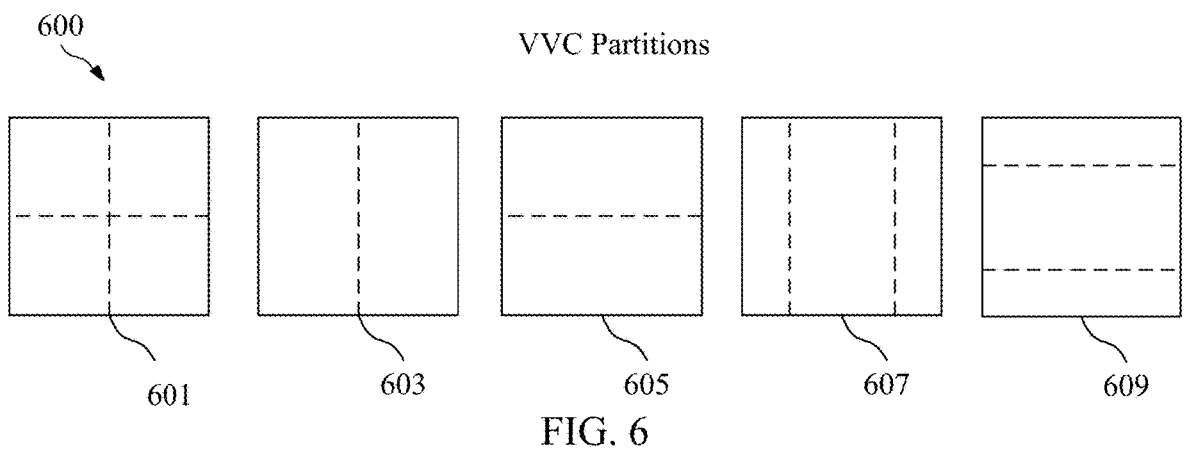
FIG. 6 is a schematic diagram of example partitioning structures used in Versatile Video Coding (VVC).

Triple-tree partitioning for VVC is now discussed. FIG. 6 is a schematic diagram 600 of example partitioning structures used in VVC. As shown, split types other than quad-tree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a prediction tree (binary-tree or triple-tree). A CTU is first partitioned by a region tree (RT). A RT leaf may be further split with prediction tree (PT). A PT leaf may also be further split with PT until a max PT depth is reached. A PT leaf is a basic coding unit. The PT may also be called a CU for convenience. In an example implementation, a CU cannot be further split. Prediction and transform are both applied on CU in the same way as JEM. The whole partition structure is named multiple-type-tree.

Figure 7:
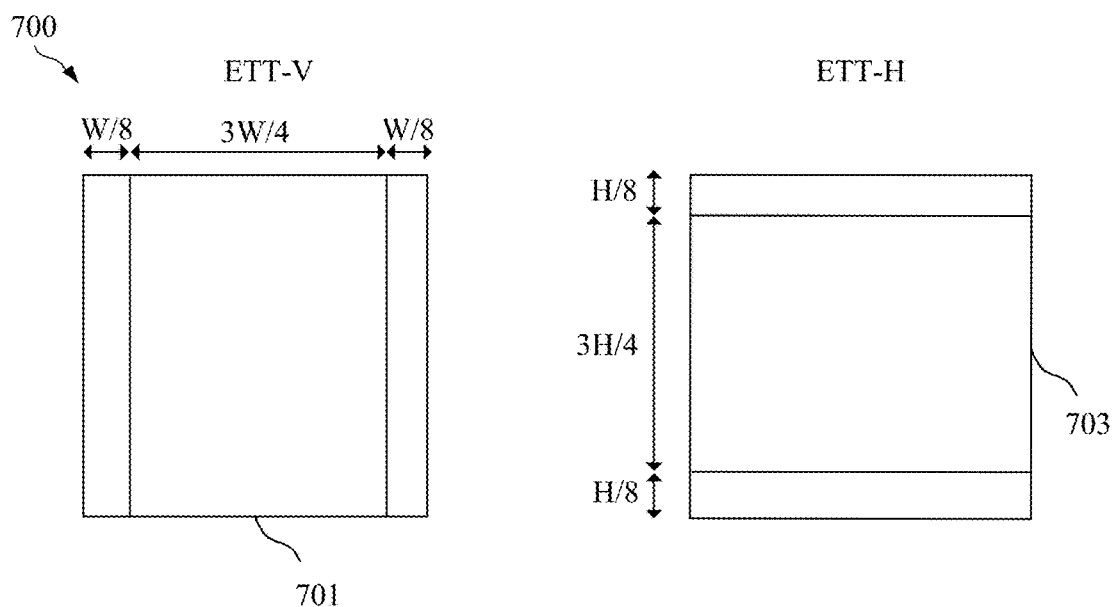
FIG. 7 is a schematic diagram of example Extended Ternary-Tree (ETT) partitioning structures.

FIG. 7 is a schematic diagram 700 of example ETT partitioning structures, including an ETT-V split 701 and an ETT-H split 703. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=$2^{N2}$ with any positive integer N2. In another example, H2 cannot be in a form of H2=$2^{N2}$ with any positive integer N2. In one example, at least one of the parameters is in the form of power of 2. In one example, W1 is in a form of W1=$2^{N1}$ with a positive integer N1. In another example, H1 is in a form of H1=$2^{N1}$ with a positive integer N1.

In one example, ETT only splits one partition in a vertical direction, for example where W1=a1*W, W2=a2*W, and W3=a3*W, where a1+a2+a3=1, and where H1=H2=H3=H. This kind of ETT is vertical split and may be referred to as ETT-V. In one example, ETT-V split 701 can be used where W1=W/8, W2=3*W/4, W3=W/8, and H1=H2=H3=H. In one example, ETT only splits one partition in horizontal direction, for example where H1=a1*H, H2=a2*H, and H3=a3*H, where a1+a2+a3=1, and where W1=W2=W3=W. This kind of ETT is a horizontal split and may be referred to as ETT-H. In one example, ETT-H split 703 can be used where H1=H/8, H2=3*H/4, H3=H/8, and W1=W2=W3=W.

Figure 8:
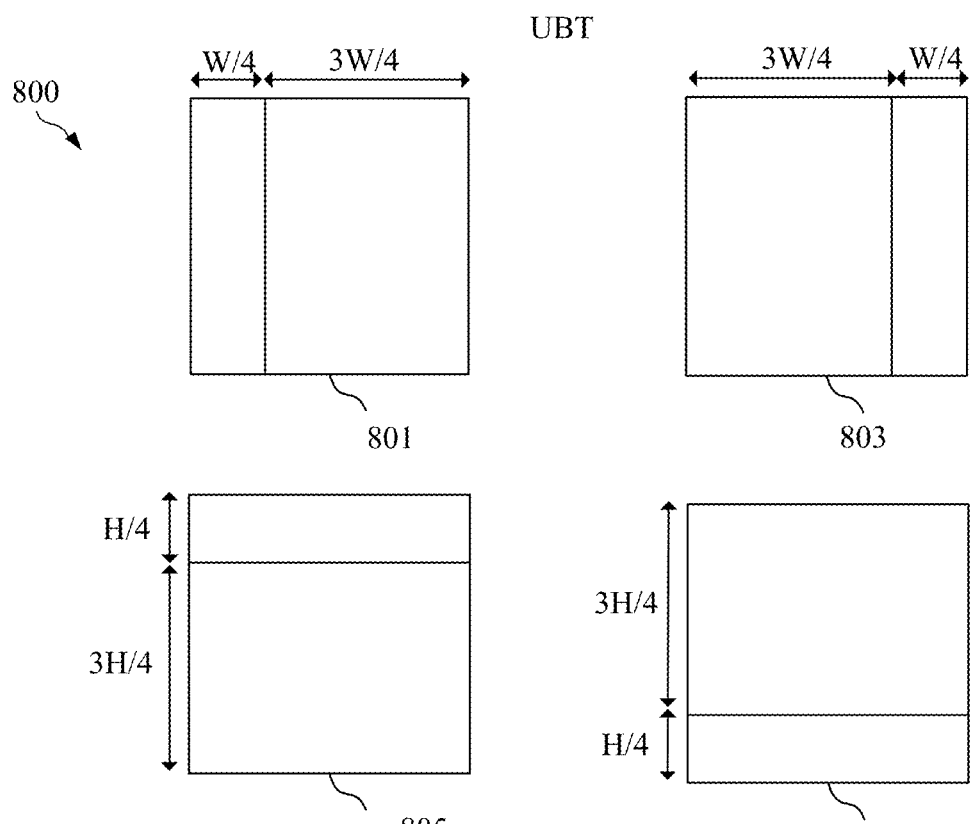
FIG. 8 is a schematic diagram of example ¼ Unsymmetric Binary Tree (UBT) partitioning structures.

FIG. 8 is a schematic diagram 800 of example ¼ UBT partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1−a)×W, and H1=H2=H. In such a case, the partition may be called a vertical UBT (UBT-V). In one example, a may be smaller than ½, such as ¼, ⅛, 1/16, 1/32, 1/64, etc. In such a case, the partition may be called a Type 0 UBT-V, an example of which is shown as split 801. In one example, a may be larger than ½, such as ¾, ⅞, 15/16, 31/32, 63/64, etc. In such a case, the partition is called a Type 1 UBT-V, an example of which is shown as split 803. In one example, H1=a×H, H2=(1−a)×H, W1=W2=W. In such a case, the partition may be called a horizontal UBT (UBT-H). In one example, a may be smaller than ½, such as ¼, ⅛, 1/16, 1/32, 1/64, etc. In such a case, the partition is called a Type 0 UBT-H, an example of which is shown as split 805. In one example, a may be larger than ½, such as ¾, ⅞, 15/16, 31/32, 63/64, etc. In such a case, the partition may be called a Type 1 UBT-H, an example of which is shown as split 807.

Intra prediction, for example as used in HEVC/H.265, is now discussed. Intra prediction codes a current block by reference to a reference block in the same picture. In this way, coding each sample (e.g., pixel) of the block can be avoided. Instead, the current block is matched to reference block that contains the closest sample values to the current block. An intra prediction mode is then coded. Intra prediction modes include a group of directional modes, each of which is a vector that points in a predefined direction. Intra prediction modes also include a planar mode and a direct current (DC) mode, each of which employ averages of multiple reference blocks. By employing intra prediction modes, the block is coded as a prediction mode value instead of as a group of samples with corresponding sample values, which may include both luma and chroma components. Any differences between the sample values of the current block and the sample values of the reference block(s) are coded as residual.

Figure 9:
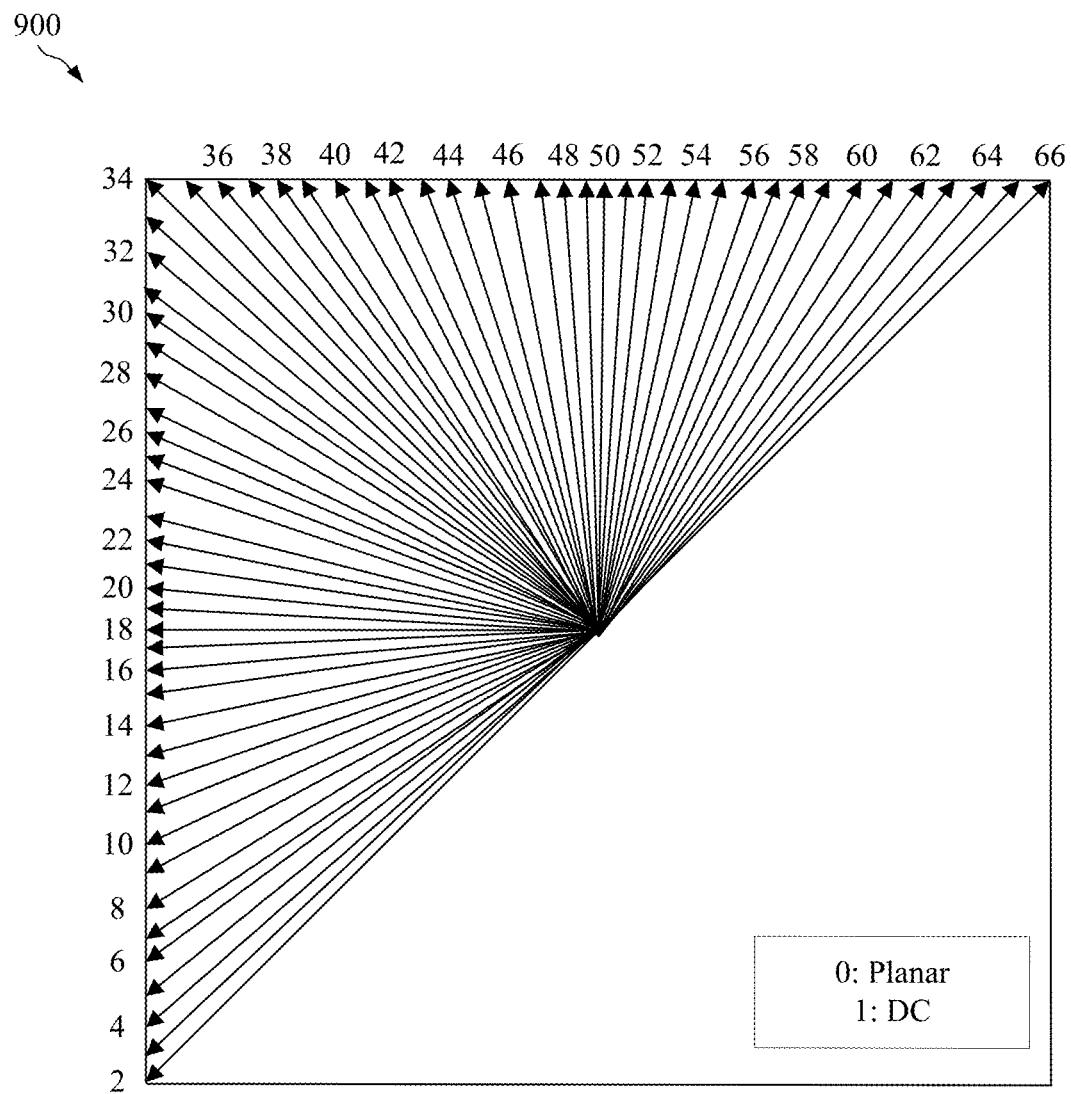
FIG. 9 is a schematic diagram of example intra prediction modes.

FIG. 9 is a schematic diagram 900 of example intra prediction modes, which may be employed in HEVC. Intra prediction, also known as intra mode coding, may employ sixty seven intra prediction modes in HEVC. To capture arbitrary edge directions presented in natural video, the number of directional intra modes is extended from thirty-three to sixty-five in intra prediction. The directional modes are depicted as solid lines with arrows in diagram 900, along with the planar and DC modes. These denser directional intra prediction modes apply for all block sizes and for both luma and chroma intra predictions.

Some example angular intra prediction directions are defined from 45 degrees to −135 degrees in clockwise direction as shown in diagram 900. In VVC test model version two (VTM2), several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged. In the HEVC, every intra-coded block has a square shape and the length of each side is a power of two. Thus, no division operations are employed to generate an intra-predictor using DC mode. In VTM2, blocks can have a rectangular shape that necessitates the use of a division operation per block in the general case. To avoid division operations for DC prediction, only the longer side is used to compute the average for non-square blocks.

Figure 10:
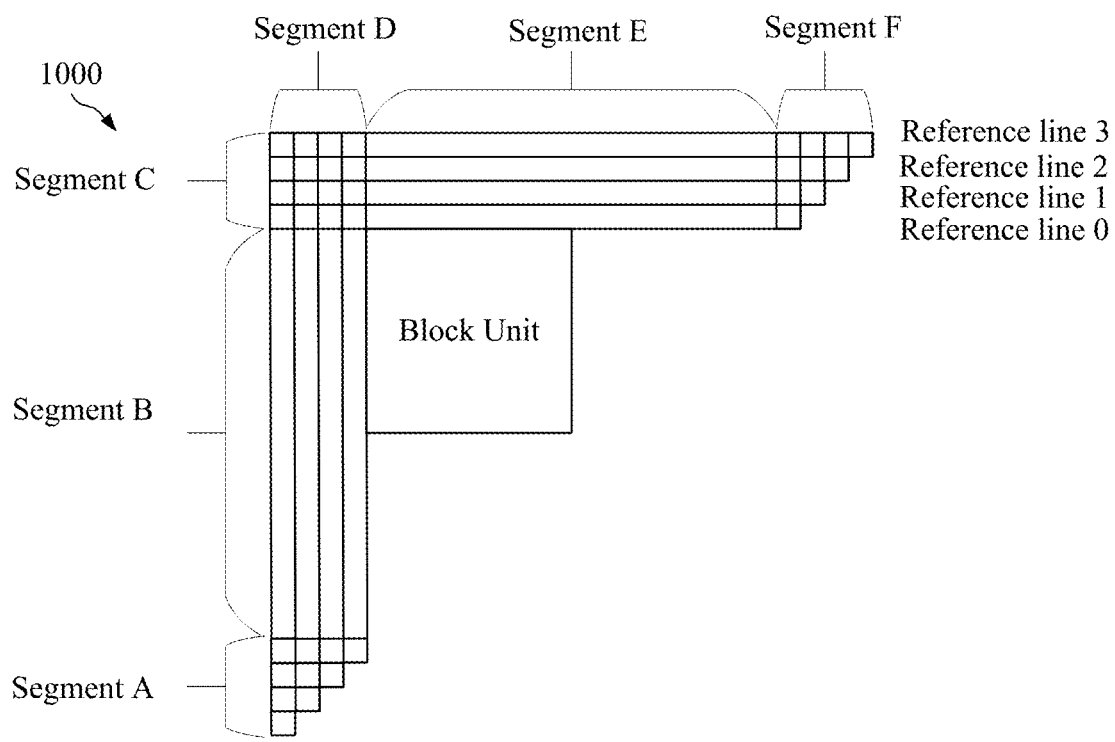
FIG. 10 is a schematic diagram of an example block employing multiple reference lines (MRLs).

FIG. 10 is a schematic diagram 1000 of an example block employing multiple reference lines (MRLs). MRL intra prediction uses a plurality of reference lines for intra prediction. In diagram 1000, an example of four reference lines is depicted. The four reference lines are divided into segments A-F. The samples of segments A and F are not fetched from reconstructed neighboring samples, but are padded with the closest samples from Segment B and E, respectively. HEVC intra-picture prediction uses the nearest reference line (e.g., reference line 0). In MRL, two additional lines (e.g., reference line 1 and reference line 3) are used.

The index of the selected reference line (mrl_idx) is signaled and used to generate an intra predictor. For a reference line index, which is greater than zero, only additional reference line modes in the most probable mode (MPM) list are signaled and only the MPM index without remaining mode is signaled. The reference line index is signaled before the intra prediction modes. Planar and DC modes are excluded from intra prediction modes when a nonzero reference line index is signaled. MRL is disabled for the first line of blocks inside a CTU to prevent using extended reference samples outside the current CTU line. Also, position dependent intra prediction combination (PDPC) is disabled when an additional line is used.

Figure 11:
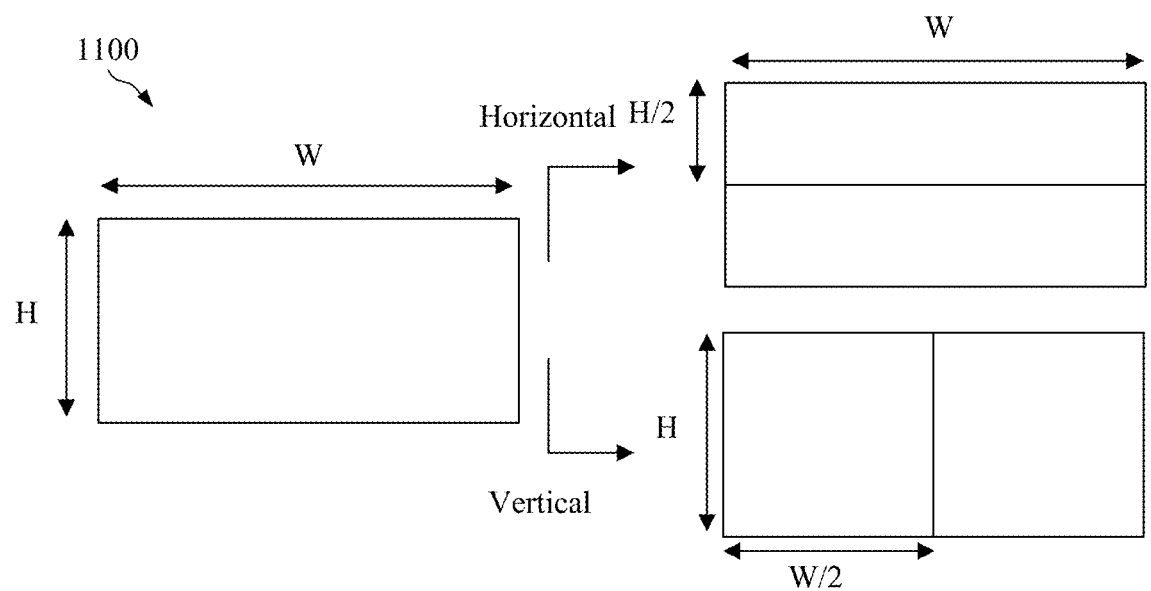
FIG. 11 is a schematic diagram of an example partition employed by Intra subblock partitioning (ISP).
Figure 12:
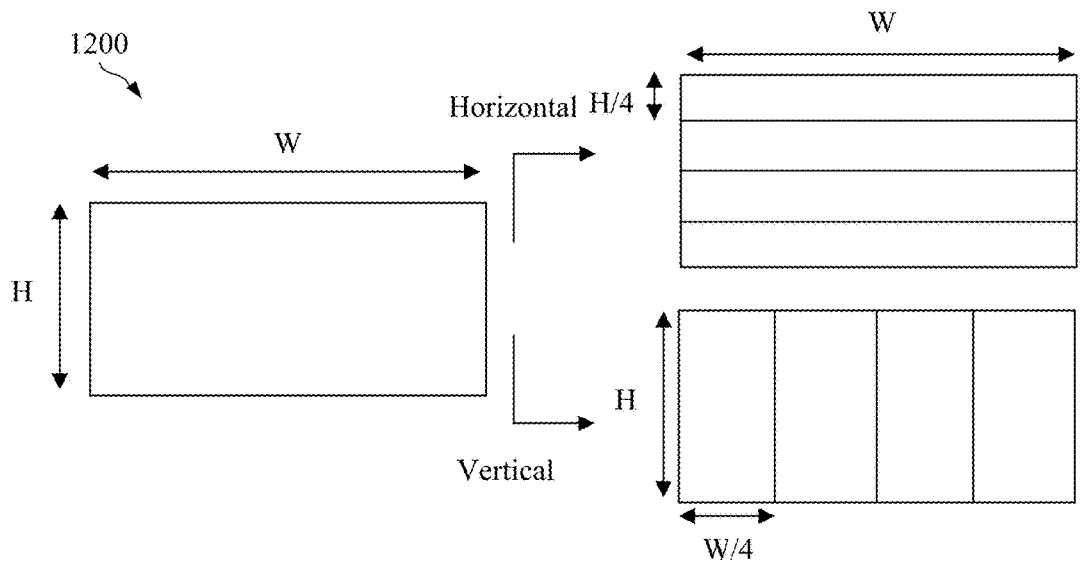
FIG. 12 is a schematic diagram of another example partition employed by ISP.

FIG. 11 is a schematic diagram 1100 of an example partition employed by intra subblock partitioning (ISP). FIG. 12 is a schematic diagram 1200 of another example partition employed by ISP. In an example, ISP divides luma intra-predicted blocks vertically or horizontally into two or four sub-partitions, as shown in diagram 1100 and diagram 1200, respectively. The partitions are selected depending on the block size dimensions as shown in Table. All sub-partitions should fulfill the condition of having at least sixteen samples. For block sizes 4×N or N×4 (with N>8), when allowed, the 1×N or N×1 sub-partition may exist. Table 1 describes a number of sub-partitions depending on the block size, which can be denoted as maximum transform block size (maxTBSize).

TABLE 1

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding. As noted above, the residual is the difference between the current block and the reference block. The residual is the converted into coefficients by employing transforms. In addition, the coefficients can be quantized for further compression. The coefficients for the residual signal are sent by the encoder. The decoder can then perform inverse quantization and apply an inverse transform to recover the residual. The sub-partition can then be intra predicted. Finally, the corresponding reconstructed samples are obtained by adding the residual signal to the prediction signal. Therefore, the reconstructed values of each sub-partition become available to generate the prediction of the next samples. The process can be repeated as needed to reconstruct an image. All sub-partitions share the same intra mode. Hereinafter, inner sub-partition is used to represent sub-partitions except the first sub-partition. If an ISP block is split in a horizonal direction, the first sub-partition is the above sub-partition. If an ISP block is split in a vertical direction, the first sub-partition is the left sub-partition.

The following is a specification of transform type horizontal (trTypeHor) and transform type vertical (trTypeVer) depending on the intra prediction mode (predModeIntra).

TABLE 2

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? DST-VII:DCT-II | (nTbH >= 4 && nTbH <= 16) ? DST-VII:DCT-II |
| INTRA_ANGULAR33, INTRA_ANGULAR35 | DCT-II | DCT-II |
| INTRA_ANGULAR2, INTRA_ANGULAR4, ..., INTRA_ANGULAR28, INTRA_ANGULAR30, INTRA_ANGULAR39, INTRA_ANGULAR41, ...,INTRA_ANGULAR63, INTRA_ANGULAR65 | (nTbW >= 4 && nTbW <= 16) ? DST-VII:DCT-II | DCT-II |
| INTRA_ANGULAR3, INTRA_ANGULAR5, ..., INTRA_ANGULAR27, INTRA_ANGULAR29, INTRA_ANGULAR38, INTRA_ANGULAR40, ..., INTRA_ANGULAR64, INTRA_ANGULAR66 | DCT-II | (nTbH >= 4 && nTbH <= 16) ? DST-VII:DCT-II |

The following are example syntax and semantics, and more specifically coding unit syntax.

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && slice_type != I ) | |
|       pred_mode_flag | ae(v) |
|     if( ( ( slice_type == I && cu_skip_flag[ x0 ][ y0 ] ==0 ) \|\| ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] == MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 && ( cbWidth <= MaxTbSizeY \|\| cbHeight <= MaxTbSizeY ) && ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] == 0 && intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE \|\| tree Type == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |

|  | Descriptor |
|---|---|
| ...<br>  }<br>...<br>} | |

An example transform unit syntax is disclosed.

|  | Descriptor |
|---|---|
| transform_unit( x0, y0, tbWidth, tbHeight, treeType, subTuIndex ) {<br>  if( treeType = = SINGLE_TREE \|\| treeType = = DUAL_TREE_LUMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>        ( subTuIndex = = 1 && !cu_sbt_pos_flag ) ) ) ) \|\|<br>      ( IntraSubPartitionsSplitType != ISP_NO_SPLIT &&<br>      ( subTuIndex < NumIntraSubPartitions − 1 \|\| !InferTuCbfLuma ) ) )<br>      tu_cbf_luma[ x0 ][ y0 ] | ae(v) |
|     if (IntraSubPartitionsSplitType != ISP_NO_SPLIT )<br>      InferTuCbfLuma = InferTuCbfLuma && !tu_cbf_luma[ x0 ][ y0 ]<br>  }<br>  if( ( treeType = = SINGLE_TREE \|\| treeType = = DUAL_TREE_CHROMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>        ( subTuIndex = = 1 && !cu_sbt_pos_flag ) ) ) ) \|\|<br>      ( IntraSubPartitionsSplitType != ISP_NO_SPLIT &&<br>       ( subTuIndex = = NumIntraSubPartitions − 1 ) ) ) {<br>      tu_cbf_cb[ x0 ][ y0 ] | ae(v) |
|       tu_cbf_cr[ x0 ][ y0 ] | ae(v) |
|     }<br>  }<br>  if( IntraSubPartitionsSplitType != ISP_NO_SPLIT &&<br>    treeType = = SINGLE_TREE && subTuIndex = = NumIntraSubPartitions − 1 ) )<br>    xC = CbPosX[ x0 ][ y0 ]<br>    yC = CbPosY[ x0 ][ y0 ]<br>    wC = CbWidth[ x0 ][ y0 ] / 2<br>    hC = CbHeight[ x0 ][ y0 ] / 2<br>  } else<br>    xC = x0<br>    yC = y0<br>    wC = tbWidth / SubWidthC<br>    hC = tbHeight / SubHeightC<br>  }<br>  if( ( tu_cbf_luma[ x0 ][ y0 ] \|\| tu_cbf_cb[ x0 ][ y0 ] \|\| tu_cbf_cr[ x0 ][ y0 ] ) &&<br>    treeType != DUAL_TREE_CHROMA ) {<br>    if( cu_qp_delta_enabled_flag && !IsCuQpDeltaCoded ) {<br>      cu_qp_delta_abs | ae(v) |
|       if( cu_qp_delta_abs )<br>        cu_qp_delta_sign_flag | ae(v) |
|     }<br>  }<br>  if( tu_cbf_luma[ x0 ][ y0 ] && treeType != DUAL_TREE_CHROMA<br>    && ( tbWidth <= 32 ) && ( tbHeight <= 32 )<br>    && ( IntraSubPartitionsSplit[ x0 ][ y0 ] = = ISP_NO_SPLIT )<br>    && ( !cu_sbt_flag ) ) {<br>    if( transform_skip_enabled_flag && tbWidth <= MaxTsSize && tbHeight <= MaxTsSize )<br>      transform_skip_flag[ x0 ][ y0 ] | ae(v) |
|     if( (( CuPredMode[ x0 ][ y0 ] != MODE_INTRA && sps_explicit_mts_inter_enabled_flag )<br>      \|\; ( CuPredMode[ x0 ][ y0 ] = = MODE_INTRA && sps_explicit_mts_intra_enabled_flag ))<br>      && ( tbWidth <= 32 ) && ( tbHeight <= 32 ) && ( !transform_skip_flag[ x0 ][ y0 ] ) )<br>      tu_mts_idx[ x0 ][ y0 ] | ae(v) |
|   }<br>  if( tu_cbf_luma[ x0 ][ y0 ] )<br>    residual_coding( x0, y0, Log2( tbWidth ), Log2( tbHeight ), 0 )<br>  if( tu_cbf_cb[ x0 ][ y0 ] )<br>    residual_coding( xC, yC, Log2( wC ), Log2( hC ),1 ) | |

| Descriptor |
|---|
| if( tu_cbf_cr[ x0 ][ y0 ] )<br>    residual_coding( xC, yC, Log2( wC ), Log2( hC ),2 )<br>} |

Intra_subpartitions_mode_flag[x0][y0] equal to 1 specifies that the current intra coding unit is partitioned into NumIntraSubPartitions[x0][y0] rectangular transform block subpartitions. Intra_subpartitions_mode_flag[x0][y0] equal to 0 specifies that the current intra coding unit is not partitioned into rectangular transform block subpartitions. When not present, intra_subpartitions_mode_flag[x0][y0] is inferred to be equal to 0. Intra_subpartitions_split_flag[x0][y0] specifies whether the intra subpartitions split type is horizontal or vertical. When not present, intra_subpartitions_split_flag[x0][y0] is inferred as follows. If cbHeight is greater than MaxTbSizeY, intra_subpartitions_split_flag[x0][y0] is inferred to be equal to 0. Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 7-9. IntraSubPartitionsSplitType is derived as follows. If intra_subpartitions_mode_flag[x0][y0] is equal to 0, IntraSubPartitionsSplitType is set equal to 0. Otherwise, the IntraSubPartitionsSplitType is set equal to 1+intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows. If IntraSubPartitionsSplitType is equal to ISP_NO_SPLIT, NumIntraSubPartitions is set equal to 1. Otherwise, if one of the following conditions is true, NumIntraSubPartitions is set equal to 2. A first condition is cbWidth is equal to 4 and cbHeight is equal to 8. A second condition is cbWidth is equal to 8 and cbHeight is equal to 4. Otherwise, NumIntraSubPartitions is set equal to 4.

Affine linear weighted intra prediction (ALWIP), also known as matrix based intra prediction (MIP) is now discussed. Also, generation of the reduced prediction signal by matrix vector multiplication is discussed. The neighboring reference samples are firstly down-sampled via averaging to generate the reduced reference signal $bdry_{red}$. Then, the reduced prediction signal $pred_{red}$ is computed by calculating a matrix vector product and adding an offset according to:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

Figure 13:
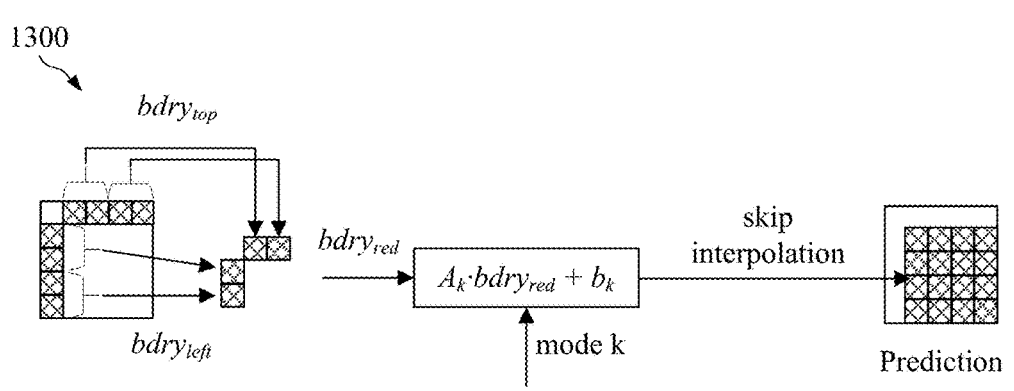
FIG. 13 is a schematic diagram of an example of affine linear weighted intra prediction (ALWIP) as applied to a 4×4 block.
Figure 14:
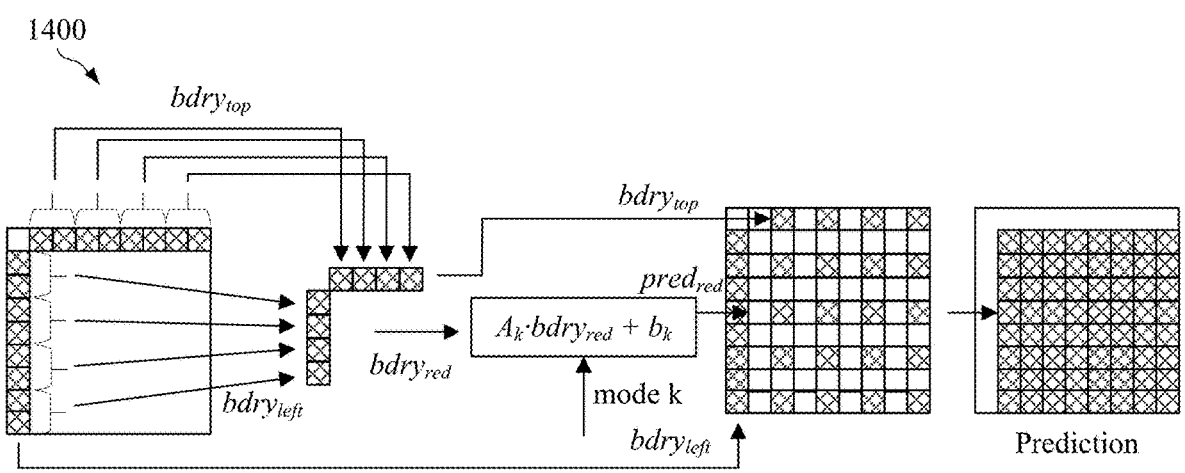
FIG. 14 is a schematic diagram of an example of ALWIP as applied to an 8×8 block.
Figure 15:
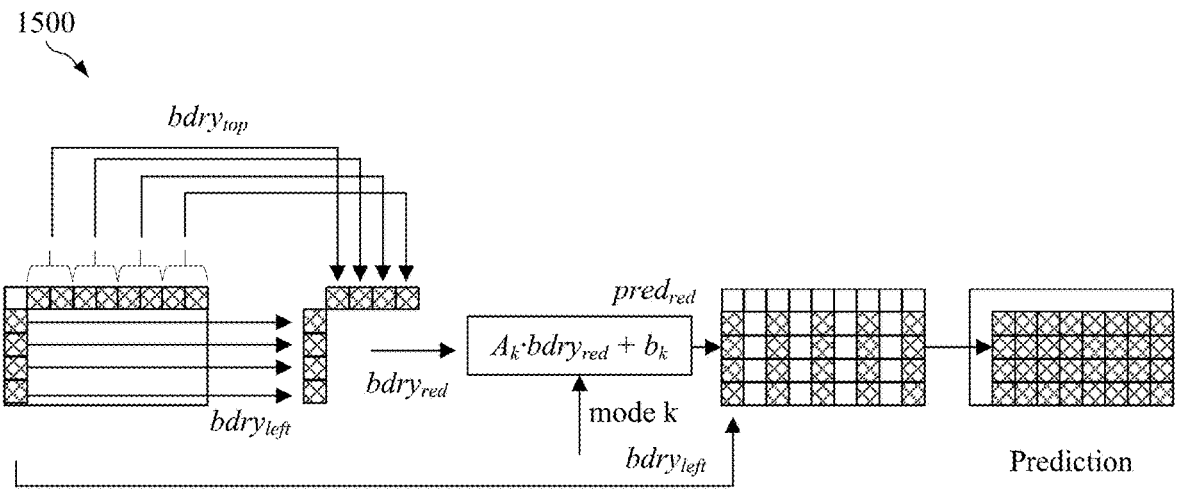
FIG. 15 is a schematic diagram of an example of ALWIP as applied to an 8×4 block.
Figure 16:
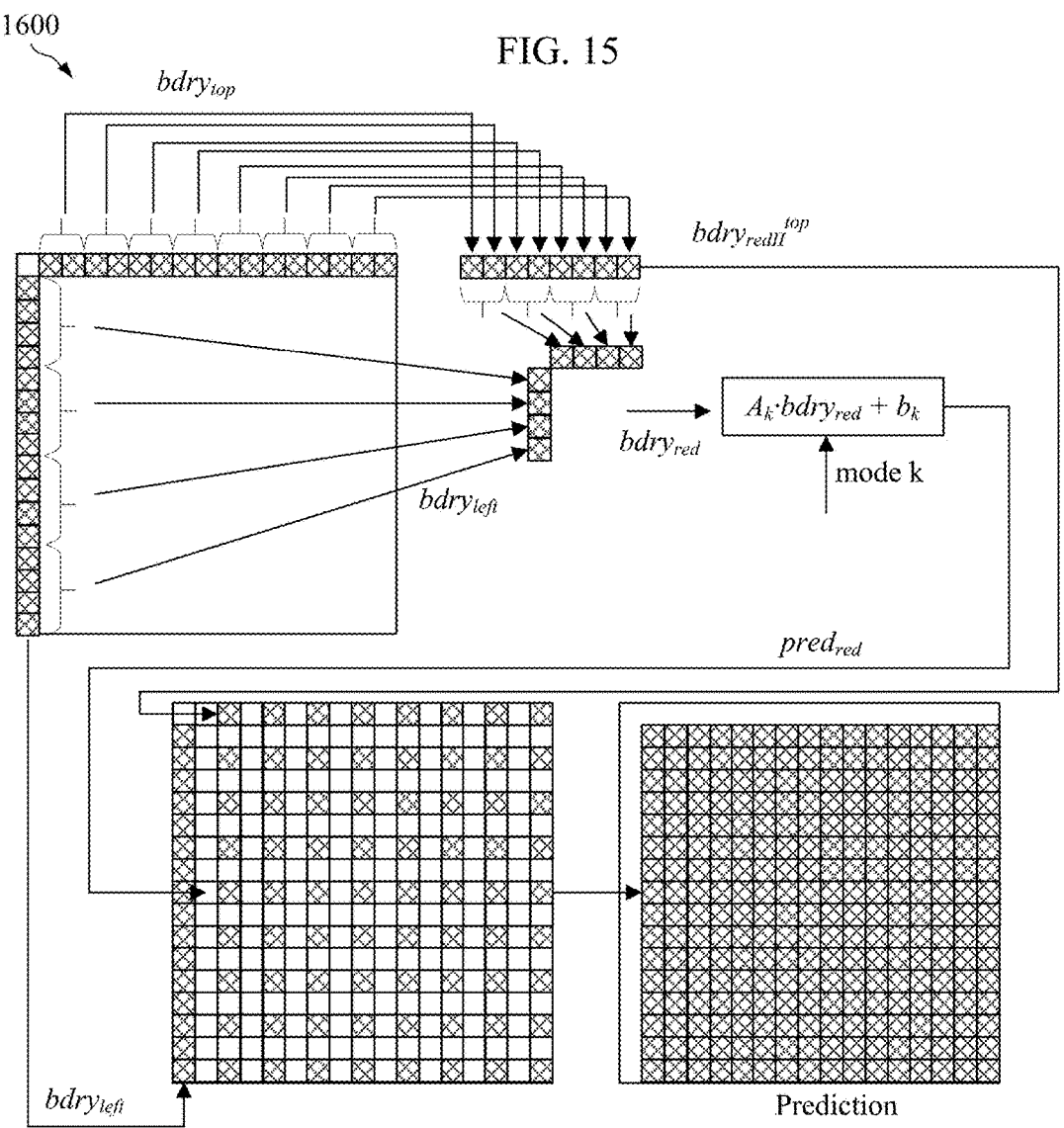
FIG. 16 is a schematic diagram of an example of ALWIP as applied to an 16×16 block.

An illustration of the entire ALWIP process is now described. FIG. 13 is a schematic diagram 1300 of an example of ALWIP as applied to a 4×4 block. FIG. 14 is a schematic diagram 1400 of an example of ALWIP as applied to an 8×8 block. FIG. 15 is a schematic diagram 1500 of an example of ALWIP as applied to an 8×4 block. FIG. 16 is a schematic diagram 1600 of an example of ALWIP as applied to an 16×16 block. The entire process of averaging, matrix vector multiplication and linear interpolation is illustrated for different shapes in schematic diagrams 1300-1600. Any other shapes are treated in a similar manner to at least one of the depicted cases.

When employing a 4×4 block, as shown in schematic diagram 1300, ALWIP takes two averages along each axis of the boundary of the block, denoted as boundary top ($bdry_{top}$) and boundary left ($bdry_{left}$). The resulting four input samples, denoted as $bdry_{red}$, enter the matrix vector multiplication. The matrices, denoted as $A_k$, are taken from the set $S_0$. After adding an offset, denoted as $b_k$ where k indicates an intra prediction mode and b is an offset associated with k, the matrix vector multiplication is applied the yields the 16 final prediction samples. The matrix vector multiplication is denoted as $A_k \cdot bdry_{red} + b_k$. Linear interpolation is not necessary for generating the prediction signal in this example. Thus, a total of (4·16)/(4·4)=4 multiplications per sample are performed to obtain the prediction.

When employing an 8×8 block, as shown in schematic diagram 1400, ALWIP takes four averages along each axis of the boundary to obtain $bdry_{top}$ and $bdry_{left}$. The resulting eight input samples, denoted as $bdry_{red}$, enter the matrix vector multiplication, denoted as $A_k \cdot bdry_{red} + b_k$. The matrices are taken from the set $S_1$. This yields 16 samples on the odd positions of the prediction block. Thus, a total of (8·16)/(8·8)=2 multiplications per sample are performed. After adding the offset $b_k$, these samples are interpolated vertically by using the reduced top boundary. Horizontal interpolation follows by using the original left boundary. The output of the interpolation results in the prediction.

When employing an 8×4 block, as shown in schematic diagram 1500, ALWIP takes four averages along the horizontal axis of the boundary and the four original boundary values on the left boundary to obtain $bdry_{top}$ and $bdry_{left}$, respectively. The resulting eight input samples, denoted as $bdry_{red}$, enter the matrix vector multiplication, denoted as $A_k \cdot bdry_{red} + b_k$. The matrices are taken from the set $S_1$. This yields 16 samples on the odd horizontal and each vertical positions of the prediction block. Thus, a total of (8·16)/(8·4)=4 multiplications per sample are performed. After adding the offset $b_k$, these samples are interpolated horizontally by using the original left boundary. The output of the interpolation results in the prediction. The transposed case (a 4×8 block) is treated in a similar manner.

When employing a 16×16 block, as shown in schematic diagram 1600, ALWIP takes four averages along each axis of the boundary to obtain $bdry_{top}$ and $bdry_{left}$. The resulting eight input samples, denoted as $bdry_{red}$, enter the matrix vector multiplication, denoted as $A_k \cdot bdry_{red} + b_k$. The matrices are taken from the set $S_2$. This yields 64 samples on the odd positions of the prediction block. Thus, a total of (8·64)/(16·16)=2 multiplications per sample are performed. After adding an offset $b_k$, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is substantially similar to the cases described above, and the number of multiplications per sample is less than four in each case. For W×8 blocks with W>8, only horizontal interpolation is necessary as the samples are given at the odd horizontal and each vertical position. For W×4 blocks with W>8, let $A_k$ be the matrix that arises by leaving out every row that corresponds to an odd entry along the horizontal axis of the down-sampled block. Thus, the output size is 32 and again, only horizontal interpolation remains to be performed. The transposed cases are treated accordingly.

An adapted most probable mode (MPM)-list derivation for luma and chroma intra-prediction modes is now discussed. The ALWIP-modes are harmonized with the MPM-based coding of the intra-prediction modes as follows. The luma and chroma MPM-list derivation processes for the intra-prediction modes uses fixed tables map_alwip_to_angular$_{idx}$, idx∈ {0, 1, 2}, mapping an ALWIP-mode predmode$_{ALWIP}$ on a given PU to one of the intra-prediction modes as follows:

$$predmode_{Angular} = \text{map\_alwip\_to\_angular}_{idx(PU)}[predmode_{ALWIP}].$$

$$predmode_{Angular} = \text{map\_alwip\_to\_angular}_{idx(PU)}[predmode_{ALWIP}]$$

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

Example syntax and semantics, including coding unit syntax, are as follows.

| | Descriptor |
|---|---|
| coding_unit( x0, y0, cbWidth, cbHeight, treeType ) { | |
| ... | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE || tree Type = = DUAL_TREE_LUMA ) { | |
|         if( abs( Log2( cbWidth ) − Log2( cbHeight ) ) <= 2 ) | |
|           intra_lwip_flag[ x0 ][ y0 ] | ae(v) |
|         if( intra_lwip_flag[ x0 ][ y0 ] ) { | |
|           intra_lwip_mpm_flag[ x0 ][ y0 ] | ae(v) |
|           if( intra_lwip_mpm_flag[ x0 ][ y0 ] ) | |
|             intra_lwip_mpm_idx[ x0 ][ y0 ] | ae(v) |
|           else | |
|             intra_lwip_mpm_remainder[ x0 ][ y0 ] | ae(v) |
|         } else { | |
|           if( ( y0 % CtbSizeY ) > 0 ) | |
|             intra_luma_ref_idx[ x0 ][ y0 ] | ae(v) |
|           if (intra_luma_ref_idx[ x0 ][ y0 ] = = 0 && | |
|             ( cbWidth <= MaxTbSizeY || cbHeight <= MaxTbSizeY ) && | |
|             ( cbWidth * cbHeight > MinTbSizeY * MinTbSizeY )) | |
|             intra_subpartitions_mode_flag[ x0 ][ y0 ] | ae(v) |
|           if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|           if( intra_luma_ref_idx[ x0 ][ y0 ] = = 0 && | |
|             intra_subpartitions_mode_flag[ x0 ][ y0 ] = = 0 ) | |
|             intra_luma_mpm_flag[ x0 ][ y0 ] | ae(v) |
|           if( intra_luma_mpm_flag[ x0 ][ y0 ] ) | |
|             intra_luma_mpm_idx[ x0 ][ y0 ] | ae(v) |
|           else | |
|             intra_luma_mpm_remainder[ x0 ][ y0 ] | ae(v) |
|         } | |
|       } | |
|       if( treeType = = SINGLE_TREE || treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |

| | Descriptor |
|---|---|
| ...<br>    }<br>} | |

Quantized residual block differential pulse-code modulation (QR-BDPCM) is now discussed. QR-BDPCM may be employed to code screen contents efficiently.

The prediction directions used in QR-BDPCM can be vertical and horizontal prediction modes. The intra prediction is done on the entire block by sample copying in the prediction direction (horizontal or vertical prediction) similar to intra prediction. The residual is quantized and the delta between the quantized residual and the predictor (horizontal or vertical) quantized value is coded. This can be described by the following. For a block of size M (rows)×N (cols), let $r_{i,j}$, $0 \leq i \leq M-1$, $0 \leq j \leq N-1$ be the prediction residual after performing intra prediction horizontally (copying left neighbor pixel values across the predicted block line by line) or vertically (copying top neighbor lines to each line in the predicted block) using unfiltered samples from the above or left block boundary samples. Let $Q(r_{i,j})$, $0 \leq i \leq M-1$, $0 \leq j \leq N-1$ denote the quantized version of the residual $r_{i,j}$, where residual is the difference between the original block and the predicted block values. Then the differential pulse-code modulation (DPCM) is applied to the quantized residual samples, resulting in modified M×N array $\tilde{R}$ with elements $\tilde{r}_{i,j}$. When vertical block differential pulse-code modulation (BDPCM) is signalled, the residual quantized samples are obtained as follows:

$$\tilde{r}_{i,j} = \begin{cases} Q(r_{i,j}), & i = 0, \ 0 \leq j \leq (N-1) \\ Q(r_{i,j}) - Q(r_{(i-1),j}), & 1 \leq i \leq (M-1), \ 0 \leq j \leq (N-1) \end{cases} \quad (2\text{-}7\text{-}1)$$

For horizontal prediction, similar rules apply, and the residual quantized samples are obtained as follows:

$$\tilde{r}_{i,j} = \begin{cases} Q(r_{i,j}), & 0 \leq i \leq (M-1), \ j = 0 \\ Q(r_{i,j}) - Q(r_{i,(j-1)}), & 0 \leq i \leq (M-1), \ 1 \leq j \leq (N-1) \end{cases} \quad (2\text{-}7\text{-}2)$$

The residual quantized samples $\tilde{r}_{i,j}$ are included in a bitstream and sent to the decoder. On the decoder side, the above calculations are reversed to produce $Q(r_{i,j})$, $0 \leq i \leq M-1$, $0 \leq j \leq N-1$. For vertical prediction case, the quantized residual is recovered as follows:

$$Q(r_{i,j}) = \sum_{k=0}^{i} \tilde{r}_{k,j}, \ 0 \leq i \leq (M-1), \ 0 \leq j \leq (N-1) \quad (2\text{-}7\text{-}3)$$

For the horizontal case, the quantized residual is recovered as follows:

$$Q(r_{i,j}) = \sum_{k=0}^{j} \tilde{r}_{i,k}, \ 0 \leq i \leq (M-1), \ 0 \leq j \leq (N-1) \quad (2\text{-}7\text{-}4)$$

The inverse quantized residuals, $Q^{-1}(Q(r_{i,j}))$, are added to the intra block prediction values to produce the reconstructed sample values. The main benefit of this scheme is that the inverse DPCM can be done on the fly during coefficient parsing by adding the predictor as the coefficients are parsed or the process can be performed after parsing. An example of coding unit syntax for QR-BDPCM are shown as follows.

| | Descriptor |
|---|---|
| coding_unit( x0, y0, cbWidth, cbHeight, treeType ) {<br>  if( tile_group_type != I \|\| sps_ibc_enabled_flag ) {<br>    if( treeType != DUAL_TREE_CHROMA )<br>      cu_skip_flag[ x0 ][ y0 ] | ae(v) |
|     if( cu_skip_flag[ x0 ][ y0 ] = = 0 && tile_group_type != I )<br>      pred_mode_flag | ae(v) |
|     if( ( ( tile_group_type = = I && cu_skip_flag[ x0 ][ y0 ] = = 0 ) \|\|<br>      ( tile_group_type != I && CuPredMode[ x0 ][ y0 ] != MODE_INTRA<br>) ) &&<br>      sps_ibc_enabled_flag )<br>      pred_mode_ibc_flag | ae(v) |
|   }<br>  if( CuPredMode[ x0 ][ y0 ] = = MODE_INTRA ) {<br>    if( pred_mode_flag = = MODE_INTRA && ( cIdx = = 0 ) &&<br>      ( cbWidth <= 32 ) && ( CbHeight <= 32 )) {<br>      bdpcm_flag[ x0 ][ y0 ] | ae(v) |
|       if( bdpcm_flag[ x0 ][ y0 ] ) {<br>        bdpcm_dir_flag[ x0 ][ y0 ] | ae(v) |
|       }<br>    else {<br>    if( sps_pcm_enabled_flag &&<br>      cbWidth >= MinIpcmCbSizeY && cbWidth <= MaxIpcmCbSizeY<br>&&<br>      cbHeight >= MinIpcmCbSizeY && cbHeight <= MaxIpcmCbSizeY )<br>      pcm_flag[ x0 ][ y0 ] | ae(v) |
|     if( pcm_flag[ x0 ][ y0 ] ) {<br>      while( !byte_aligned( ) )<br>        pcm_alignment_zero_bit | f(1) |

-continued

| | Descriptor |
|---|---|
| ```
        pcm_sample( cbWidth, cbHeight, treeType)
    } else {
        if( treeType = = SINGLE_TREE II treeType = =
DUAL_TREE_LUMA ) {
            if( ( y0 % CtbSizeY ) > 0 )
                intra_luma_ref_idx[ x0 ][ y0 ]
            if (intra_luma_ref_idx[ x0 ][ y0 ] = = 0 &&
                ( cbWidth <= MaxTbSizeY II cbHeight <= MaxTbSizeY ) &&
                ( cbWidth * cbHeight > MinTbSizeY * MinTbSizeY ))
                intra_subpartitions_mode_flag[ x0 ][ y0 ]
            if( intra_subpartitions_mode_flag[ x0 ][ y0 ] = = 1 &&
                cbWidth <= MaxTbSizeY && cbHeight <= MaxTbSizeY )
                intra_subpartitions_split_flag[ x0 ][ y0 ]
            if( intra_luma_ref_idx[ x0 ][ y0 ] = = 0 &&
                intra_subpartitions_mode_flag[ x0 ][ y0 ] = = 0 )
                intra_luma_mpm_flag[ x0 ][ y0 ]
            if( intra_luma_mpm_flag[ x0 ][ y0 ] )
                intra_luma_mpm_idx[ x0 ][ y0 ]
            else
                intra_luma_mpm_remainder[ x0 ][ y0 ]
        }
    }
    if( treeType = = SINGLE_TREE II treeType = =
DUAL_TREE_CHROMA )
        intra_chroma_pred_mode[ x0 ][ y0 ]
    }
} else if( treeType != DUAL_TREE_CHROMA ) { /* MODE_INTER or
MODE_IBC */
...
}
``` | ae(v)<br><br>ae(v)<br><br>ae(v)<br><br>ae(v)<br><br>ae(v)<br><br>ae(v)<br><br><br><br>ae(v) |

In an example, bdpcm_flag[x0][y0] equal to 1 specifies that a bdpcm_dir_flag is present in the coding unit including the luma coding block at the location (x0, y0). Further, bdpcm_dir_flag[x0][y0] equal to 0 specifies that the prediction direction to be used in a bdpcm block is horizontal, otherwise it is vertical.

Figure 17:
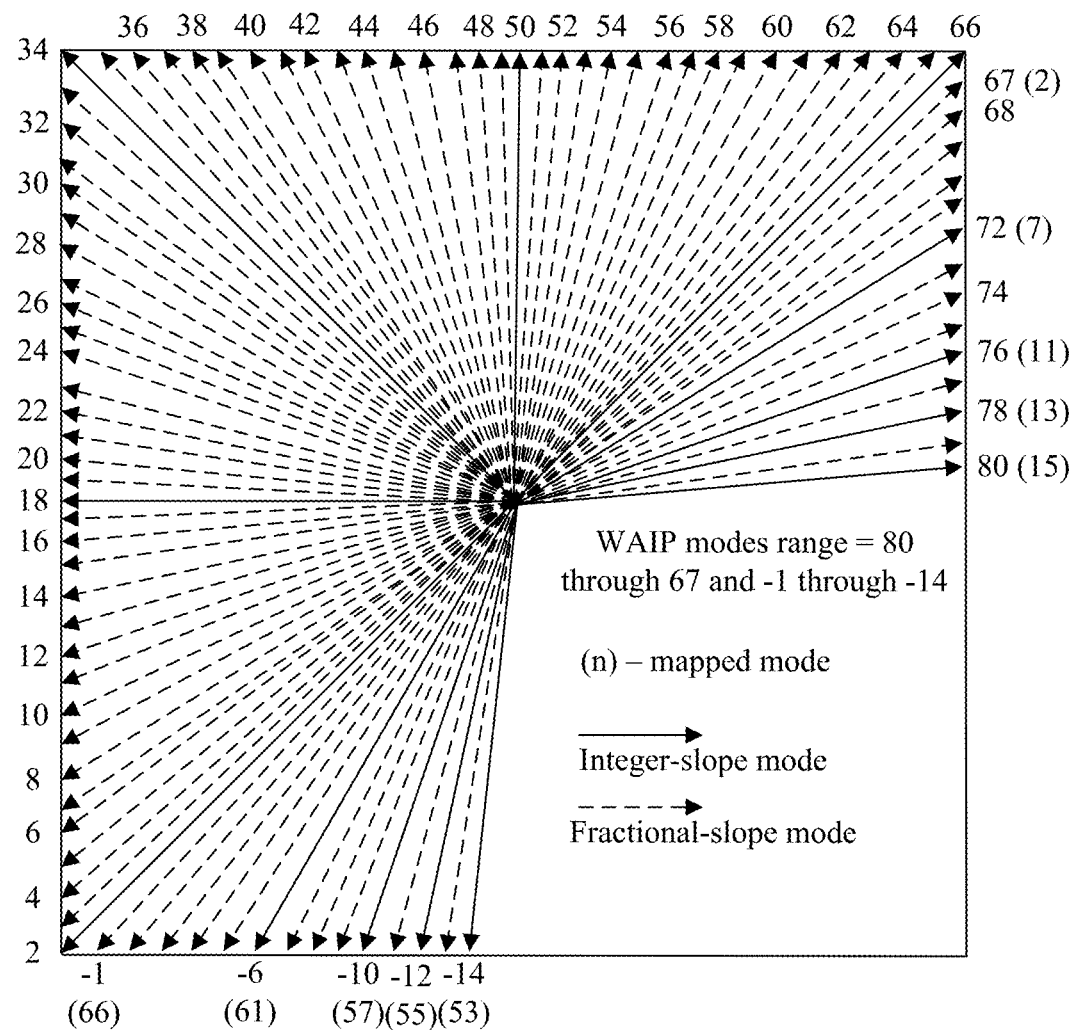
FIG. 17 is a schematic diagram of an example of wide angle intra prediction (WAIP).

FIG. 17 is a schematic diagram 1700 of an example of wide angle intra prediction (WAIP). WAIP modes for a given mode index are defined by mapping the intra prediction directional mode to the mode with the opposite direction and offset by 1 mode value as shown in diagram 1700. For a given rectangular block, the aspect ratio is used to determine which angular modes are to be replaced by the corresponding wide-angular mode. The last and first WAIP-mode indices and the first and last non-WAIP mode indices are enumerated for each aspect ratio that can occur for non-square intra blocks in VVC. Accordingly, the last WAIP modes for a block, which belong to the sets {14, 12, 10, 6} and {72, 76, 78, 80}, correspond to the counter diagonals of a given rectangular block and have integer slope. Thus, they have similar properties as modes 2 and 66, which determine the range of angular prediction modes in the case of square blocks. For square-shaped blocks in VVC, each pair of predicted samples that are horizontally or vertically adjacent are predicted from a pair of adjacent reference samples. In contrast, WAIP extends the angular range of directional prediction beyond 45 degree. Therefore, for a coding block predicted with a WAIP mode, adjacent predicted samples are predicted from non-adjacent reference samples. To suppress discontinuities caused by this phenomenon, the reference samples for WAIP modes are always smoothed. This smoothing is performed by either enabling reference sample filtering or by selecting a smoothing interpolation filter. The introduction of WAIP modes does not cause any changes in the intra mode coding. Rather, each mode from the range [67, 80] is treated as a corresponding mode in the range [2,14] and each mode in the range [−14, −1] is treated as a corresponding mode in the range [53, 66]. The mapping of a non-WAIP mode to the corresponding WAIP mode is invoked only within the process of intra prediction generation of a block.

Planar intra-prediction in VVC is now discussed. In VVC, a prediction sample value predSamples[x][y] at position (x, y) in a block with dimensions W×H is derived as follows:

$$predV[x][y] = ((H - 1 - y) * p[x][-1] + (y + 1) * p[-1][H]) << \log 2(W)$$

$$predH[x][y] = ((W - 1 - x) * p[-1][y] + (x + 1) * p[W][-1]) << \log 2(H)$$

$$predSamples[x][y] = predV[x][y] + predH[x][y] + W * H >>$$

$$(\log 2(W) + \log 2(H) + 1$$

where position (0, 0) represents the top-left position of the block, and p[x][y] represent a reconstructed sample at position (x, y).

Template-based intra mode derivation (TIMD) using MPMs is now discussed. A TIMD method using MPMs includes deriving a TIMD mode from MPMs using a neighboring template. The TIMD mode is used as an additional intra prediction method for a coding unit.

Figure 18:
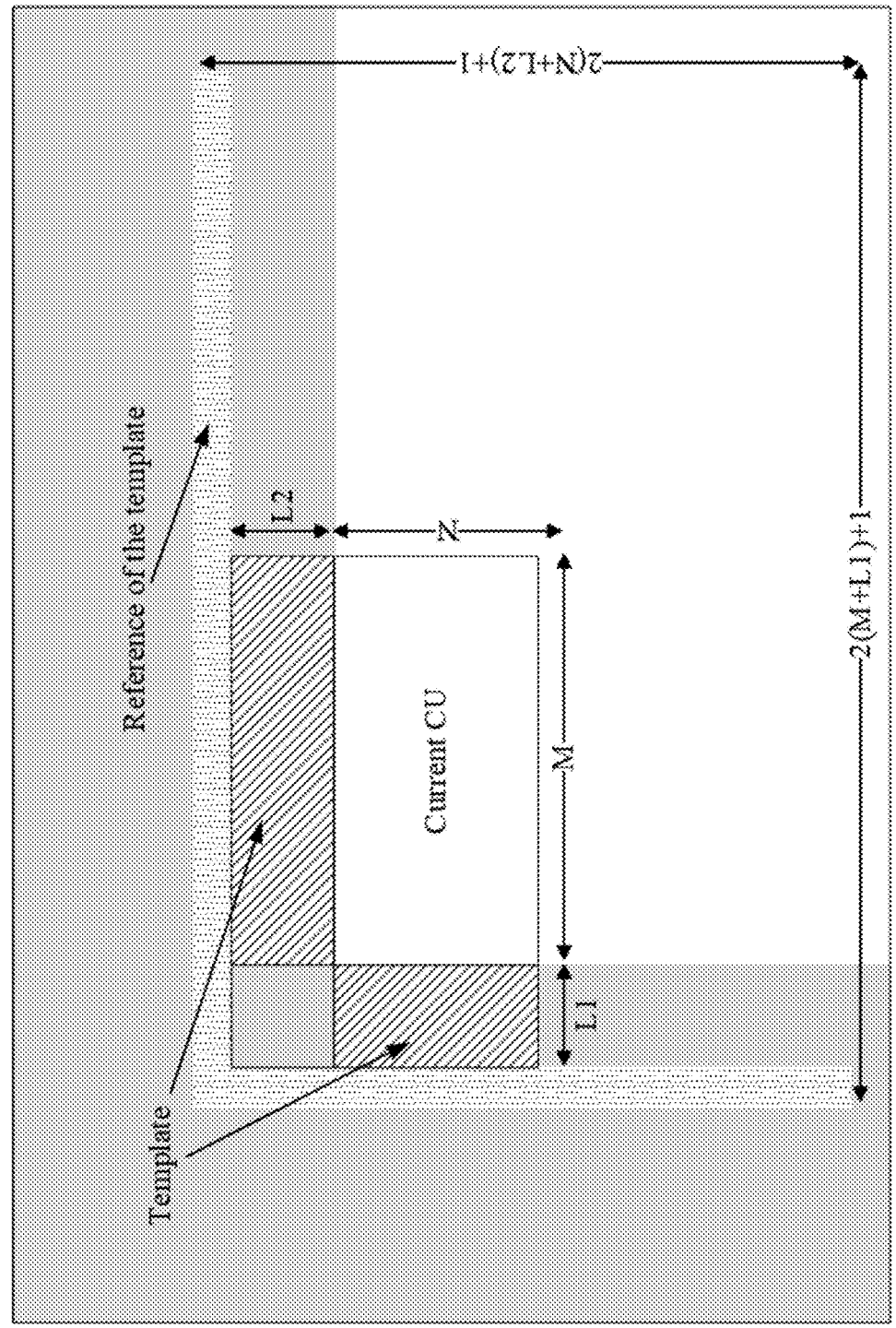
FIG. 18 is a schematic diagram of an example of a template and its reference samples used in template-based intra mode derivation (TIMD).

FIG. 18 is a schematic diagram 1800 of an example of a template and its reference samples used in TIMD. The diagram 1800 also includes a current coding unit shown with respect to the template.

TIMD mode derivation is now discussed. For each intra prediction mode in MPMs, the sum of absolute transformed differences (SATD) between prediction and reconstruction samples of the template is calculated. The intra prediction mode with the minimum SATD is selected as the TIMD mode, and is used for intra prediction of a current coding unit. Position dependent intra prediction combination (PDPC) is included in the derivation of the TIMD mode.

When TIMD is applied on a block, the number of intra prediction modes is expanded from 67 to 131, with denser directional modes.

TIMD signalling is now discussed. A flag is signalled in a sequence parameter set (SPS) to enable or disable the proposed method. When the flag is true, a coding unit level flag is signalled to indicate whether the proposed TIMD method is used. The TIMD flag is signalled after (e.g., immediately after) the matrix based intra prediction (MIP) flag. If the TIMD flag is equal to true, the remaining syntax elements related to luma intra prediction mode, including multiple reference line (MRL), intra sub-partitions (ISP), and normal parsing stage for luma intra prediction modes, are all skipped.

Interaction with new coding tools is now discussed. A decoder side intra mode derivation (DIMD) method with prediction fusion using planar mode was integrated in the exploration experiment on enhanced compression beyond VVC capability (EE2). When EE2 DIMD flag is equal to true, the proposed TIMD flag is not signalled and set equal to false. Similar to PDPC, gradient PDPC is also included in the derivation of the TIMD mode. When secondary MPM is enabled, both the primary MPMs and the secondary MPMs are used to derive the TIMD mode. A 6-tap interpolation filter is not used in the derivation of the TIMD mode.

Modification of MPM list construction in the derivation of TIMD mode is now discussed. In particular, during the construction of the MPM list, intra prediction mode of a neighboring block is derived as planar mode when it is inter-coded.

DIMD is now discussed in further detail. Three angular modes are selected from a Histogram of Gradient (HoG) computed from the neighboring pixels of a current block. Once the three modes are selected, their predictors are computed normally and then their weighted average is used as the final predictor of the block. To determine the weights, corresponding amplitudes in the HoG are used for each of the three modes. The DIMD mode is used as an alternative prediction mode and is always checked in the full rate distortion (FullRD) mode.

The current implementation of DIMD has modified some aspects in the signalling, HoG computation, and the prediction fusion. The purpose of these modifications is to improve the coding performance as well as addressing the complexity concerns, such as those related to throughput of 4×4 blocks. The following description describes the modifications for each aspect.

Figure 19:
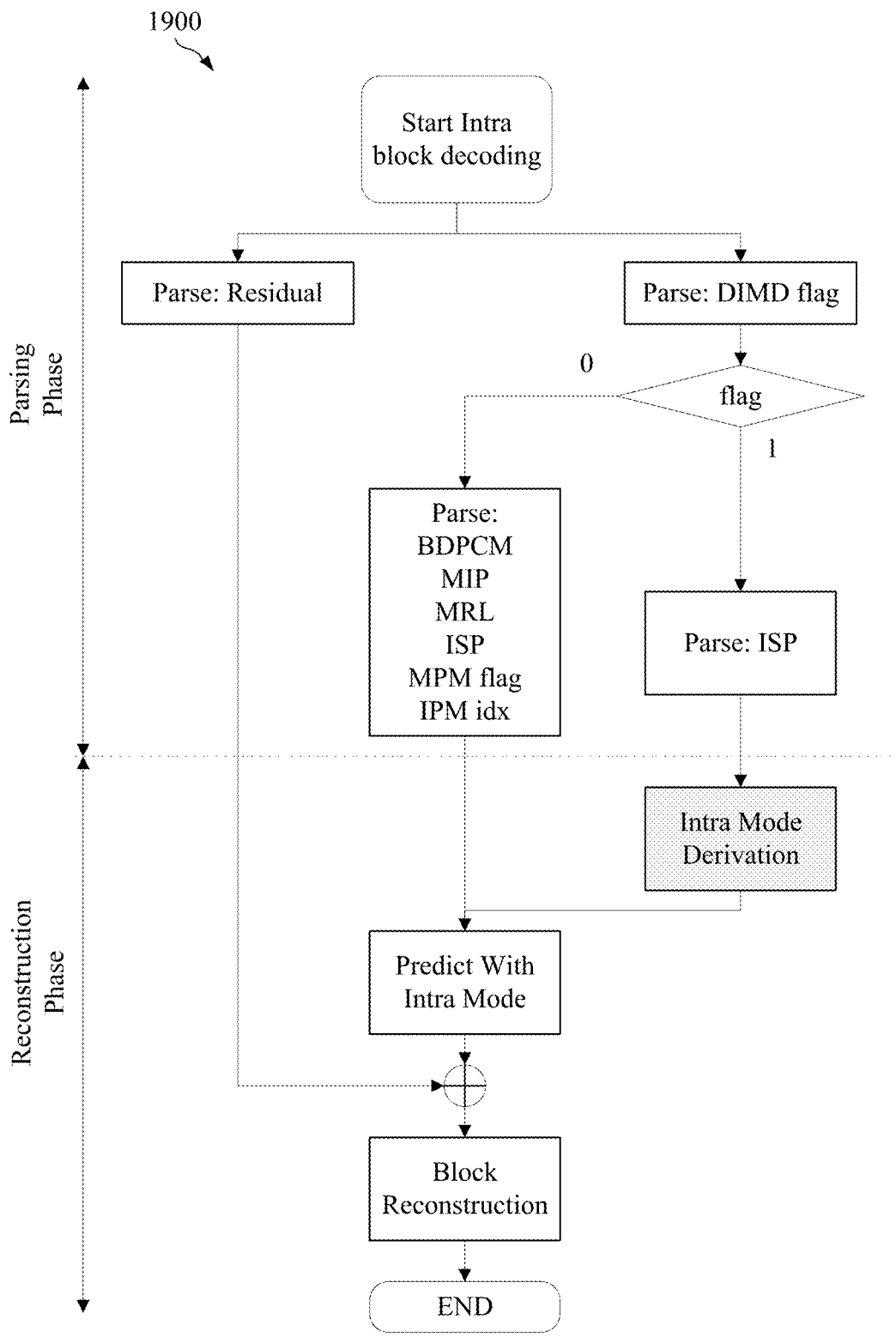
FIG. 19 is a schematic diagram of an example order of parsing flags and/or indices.

The modifications to signalling are discussed in further detail. FIG. 19 is a schematic diagram 1900 of an example order of parsing flags and/or indices in VTM5, integrated with the proposed DIMD described above. As can be seen in the diagram 1900, the DIMD flag of the block is parsed first using a single CABAC context, which is initialized to a default value of 154.

If flag==0, then the parsing continues normally. On the other hand, if flag==1, only the ISP index is parsed and the following flags/indices are inferred to be zero: BDPCM flag, MIP flag, and MRL index. In this case, the entire intra prediction mode (IPM) parsing is also skipped.

During the parsing phase in the diagram 1900, when a regular non-DIMD block inquires the IPM of its DIMD neighbor, the mode PLANAR_IDX is used as the virtual IPM of the DIMD block.

Figure 20:
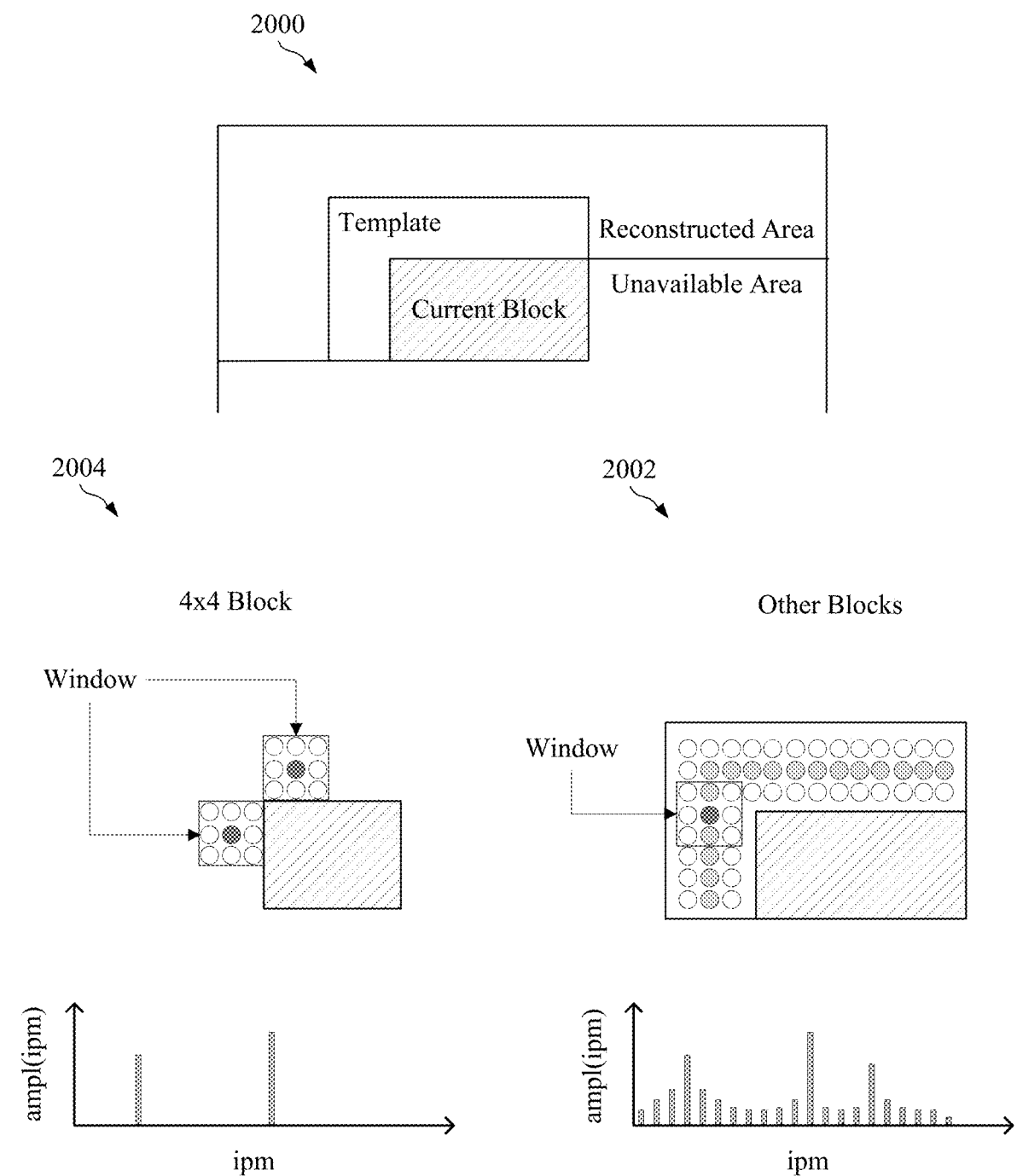
FIG. 20 is a schematic diagram of an example of a template around a current block, and performing a histogram of gradients computation by applying horizontal and vertical Sobel filters on pixels in the template.

The modifications to texture analysis are described in further detail. The texture analysis of DIMD includes a HoG computation. FIG. 20 includes a schematic diagram 2000 of an example template around a current block, as well as schematic diagrams 2002, 2004 of examples of performing the HoG computation by applying horizontal and vertical Sobel filters on pixels in a template of width 3 around the current block. However, if the above-described template pixels fall into a different CTU, then those template pixels will not be used in the texture analysis. Once computed, the IPMs corresponding to the two tallest histogram bars are selected for the block.

Previously, all pixels in the middle line of the template were involved in the HoG computation, as shown in the schematic diagram 2002. However, examples described herein may improve the throughput of this process by applying the Sobel filter more sparsely on 4×4 blocks, such as shown in the schematic diagram 2004. Accordingly, only one pixel from the left and one pixel from above are used. In addition to reducing the number of operations for gradient computation, this property also simplifies the selection of best two modes from the HoG, because the resulting HoG histogram cannot have more than two non-zero amplitudes.

Figure 21:
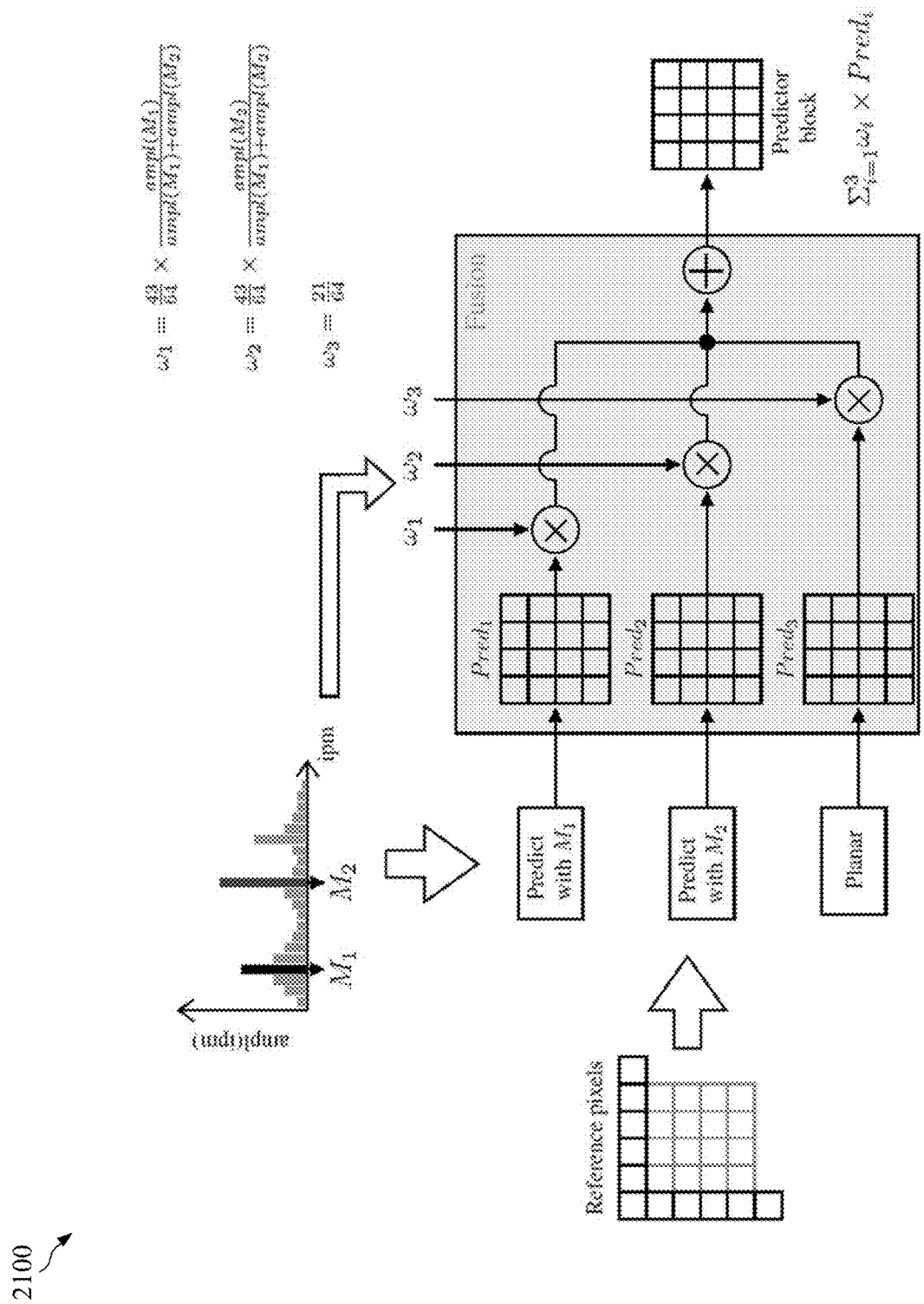
FIG. 21 is a schematic diagram of an example of fusing three predictors for each block.

The modifications to prediction fusion are described in further detail. FIG. 21 is a schematic diagram 2100 of an example of fusing three predictors for each block. The examples described herein use a choice of prediction modes that is different, and make use of the combined hypothesis intra-prediction method, where the planar mode is considered to be used in combination with other modes when computing an intra-predicted candidate. In the current version, the two IPMs corresponding to two tallest HoG bars are combined with the planar mode, such as by the fusion block in the diagram 2100.

For example, in the diagram 2100, the prediction fusion is applied as a weighted average of the above three predictors (e.g., predict with M1 (IPM), predict with M2 (IPM), and planar mode). In this example, the weight of planar ($w_3$) is fixed to $21/64$ ($\sim 1/3$). The remaining weight of $43/64$ ($\sim 2/3$) is then shared between the two HoG IPMs, proportionally to the amplitude of their HoG bars ($w_1$ and $w_2$). The output of the fusion results in a predictor block, which is a weighted average of two HoG IPMs and planar mode.

Figure 22:
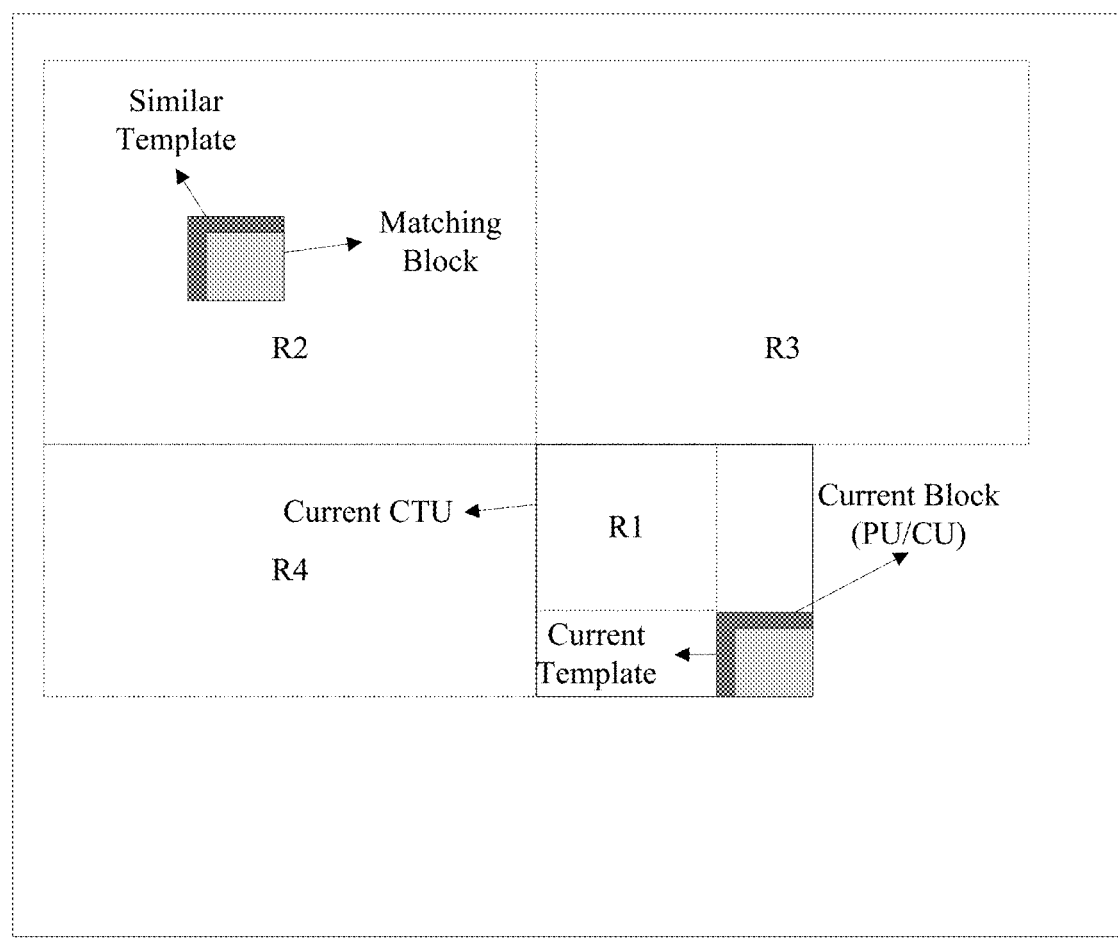
FIG. 22 is a schematic diagram of an example of an intra template matching search area.

Intra template matching is now described in further detail. FIG. 22 is a schematic diagram 2200 of an example of an intra template matching search area. Intra template matching prediction is a coding tool that is mostly adapted for screen content coding. A prediction signal is generated at the decoder side by matching an L-shaped causal neighbor of the current block with another block in a predefined search area, such as the search area illustrated in the diagram 2200. Specifically, the search area is divided into three regions in addition to the region within the current CTU, which is R1 in the example of FIG. 22.

A first region is to the upper-left outside of the current CTU, which is represented by R2 in the diagram 2200. A second region is above the current CTU, which is represented by R3 in the diagram 2200. A third region is to the left of the current CTU, which is represented by R4 in the diagram 2200.

Within each region, the decoder searches for the template the has least SAD with respect to the current template (e.g., within the current CTU) and uses its corresponding block as a prediction block. The dimensions of all regions (SearchRange_w, SearchRange_h) are set proportional to the block dimension (BlkW, BlkH) in order to have a fixed number of SAD comparisons per pixel. Accordingly, SearchRange_w=a*BlkW, and SearchRange_h=a*BlkH, where 'a' is a constant that controls a gain/complexity trade-off.

The following are example technical problems solved by disclosed embodiments. Dyadic dimensions describe a case where the width and height of a block must be in a form a $2^N$, wherein N is a positive integer. TIMD, DIMD, and intra template matching should be modified to adapt to blocks with non-dyadic dimensions.

Figure 23:
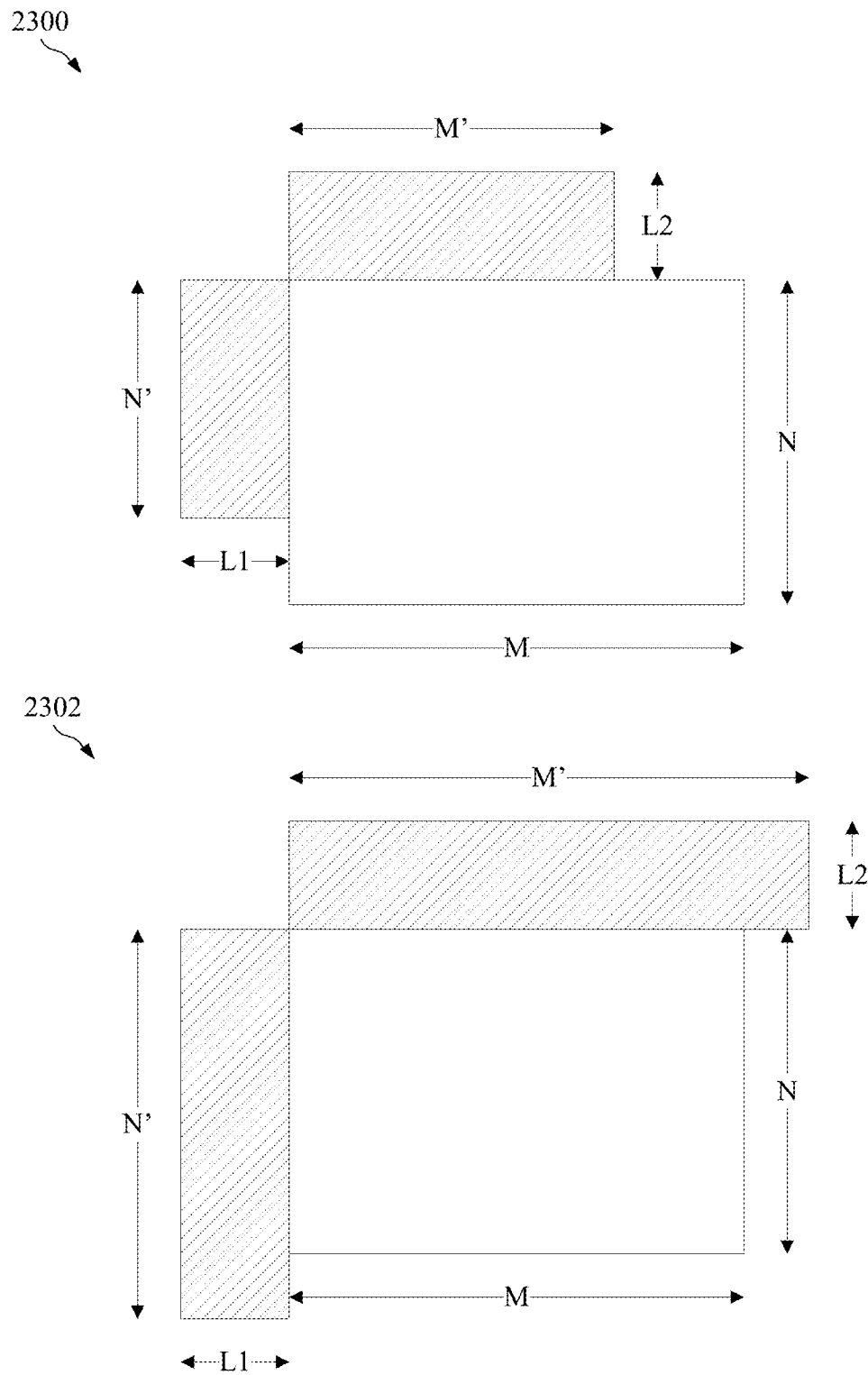
FIG. 23 is a schematic diagram of examples of a template and its reference samples used in TIMD for a non-dyadic block.
Figure 24:
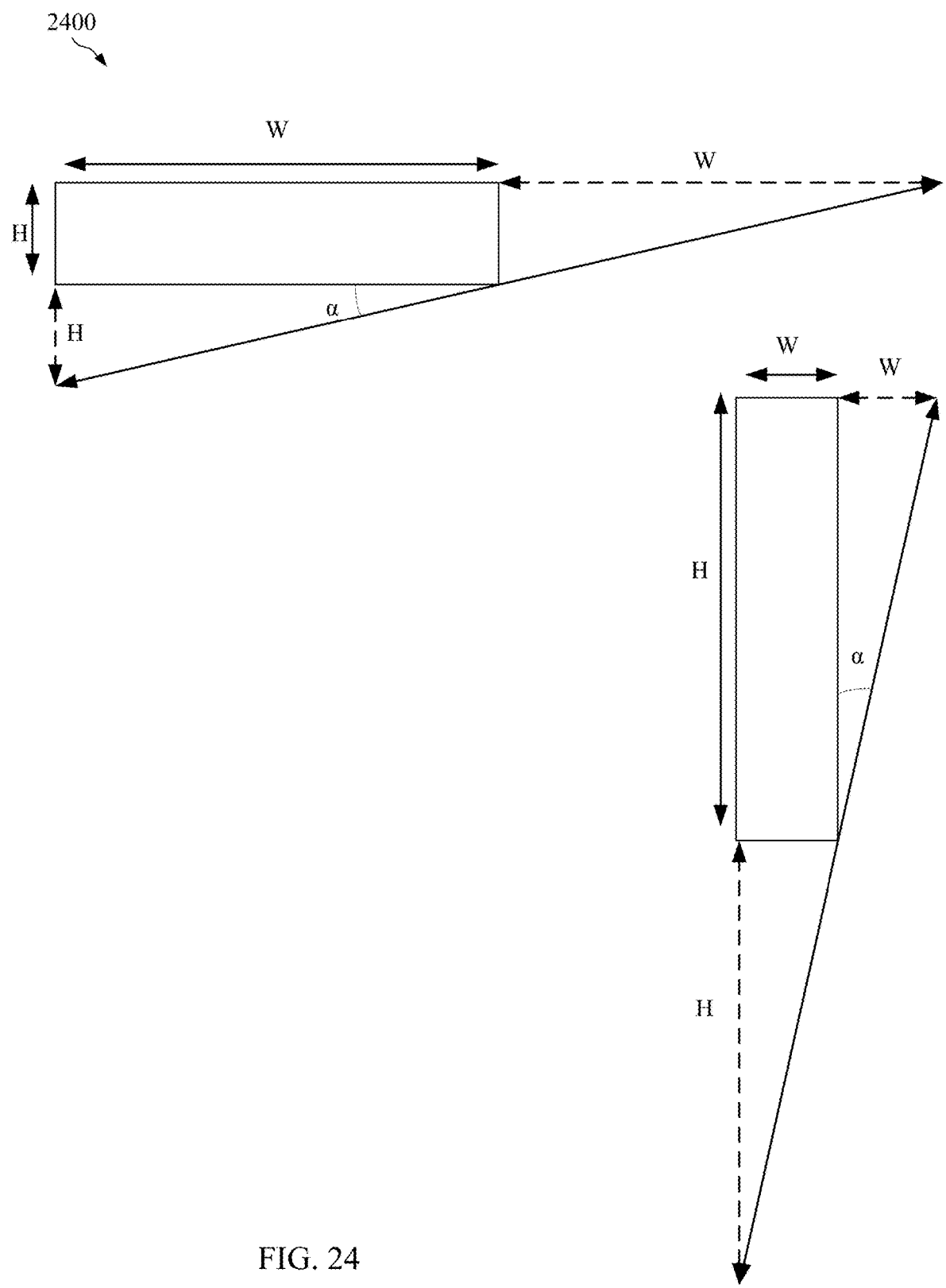
FIG. 24 is a schematic diagram of an example threshold angles used to determine a threshold mode (ThresMode), which can be used when determining a difference between a signaled wide angle intra prediction (sigpredMode) and a final wide angle intra prediction (finalpredMode) when contextual signaling is used for WAIP in non-dyadic blocks.

FIGS. 23 and 24 are used to describe certain aspects of the following examples. FIG. 23 includes schematic diagrams 2300, 2302 that are examples of a template and its reference samples used in TIMD for a non-dyadic block. FIG. 23 is described further below. FIG. 24 is a schematic diagram 2400 of an example threshold angles used to determine a threshold mode (ThresMode), which can be used when determining a difference between a signaled wide angle intra prediction (sigpredMode) and a final wide angle intra prediction (finalpredMode) when contextual signaling is used for WAIP in non-dyadic blocks. For example, an angle α may be used to determine ThresMode. As shown in diagram 2400, the angle α can be determined based on a height (H) and a width (W) of a block. For example, angle α can be determined based on $$\arg\min_{\alpha}\{\tan\alpha \geq H/W\}$$

or $$\arg\max_{\alpha}\{\tan\alpha \leq H/W\},$$

as shown in diagram 2400. Accordingly, sigpredMode for a dyadic block and finalpredMode for a non-dyadic block can be related be a function known to both an encoder and a decoder, and ThresMode can be used to prevent finalpredMode from extending past a predetermined angular distance with respect to the current block. In this way, the signaling for WAIP need not be altered for non-dyadic blocks. The encoder can determine the finalpredMode to code the non-dyadic block and signal the corresponding sigpredMode. Further, the decoder can read the sigpredMode and infer the finalpredMode based on the function and the fact that the block is non-dyadic. In effect, this approach alters angular intra prediction modes for non-dyadic blocks and converts the non-dyadic alters angular intra prediction modes into a form that can be signaled for dyadic blocks, and hence signaling for WAIP is not changed.

Disclosed herein are mechanisms to address one or more of the problems listed above. For example, a TIMD mode may be configured for application to a dyadic block, and hence may not operate correctly when the block is non-dyadic. Accordingly, the disclosed mechanisms disallow and/or alter such TIMD mode application when the block in non-dyadic to allow the functionality to perform correctly when non-dyadic blocks are employed. In a first example, a TIMD mode may be disallowed whenever a non-dyadic block is employed. In such a case, codewords used to signal usage of TIMD may be omitted, and a decoder can infer by the absence of such codewords that TIMD is not used. In other examples, TIMD is altered to operate correctly on non-dyadic blocks, such as whether the template/current block with dimensions W×H is a non-dyadic block or a dyadic block. In an example, prediction and cost for a template of a block depends on whether the block is a dyadic block or a non-dyadic block. For example, the width M' of an above template used to calculate a cost in TIMD may not be equal to the width M of a current block. If M'<M, where M is non-dyadic, then M' may equal $2^{\lfloor log_2 M \rfloor}$. On the other hand, if M'>M, where M is non-dyadic, then M' may equal $2^{\lceil log_2 M \rceil}$. Similarly, the height N' of a left template used to calculate a cost in TIMD may not be equal to the height N of the current block. If N'<N, where N is non-dyadic, then N' may equal $2^{\lfloor log_2 N \rfloor}$. On the other hand, if N'>N, where N is non-dyadic, then N' may equal $2^{\lceil log_2 N \rceil}$. A feature, denoted as D, may be derived for a template used in TIMD based on whether the template/current block with dimensions W×H is a non-dyadic block. For example, D may be derived based on reconstruction samples in a left column neighboring the template and/or reconstruction samples in an above row neighboring the template (e.g., instead of selected all neighboring samples). The selected samples may be spatially consecutive, spatially non-consecutive, selected by a step function, etc.

In an example, wide angle intra prediction includes a set of directional prediction modes that point from a current block to a reference sample used to predict the current block. Wide angle intra prediction can be altered by employing contextual signaling based on whether the block is dyadic or non-dyadic. For example, a codeword can indicate a signaled wide angle intra prediction (sigpredMode) used for a dyadic block. However, when the block is non-dyadic, a predetermined algorithm can be used to determine a final wide angle intra prediction (finalpredMode) based on the sigpredMode. For example, finalpredMode may be a function of sigpredMode, block height (H), block width (W), a predetermined integer value, a threshold mode (ThresMode), etc. ThresMode may be an angle equal to $$\arg\min_{\alpha}\{\tan\alpha \geq H/W\},$$

an angle equal to $$\arg\max_{\alpha}\{\tan\alpha \leq H/W\},$$

a function of a mode difference (modeDiff), a function of $\lfloor log_2 W \rfloor$ and $\lfloor log_2 H \rfloor$, or combinations thereof.

In an example, a padding process can be employed to substitute for unavailable neighboring samples in a template used in TIMD prior to performing intra prediction on a dyadic block (e.g., based on the template used in TIMD). The padding process may be altered by only requiring a dyadic number of left neighboring samples and a dyadic number of above neighboring samples be obtained prior to intra prediction based on TIMD. In this way, the padding process functionality can be preserved for a non-dyadic block (or template used in TIMD). In an example, CCLM may use luma samples to predict chroma samples for use in a template used in TIMD prior to performing intra prediction on a dyadic block (e.g., based on the template used in TIMD). The CCLM process may be altered by only using a dyadic number of left neighboring samples and a dyadic number of above neighboring samples, instead of all neighboring samples, when CCLM is applied to a non-dyadic block (or template). In this way, the functionality of CCLM is preserved when applied to a non-dyadic block (or template used in TIMD). In an example, planar mode codes a block using TIMD based on prediction sample values at a positions (x, y) (predSamples[x][y]). Planar mode can be altered by employing different equations to derive predSamples[x][y] when a non-dyadic block or template is employed. In this way, planar mode can select the correct prediction samples in a non-dyadic block (or template used in TIMD) to operate correctly.

Accordingly, to address the problems mentioned above, several methods are disclosed to allow TIMD to be applied correctly for non-dyadic blocks or templates. The methods result in achieving better coding performance and/or more accurate results.

The detailed embodiments below should be considered as examples to explain general concepts. These embodiments should not be interpreted in a narrow way. Furthermore, these embodiments can be combined in any manner. In the following discussion, QT, BT, TT, UQT, and ETT may refer to QT split, BT split, TT split, UQT split and ETT split, respectively. In the following discussion, a block is a dyadic block if both width and height are dyadic numbers, which are numbers in a form of a $2^N$ with N being a positive integer. In the following discussion, a block is a non-dyadic block if at least one of width and height is a non-dyadic number, which cannot be represented in a form of a $2^N$ with N being a positive integer. In the following discussion, split and partitioning have the same meaning.

In an example, W1 and W2 are related to W. In one example, W1 is calculated as $1 << \lfloor \log_2 W \rfloor$ and W2 is calculated as $1 << \lceil \log_2 W \rceil$. In an example, H1 and H2 are related to H. In one example, H1 is calculated as $1 << \lfloor \log_2 H \rfloor$ and H2 is calculated as $1 << \lceil \log_2 H \rceil$. Stated differently, H can be split into H1 and H2 and W can be split into W1 and W2, respectively. Further, for non-dyadic blocks H1 or H2 can be set to a dyadic value. Further, for non-dyadic blocks W1 or W2 can be set to a dyadic value.

In an example, TIMD may refer to DIMD, intra template matching, and any other template-based intra prediction methods in video coding. Alternatively, the TIMD may also refer to any coding tool that requires an intra signal generation from a template (e.g., combination of intra and inter prediction (CIIP) mode).

Example 1

In one example, whether to apply and/or how to apply TIMD for an intra-coded block may depend on whether a block is a dyadic block or a non-dyadic block. In an example, TIMD may be disabled for a non-dyadic block. Whether to and/or how to indicate the usage of TIMD for a block may depend on whether the block is a dyadic block or a non-dyadic block. In one example, the syntax element related to the TIMD (e.g., indicating the usage of TIMD) for the block may not be signaled for a non-dyadic block. For example, the syntax element may be inferred to be 0 (e.g., the TIMD is not used).

Example 2

In one example, a mechanism to derive the prediction and the cost for the template of a block may depend on whether a block is a dyadic block or a non-dyadic block. Referring to FIG. 23, diagrams 2300, 2302 are examples of a template and its reference samples used in TIMD for a non-dyadic block.

In one example, the width M' of the above template used to calculate a cost in TIMID may be not equal to the width M of the current block. In one example, M'<M if M is non-dyadic as shown in the diagram 2300. For example, $M'=2^{\lfloor \log_2 M \rfloor}$. In another example, M'>M if M is non-dyadic as shown in the diagram 2303. For example, $M'=2^{\lceil \log_2 M \rceil}$.

In one example, the height N' of the left template used to calculate a cost in TIMD may be not equal to the height N of the current block. In one example, N'<N if N is non-dyadic as shown in the diagram 2300. For example, $N'=2^{\lfloor \log_2 N \rfloor}$. In one example, N'>N if N is non-dyadic as shown in the diagram 2302. For example, $N'=2^{\lceil \log_2 N \rceil}$.

Example 3

How to derive a feature (denoted as D) for a template used in TIMD may depend on whether the template/current block with dimensions W×H is a non-dyadic block. Suppose S(x, y) is the reconstructed sample value for a sample at position (x, y) and the top-left position of the template (e.g., left template, or above template) is (xCurr, yCurr). In the following description, reconstruction samples in a left column neighboring (e.g., adjacent or non-adjacent) the template and/or reconstruction samples in an above row neighboring (e.g., adjacent or non-adjacent) the template may be used to derive D.

For example, D may refer to a DC prediction value for a template used in TIMD. As another example, D may refer to a gradient based value, such as amplitude values of a histogram of gradients, for a template used in DIMD Example 4

In one example, W1 and/or W2 and/or H1 and/or H2 may be used to calculate D.

In one example, if the template/current block is a non-dyadic block, D may be derived using the spatially consecutive multiple samples within the template. In some examples, the total number of samples to be used are restricted to be dyadic. In one example, the spatially consecutive multiple samples in a selected above row shall start from the same x-coordinate being equal to xCurr. In an example, the spatially consecutive multiple samples in a selected above row may start from the same x-coordinate being greater than to xCurr. In one example, the spatially consecutive multiple samples in a selected left column shall start from the same y-coordinate being equal to yCurr. In one example, the spatially consecutive multiple samples in a selected left column shall start from the same y-coordinate being greater than yCurr.

In one example, if the template/current block is a non-dyadic block, D may be derived using spatially non-consecutive multiple samples within the template. In some examples, the total number of samples to be used are restricted to be dyadic. In one example, at least two of the samples in a selected above row are not located next to each other. In one example, at least two of the samples in a selected left column are not located next to each other.

In one example, if the template/current block is a non-dyadic block, D may be calculated as $$D = \frac{P + Q + \text{offset}}{N}.$$

In the following examples, W' may be replaced by W, W1, or W2, H' may be PGP-replaced by H, H1, or H2. In one example, $P=\Sigma_{k=0}^{W'-1} S(k+x\text{Curr}, y\text{Curr}-\text{RefLy})$, $Q=\Sigma_{k=0}^{H'-1} S(x\text{Curr}-\text{RefLx}, y\text{Curr}+k)$, and N=W'+H'. Offset is an integer such as 0 or N/2. RefLx and RefLy represent the reference line, starting from 1. For example, RefLx=1 (indicating the left adjacent column) or 2, and RefLy=1 (indicating the above adjacent row) or 2. In one example, P=0, $Q=\Sigma_{k=0}^{H'-1} S(x\text{Curr}-\text{RefLx}, y\text{Curr}+k)$, and N=H' if neighboring samples above to the template are unavailable. In one example, $P=\Sigma_{k=0}^{W'-1}S(k+xCurr, yCurr-RefLy)$, Q=0, and N=W' if neighboring samples left of the template are unavailable. In one example, N must be a dyadic number. In one example, if W is a dyadic number and H is a non-dyadic number, $P=\Sigma_{k=0}^{W-1}S(k+xCurr, yCurr-RefLy)$, Q=0, and N=W. In one example, if H is a dyadic number and W is a non-dyadic number, P=0, $Q=\Sigma_{k=0}^{H-1}S(xCurr-RefLx, yCurr+k)$, and N=H. In one example, if both W and H are non-dyadic numbers, W' is set to be W1 or W2, and H' is set to be H1 or H2 in previous examples. In one example, if both W and H are non-dyadic numbers, but W+H is dyadic, $P=\Sigma_{k=0}^{W-1}S(k+xCurr, yCurr-RefLy)$, $Q=\Sigma_{k=0}^{H-1}S(xCurr-RefLx, yCurr+k)$, and N=W+H. In one example, if W'>=H' (or W'>H'), set $P=\Sigma_{k=0}^{W'-1}S(k+xCurr, yCurr-RefLy)$, Q=0, and N=W'. In one example, if H'>=W' (or H'>W'), set P=0, $Q=\Sigma_{k=0}^{H'-1}S(xCurr-RefLx, yCurr+k)$, and N=H'. In one example, the reconstructed samples used to derive D may be generated by sample padding or sample substitution.

Example 5

In one example, if the template/current block is a non-dyadic block, selected samples may be used to calculate D.

In one example, if W is a non-dyadic number, S(k×F+xCurr+xOff, yCurr-RefLy) may be used to calculate D, wherein F is a step size such as 2 or 4 and k is an index for the samples to be used. xOff is an offset in the x direction. For example, xOff=0, W/8, W/4, W/2−1, W/2, W/2+1, or W−1. RefLy represents the reference line. For example, RefLy=1 or 2. In one example, the number of valid k, denoted as N1, should be a dyadic number. k is from 0 to N1−1. For example, N1=W2/F. For example, F=W−1, and k is from 0 to 1. For example, N1=4, xOff=W/8, F=W/4, k is from 0 to 3. For example, N1=2, xOff=W/4, F=W/2, k is from 0 to 1. For example, N1=8, xOff=W/16, F=W/8, k is from 0 to 7. For example, N1=R (R is dyadic, R<W), xOff=W/2R, F=W/R, k is from 0 to R−1.

In one example, if H is a non-dyadic number, S(xCurr-RefLx, k×F+yCurr+yOff) may be used to calculate D, wherein F is a step size such as 2 or 4 and k is an index for the samples to be used. yOff is an offset in the y direction. For example, yOff=0, H/8, H/4, H/2−1, H/2, H/2+1, or H−1. RefLx represents the reference line. For example, RefLx=1 or 2. In one example, the number of valid k, denoted as N2, should be a dyadic number. k is from 0 to N2−1. For example, N2=H2/F. For example, F=H−1, and k is from 0 to 1. For example, N2=4, yOff=H/8, F=H/4, k is from 0 to 3. For example, N2=2, yOff=H/4, F=H/2, k is from 0 to 1. For example, N2=8, yOff=H/16, F=H/8, k is from 0 to 7. For example, N2=R (R is dyadic, R<H), yOff=H/2R, F=H/R, k is from 0 to R−1.

In one example, D may be calculated as $$D = \frac{P + Q + \text{offset}}{N}.$$

In one example, $P=\Sigma_{k=0}^{N1-1}S(k\times F+xCurr+xOff, yCurr-RefLy)$, $Q=\Sigma_{k=0}^{N2-1}S(xCurr-RefLx, k\times F+yCurr+yOff)$, and N=N1+N2. Offset is an integer such as 0 or N/2. In one example, $P=\Sigma_{k=0}^{N1-1}S(k\times F+xCurr+xOff, yCurr-RefLy)$, Q=0, and N=N1. Offset is an integer such as 0 or N/2. In one example, P=0, $Q=\Sigma_{k=0}^{N2-1}S(xCurr-RefLx, k\times F+yCurr+yOff)$, and N=N2. Offset is an integer such as 0 or N/2.

In one example, W' may be replaced by W, W1, or W2 and H' may be replaced by H, H1, or H2 when deriving D. In one example, whether to replace W' by W, W1, or W2 may depend on whether W is a dyadic number or not. For example, W' is replaced by W when W is a dyadic number. For example, W' is replaced by W1 or W2 when W is a non-dyadic number. In one example, whether to replace H' by H, H1, or H2 may depend on whether H is a dyadic number or not. For example, H' is replaced by H when H is a dyadic number. For example, H' is replaced by H1 or H2 when H is a non-dyadic number. If W'>H' (or W'>=H'), $P=\Sigma_{k=0}^{N1-1}S(k\times F+xCurr+xOff, yCurr-RefLy)$, Q=0, and N=N1. Offset is an integer such as 0 or N/2. In one example, N1=W', F=1, xOff=0. If H'>W' (or H'>=W'), P=0, $Q=\Sigma_{k=0}^{N1-1}S(xCurr-RefLx, k\times F+yCurr+yOff)$, and N=N2. Offset is an integer such as 0 or N/2. In one example, N2=H', F=1, and yOff=0. In one example, if W' is equal to H', $P=\Sigma_{k=0}^{N1-1}S(k\times Fx+xCurr+xOff, yCurr-RefLy)$, $Q=\Sigma_{k=0}^{N2-1}S(xCurr-RefLx, k\times Fy+yCurr+yOff)$, and N=N1+N2. Offset is an integer such as 0 or N/2. In one example, N1=N2=W'=H', Fx=Fy=1, and xOff=yOff=0. If N1>N2 (or N1>=N2), $P=\Sigma_{k=0}^{N1-1}S(k\times F+xCurr+xOff, yCurr-RefLy)$, Q=0, and N=N1. Offset is an integer such as 0 or N/2. If N2>N1 (or N2>=N1), P=0, $Q=\Sigma_{k=0}^{N2-1}S(xCurr-RefLx, k\times F+yCurr+yOff)$, and N=N2. Offset is an integer such as 0 or N/2.

Example 6

In one example, if both left and above neighboring samples are available, N1 above neighboring samples and N2 left neighboring samples are used to derive D. N1 should be equal to N2, and both N1 and N2 should be dyadic numbers. In one example, when deriving D, padding (or substitution) may be applied to neighboring rows/columns (adjacent or non-adjacent), and the padded (or substituted) samples may be utilized.

Example 7

In an example, a wide angle intra-prediction is used and the intra prediction process (e.g., according to a mapped/derived intra-prediction mode) should be adjusted depending on whether the current block is a dyadic block or a non-dyadic block, and/or whether TIMD mode is applied on the block.

Example 8

In one example, an intra-prediction mode (denoted as finalPredMode) used to generate the intra-prediction is derived based on a signaled intra-prediction mode (denoted as SigpredMode) if the current block is a non-dyadic block with dimensions W×H. In one example, finalPredMode=SigpredMode in condition A. For example, condition A is that W is equal to H. In one example, W/H, H/W, or any form of the function input with W and H is calculated and used to derive finalPredMode. For example, r=W>H? (L×W/H). (L×H/W) is calculated and used to derive finalPredMode, wherein L is an integer such as 32. In one example, r may be stored and retrieved in a table. The indices of the table may depend on W and/or H.

In one example, finalPredMode=SigpredMode+M in condition B, wherein M is an integer such as 65. In one example, M may depend on the number of intra-prediction modes T (e.g., M=T−2). In one example, M may depend on whether TIMD is applied on the block (e.g., M=65 if TIMD is not applied while M=129 if TIMD is applied). For example, condition B is that W>H and SigpredMode<ThresMode. In one example, ThresMode corresponds to an angle equal $$\text{to arg}\min_{\alpha}\{\tan\alpha \geq H/W\}$$

as shown in diagram 2400. In one example, ThresMode corresponds to an angle equal to $$\arg\max_{\alpha}\{\tan\alpha \leq H/W\}$$

as shown in diagram 2400. In one example, ThresMode=M1+modeDiff. In one example, M1=2. In one example, M1 may depend on the number of intra-prediction modes. In one example, M1 may depend on whether TIMD is applied on the block. In one example, modeDiff is derived as the largest integer that satisfies AngT[midAng+modeDiff] <=r, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, midAng=17. In one example, modeDiff is derived as the largest integer that satisfies AngT[midAng+modeDiff]×H<=L×W, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. In an example, L=32. AngT and/or midAng and/or L may depend on the number of intra-prediction modes and/or whether TIMD is applied on the block. For example, L=32 if TIMD is not applied while L=64 if TIMD is applied. For example, midAng=17 if TIMD is not applied while midAng=33 if TIMD is applied. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024} if TIMD is not applied while AngT[ ]={0, 1, 2, 3, 4, 5, 6, 7, 8, 10, 12, 14, 16, 18, 20, 22, 24, 26, 28, 30, 32, 34, 36, 38, 40, 43, 46, 49, 52, 55, 58, 61, 64, 67, 70, 74, 78, 84, 90, 96, 102, 108, 114, 121, 128, 137, 146, 159, 172, 188, 204, 230, 256, 299, 342, 427, 512, 597, 682, 853, 1024, 1536, 2048, 3072} if TIMD is applied.

In one example, ThresMode may be calculated based on $\lfloor\log_2 W\rfloor$ and $\lfloor\log_2 H\rfloor$. In one example, ThresMode=M1+T[|$\lfloor\log_2 W\rfloor$−$\lfloor\log_2 H\rfloor$|], wherein T is a table. For example, T={0, 6, 10, 12, 14, 15}. In one example, M1=2. T and/or M1 may depend on the number of intra-prediction modes and/or whether TIMD is applied on the block. For example, T={0, 6, 10, 12, 14, 15} if TIMD is not applied while T={0, 11, 19, 23, 27, 29} if TIMD is applied.

In one example, ThresMode may be calculated based on $\lceil\log_2 W\rceil$ and $\lceil\log_2 H\rceil$. In one example, ThresMode=M1+T[|$\lceil\log_2 W\rceil$−$\lceil\log_2 H\rceil$|], wherein T is a table. For example, T={0, 6, 10, 12, 14, 15}. In one example, M1=2. T and/or M1 may depend on the number of intra-prediction modes and/or whether TIMD is applied on the block. For example, T={0, 6, 10, 12, 14, 15} if TIMD is not applied while T={0, 11, 19, 23, 27, 29} if TIMD is applied.

In one example, ThresMode may be derived base on a table. The table may be indexed by W and/or H. The table may be indexed by $\lfloor\log_2 W\rfloor$ and/or $\lfloor\log_2 H\rfloor$. The table may be indexed by $\lceil\log_2 W\rceil$ and $\lceil\log_2 H\rceil$.

In one example, finalPredMode=SigpredMode−M in condition C, wherein M is an integer such as 65. In one example, M may depend on the number of intra-prediction modes T (e.g., M=T−2). In one example, M may depend on whether TIMD is applied on the block (e.g., M=65 if TIMD is not applied while M=129 if TIMD is applied). For example, condition C is that W<H and SigpredMode>ThresMode. In one example, ThresMode corresponds to an angle equal $$\text{to arg}\min_{\alpha}\{\tan\alpha \geq W/H\}$$

as shown in diagram 2400. In one example, ThresMode corresponds to an angle equal $$\text{to arg}\max_{\alpha}\{\tan\alpha \leq W/H\}$$

as shown in diagram 2400. In one example, ThresMode=M2-modeDiff. In one example, M2=66. In one example, M2 may depend on the number of intra-prediction modes. In one example, M2 may depend on whether TIMD is applied on the block. For example, M2=66 if TIMD is not applied while M2=130 if TIMD is applied. In one example, modeDiff is derived as the largest integer that satisfies AngT[midAng+modeDiff]<=r, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, midAng=17. In one example, modeDiff is derived as the largest integer that satisfies AngT[midAng+modeDiff]×W<=L×H, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, L=32. AngT and/or midAng and/or L may depend on the number of intra-prediction modes and/or whether TIMD is applied on the block. For example, L=32 if TIMD is not applied, while L=64 if TIMD is applied. For example, midAng=17 if TIMD is not applied, while midAng=33 if TIMD is applied. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024} if TIMD is not applied, while AngT[ ]={0, 1, 2, 3, 4, 5, 6, 7, 8, 10, 12, 14, 16, 18, 20, 22, 24, 26, 28, 30, 32, 34, 36, 38, 40, 43, 46, 49, 52, 55, 58, 61, 64, 67, 70, 74, 78, 84, 90, 96, 102, 108, 114, 121, 128, 137, 146, 159, 172, 188, 204, 230, 256, 299, 342, 427, 512, 597, 682, 853, 1024, 1536, 2048, 3072} if TIMD is applied. In one example, ThresMode may be calculated based on $\lfloor\log_2 W\rfloor$ and $\lfloor\log_2 H\rfloor$. In one example, ThresMode=M2−T[|$\lfloor\log_2 W\rfloor$−$\lfloor\log_2 H\rfloor$|], wherein T is a table. For example, T={0, 6, 10, 12, 14, 15}. In one example, M2=66. T and/or M2 may depend on the number of intra-prediction modes and/or whether TIMD is applied on the block. For example, T={0, 6, 10, 12, 14, 15} if TIMD is not applied, while T={0, 11, 19, 23, 27, 29} if TIMD is applied. For example, M2=66 if TIMD is not applied, while M2=130 if TIMD is applied. In one example, ThresMode may be calculated based on $\lceil\log_2 W\rceil$ and $\lceil\log_2 W\rceil$. In one example, ThresMode=M2−T[|$\lceil\log_2 W\rceil$−$\lceil\log_2 H\rceil$|], wherein T is a table. For example, T={0, 6, 10, 12, 14, 15}. In one example, M2=66. T and/or M2 may depend on the number of intra-prediction modes and/or whether TIMD is applied on the block. For example, T={0, 6, 10, 12, 14, 15} if TIMD is not applied, while T={0, 11, 19, 23, 27, 29} if TIMD is applied. For example, M2=66 if TIMD is not applied, while M2=130 if TIMD is applied. In one example, ThresMode may be derived base on a table. The table may be indexed by W and/or H. The table may be indexed by $\lfloor\log_2 W\rfloor$ and/or $\lfloor \log_2 H \rfloor$. The table may be indexed by $\lceil \log_2 W \rceil$ and $\lceil \log_2 H \rceil$. In one example, finalPredMode=SigpredMode by default (no condition is satisfied).

Example 9

In one example, a substitution process, also known as extension, padding, and/or extrapolation, for unavailable neighboring samples, adjacent to or non-adjacent to a template with dimensions W×H used in TIMD may depend on whether W and/or H is a dyadic number or not. In one example, the length of samples (denoted as H') left of the template that are required in the intra-prediction process for the template may depend on whether W and/or H is a dyadic number or not. Some or all of the H' samples may be obtained by the substitution process. In one example, H'=max(H1, H2) if W and/or H is a non-dyadic number. In an example, H'=max(H1, H2) if H is a non-dyadic number. For example, H1=2×H, and H2=W+H. In one example, the length of samples (denoted as W') above to the template that are required in the intra-prediction process for the template may depend on whether W and/or H is a dyadic number or not. Some or all of the W' samples may be obtained by the substitution process. In one example, W'=max(W1, W2) if W and/or H is a non-dyadic number. For example, W'=max(W1, W2) if W is a non-dyadic number. For example, W1=2×W, and W2=W+H.

Example 10

In an example, the neighboring samples, adjacent to or non-adjacent to the current block, for a cross-component prediction mode such as CCLM mode on a template in TIMD with dimensions W×H may depend on whether W and/or H is a dyadic number or not. The CCLM mode may be CCLM, CCLM-left, CCLM-above or any other CCLM modes such as Multi-Model CCLM. In one example, the length of samples (denoted as H') left of the template that are used in CCLM may depend on whether W and/or H is a dyadic number or not. Some or all of the H' samples may be obtained by the substitution process. In one example, H'=max(H1, H2) if W and/or H is a non-dyadic number. In an example, H'=max(H1, H2) if H is a non-dyadic number. In an example, H1=2×H, and H2=W+H. In one example, the length of samples (denoted as W') above to the template that are used in CCLM may depend on whether W and/or H is a dyadic number or not. Some or all of the W' samples may be obtained by the substitution process. In one example, W'=max(W1, W2) if W and/or H is a non-dyadic number. For example, W'=max(W1, W2) if W is a non-dyadic number. For example, W1=2×W, W2=W+H.

Example 11

In one example, a mechanism to conduct planar intra-prediction mode on a template in TIMD with dimensions W×H may depend on whether W and/or H is a dyadic number or not. In one example, if both W and H are dyadic numbers, planar intra-prediction mode is conducted with a first mechanism. The first mechanism may be according to VVC, wherein no division operation is applied. In one example, if at least one of W and H is a non-dyadic number, planar intra-prediction mode is conducted according to a second mechanism. In the second mechanism, at least one division operation is used. In one example, the divisor may be based on W×H. For example, the divisor is equal to W×H×2. In the second mechanism, a prediction sample value predSamples[x][y] at position (x, y) is derived as below:

$$predV[x][y] = ((H - 1 - y)*p[x][-1] + (y+1)*p[-1][H])*W$$
$$predH[x][y] = ((W - 1 - x)*p[-1][y] + (x+1)*p[W][-1])*H$$
$$predSamples[x][y] = predV[x][y] + predH[x][y] + W*H/(W*H*2).$$

In the second mechanism, a prediction sample value predSamples[x][y] at position (x, y) is derived as below:

$$predV[x][y] = ((H - 1 - y)*p[x][-1] + (y+1)*p[-1][H] + H/2)/H$$
$$predH[x][y] = ((W - 1 - x)*p[-1][y] + (x+1)*p[W][-1] + W/2)/W$$
$$predSamples[x][y] = predV[x][y] + predH[x][y] + 1 \gg 1.$$

In the second mechanism, a prediction sample value predSamples[x][y] at position (x, y) is derived as below, if H is a non-dyadic number, but W is a dyadic number:

$$predV[x][y] = ((H - 1 - y)*p[x][-1] + (y+1)*p[-1][H] + H/2)/H$$
$$predH[x][y] = ((W - 1 - x)*p[-1][y] + (x+1)*p[W][-1] + W/2) \gg \log 2(W)$$
$$predSamples[x][y] = predV[x][y] + predH[x][y] + 1 \gg 1.$$

In the second mechanism, a prediction sample value predSamples[x][y] at position (x, y) is derived as below, if H is a dyadic number, but W is a non-dyadic number:

$$predV[x][y] = ((H - 1 - y)*p[x][-1] + (y+1)*p[-1][H] + H/2) \gg \log 2(H)$$
$$predH[x][y] = ((W - 1 - x)*p[-1][y] + (x+1)*p[W][-1] + W/2)/W$$
$$predSamples[x][y] = (predV[x][y] + predH[x][y] + 1) \gg 1.$$

In one example, at least one lookup table is used to replace the division operation if division is used to conduct planar intra prediction mode if at least one of W and H is a non-dyadic number. In an example of the second mechanism, no division operation is used. In one example, a prediction sample value predSamples[x][y] at position (x, y) is derived as below:

$$predV[x][y] = (((1 \ll \lfloor \text{Log}2(H) \rfloor) - 1 - y)*p[x][-1] + (y+1)*p[-1][H]) \ll \lfloor \text{Log}2(W) \rfloor$$
$$predH[x][y] = (((1 \ll \lfloor \text{Log}2(W) \rfloor) - 1 - x)*p[-1][y] + (x+1)*p[W][-1]) \ll \lfloor \text{Log}2(H) \rfloor$$
$$predSamples[x][y] = (predV[x][y] + predH[x][y] +$$

-continued $$(1 \ll \lfloor Log2(W) \rfloor) * ((1 \ll \lfloor Log2(H) \rfloor)) \gg \lfloor Log2(W) \rfloor + \lfloor Log2(H) \rfloor + 1)$$

In one example, a prediction sample value $predSamples[\ x\ ][\ y\ ]$ at position $(x, y)$ is derived as below:

$predV[\ x\ ][\ y\ ] =$ $(((1 \ll \lceil Log2(H) \rceil) - 1 - y\ ) * p[\ x\ ][\ -1\ ] + (y + 1) * p[\ -1\ ][\ H\ ]) \ll \lceil Log2(W) \rceil$ $predH[\ x\ ][\ y\ ] =$ $(((1 \ll \lceil Log2(W) \rceil) - 1 - x\ ) * p[\ -1\ ][\ y\ ] + (x + 1) * p[\ W\ ][\ -1\ ]) \ll \lceil Log2(H) \rceil$ $predSamples[\ x\ ][\ y\ ] = (\ predV[\ x\ ][\ y\ ] + predH[\ x\ ][\ y\ ] +$ $(1 \ll \lceil Log2(W) \rceil) * ((1 \ll \lceil Log2(H) \rceil)) \gg \lceil Log2(W) \rceil + \lceil Log2(H) \rceil + 1)$ In an example, the first mechanism and the second mechanism may be the same.

Figure 25:
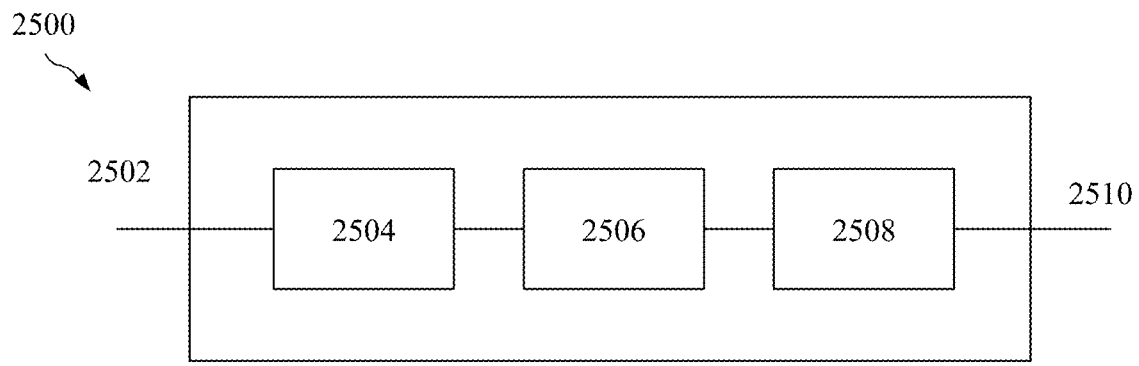
FIG. 25 is a block diagram showing an example video processing system.

FIG. 25 is a block diagram showing an example video processing system 2500 in which various embodiments disclosed herein may be implemented. Various implementations may include some or all of the components of the system 2500. The system 2500 may include input 2502 for receiving video content. The video content may be received in a raw or uncompressed format, e.g., 8- or 10-bit multi-component pixel values, or may be in a compressed or encoded format. The input 2502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2500 may include a coding component 2504 that may implement the various coding or encoding methods described in the present disclosure. The coding component 2504 may reduce the average bitrate of video from the input 2502 to the output of the coding component 2504 to produce a coded representation of the video. The coding techniques are therefore sometimes called video compression or video transcoding techniques. The output of the coding component 2504 may be either stored, or transmitted via a communication connected, as represented by the component 2506. The stored or communicated bitstream (or coded) representation of the video received at the input 2502 may be used by a component 2508 for generating pixel values or displayable video that is sent to a display interface 2510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 26:
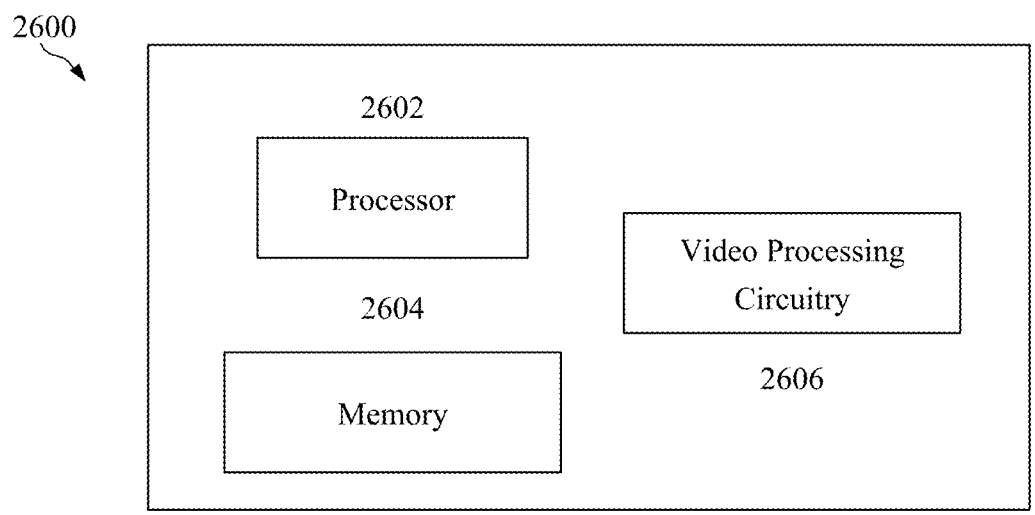
FIG. 26 is a block diagram of an example video processing apparatus.

FIG. 26 is a block diagram of an example video processing apparatus 2600. The apparatus 2600 may be used to implement one or more of the methods described herein. The apparatus 2600 may be embodied in a smartphone, tablet, computer, Internet of Things (IoT) receiver, and so on. The apparatus 2600 may include one or more processors 2602, one or more memories 2604 and video processing circuitry 2606. The processor(s) 2602 may be configured to implement one or more methods described in the present disclosure. The memory (memories) 2604 may be used for storing data and code used for implementing the methods and embodiments described herein. The video processing circuitry 2606 may be used to implement, in hardware circuitry, some embodiments described in the present disclosure. In some embodiments, the video processing circuitry 2606 may be at least partly included in the processor 2602, e.g., a graphics co-processor.

Figure 27:
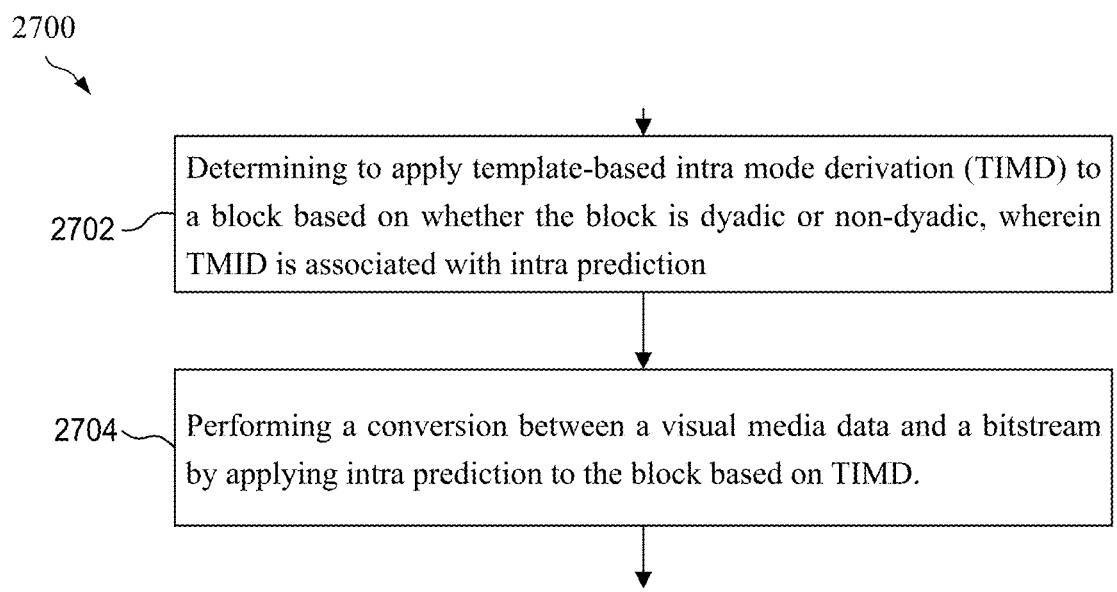
FIG. 27 is a flowchart for an example method of video processing.

FIG. 27 is a flowchart for an example method 2700 of video processing implemented by a video coding apparatus. The method 2700 includes determining to apply template-based intra mode derivation (TIMD) to a block based on whether the block is dyadic or non-dyadic at step 2702. TMID is associated with intra prediction mode(s) as described above. At step 2704, a conversion is performed between a visual media data and a bitstream by applying intra prediction to the block based on TIMD. In an example, the conversion may include encoding the visual media data into a bitstream at an encoder. In another example, the conversion may include decoding the visual media data from a bitstream at a decoder.

In an example, whether to and/or how to indicate the application of TIMD for a block may depend on whether the block is a dyadic block or a non-dyadic block. For example, a syntax element associated with TIMD can be included in the bitstream at step 2706 when the block is determined to be dyadic, but the syntax element associated with TIMD is not included in the bitstream when the block is determined to be non-dyadic. The decoder can then infer that TIMD is not used due to the lack of the syntax element in the bitstream.

In an example, calculating a cost in TIMD includes using an above template of the block and using a left template of the block, where the block has a width (W) and a height (H), where a width (W') of the above template is equal to $2^{\lfloor log_2 W \rfloor}$ or $2^{\lceil log_2 W \rceil}$, and where a height (H') of the left template is equal to $2^{\lfloor log_2 H \rfloor}$ or $2^{\lceil log_2 H \rceil}$.

In an example, the block may have a width (W) and a height (H), and block is coded based on TIMD, and a feature (D) of a template used in TIMD is determined based on a reduced width (W1) or a reduced height (H1) when the block or the template is determined to be non-dyadic. W1 is less than W and H1 is less than H, and the feature D is a DC prediction value or a gradient-based value.

In an example, the block is coded based on TIMD, and a feature D of a template used in TIMD is determined based on a dyadic number of spatially consecutive neighboring samples when the block or the template is determined to be non-dyadic. The block has a non-dyadic number of neighboring samples and the dyadic number of spatially consecutive neighboring samples is not equal to the non-dyadic number of neighboring samples, and the feature D is a DC prediction value or a gradient-based value.

In various examples, a first of the spatially consecutive neighboring samples may be positioned at a top left corner of the block, or may be positioned other than at the top left corner of the block (i.e., is not positioned at the top left corner of the block).

In an example, the block is coded based on TIMD, and a feature D of a template used in TIMD is determined based on a dyadic number of spatially non-consecutive neighboring samples when the block or the template is determined to be non-dyadic.

In an example, the block has a height (H) and a width (W), and the block is coded according to the following when the block or a template used in TIMD is determined to be non-dyadic:

$$D = \frac{P + Q + \text{offset}}{N},$$

$$P = \sum_{k=0}^{W'-1} S(k + xCurr, yCurr - RefLy),$$

$$Q = \sum_{k=0}^{H'-1} S(xCurr - RefLx, yCurr + k), \text{ and}$$

$$N = W' + H'$$

Where D is a DC prediction value, offset is an integer value, S indicates a sample value at a corresponding location, k is a sample index, xCurr is a horizontal coordinate of a top left sample of the block, yCurr is a vertical coordinate of a top left sample of the block, RefLy indicates a reference line row, RefLx indicates a reference line column, W' is a width associated with the block, and H' is a height associated with the block. H' is a dyadic height smaller than H or W' is a dyadic width smaller than W.

In an example, the block is coded based on TIMD, and a feature D of a template used in TIMD is determined based on a dyadic number of neighbor samples selected according to a step size function when the block or the template is determined to be non-dyadic.

In an example, the block is coded based on TIMD, and a feature D of a template used in TIMD is determined based on a dyadic number of above neighboring samples and a dyadic number of left neighboring samples when the block or the template is determined to be non-dyadic.

In an example, the bitstream includes a codeword indicating a wide angle intra prediction used to code the block, and the codeword indicates a signaled intra prediction (sigpredMode), which can be converted to a final wide angle intra prediction (finalpredMode) when the block or the template is non-dyadic. The finalpredMode may be a function of sigpredMode, a width (W) of the block, and a height (H) of the block.

In an example, the finalpredMode may be equal to sigpredMode plus an integer value (M) when W is greater than H and sigpredMode is less than a threshold mode (ThresMode). M is based on whether TIMD is applied, or is based on a number of intra prediction modes used in TIMD.

In an example, the finalpredMode may be equal to sigpredMode minus an integer value (M) when W is less than H and sigpredMode is greater than a threshold mode (ThresMode). M is based on whether TIMD is applied, or is based on a number of intra prediction modes used in TIMD.

In an example, the ThresMode is an angle equal to $$\underset{\alpha}{\text{argmin}}\{\tan \alpha \geq H/W\},$$

an angle equal to $$\underset{\alpha}{\text{argmax}}\{\tan \alpha \leq H/W\},$$

a function of a mode difference (modeDiff) and whether TIMD is applied, a function of modeDiff and a number of intra prediction modes used in TIMD, a function of $\lfloor \log_2 W \rfloor$ and $\lfloor \log_2 H \rfloor$, a function of $\lceil \log_2 W \rceil$ and $\lceil \log_2 H \rceil$, or combinations thereof.

In an example, the block is coded according to substitution of unavailable neighboring samples in a template used in TIMD by obtaining a dyadic number of left neighboring samples when a height (H) of the block or template is non-dyadic and obtaining a dyadic number of above neighboring samples when a width (W) of the block or template is non-dyadic.

In an example, the block is coded according to CCLM using neighboring samples in a template used in TIMD by obtaining a dyadic number of left neighboring samples when a height (H) of the block or template is non-dyadic and obtaining a dyadic number of above neighboring samples when a width (W) of the block or template is non-dyadic.

In an example, the block is coded according to a planar intra prediction mode value determined according to a division operation with a divisor based on a width (W) of a template used in TIMD and a height (H) of the template used in TIMD when the block or template is determined to be non-dyadic.

In an example, when the block being coded or the template used in TIMD is determined to be non-dyadic, the block is coded according to prediction sample values at a positions (x, y) (predSamples[x][y]) derived according to:

$$predV[\,x\,][\,y\,] = ((H - 1 - y) * p[\,x\,][-1] + (y + 1) * p[-1][\,H\,]) * W,$$

$$predH[\,x\,][\,y\,] =$$

$$((W - 1 - x) * p[-1][\,y\,] + (x + 1) * p[\,W\,][-1]) * H, \text{ and}$$

$$predSamples[\,x\,][\,y\,] =$$

$$(\,predV[\,x\,][\,y\,] + predH[\,x\,][\,y\,] + W * H) / (W * H * 2),$$

Where H is a height of the template, W is a width of the template, (x, y) are sample coordinates, and p[ ][ ] indicates neighboring samples at a corresponding coordinate.

In an example, when the block being coded or the template used in TIMD is determined to be non-dyadic, the block is coded according to prediction sample values at a positions (x, y) (predSamples[x][y]) derived according to:

$$predV[\,x\,][\,y\,] =$$

$$((H - 1 - y) * p[\,x\,][-1] + (y + 1) * p[-1][\,H\,] + H/2)/H,$$

$$predH[\,x\,][\,y\,] =$$

$$((W - 1 - x) * p[-1][\,y\,] + (x + 1) * p[\,W\,][-1] + W/2)/W, \text{ and}$$

$$predSamples[\,x\,][\,y\,] = (\,predV[\,x\,][\,y\,] + predH[\,x\,][\,y\,] + 1) \gg 1,$$

Where H is a height of the template, W is a width of the template, (x, y) are sample coordinates, >> is a right shift operator, and p[ ][ ] indicates neighboring samples at a corresponding coordinate.

In an example, when the block being coded or the template used in TIMD is determined to be non-dyadic, the block is coded according to prediction sample values at a positions (x, y) (predSamples[x][y]) derived according to:

$$predV[\,x\,][\,y\,] =$$
$$\bigl((H-1-y)*p[\,x\,][-1] + (y+1)*p[-1][\,H\,] + H/2\bigr)/H,$$
$$predH[\,x\,][\,y\,] =$$
$$\bigl((W-1-x)*p[-1][\,y\,] + (x+1)*p[\,W\,][-1] + W/2\bigr) \gg$$
$$\log2(W), \text{ and}$$
$$predSamples[\,x\,][\,y\,] = (\,predV[\,x\,][\,y\,] + predH[\,x\,][\,y\,] + 1) \gg 1,$$

Where H is a height of the template, W is a width of the template, (x, y) are sample coordinates, >> is a right shift operator, log 2 is a logarithmic function, and p[ ][ ] indicates neighboring samples at a corresponding coordinate.

In an example, when the block being coded or the template used in TIMD is determined to be non-dyadic, the block is coded according to prediction sample values at a positions (x, y) (predSamples[x][y]) derived according to:

$$predV[\,x\,][\,y\,] =$$
$$\bigl((H-1-y)*p[\,x\,][-1] + (y+1)*p[-1][\,H\,] + H/2\bigr) \gg \log2(H),$$
$$predH[\,x\,][\,y\,] =$$
$$\bigl((W-1-x)*p[-1][\,y\,] + (x+1)*p[\,W\,][-1] + W/2\bigr)/W), \text{ and}$$
$$predSamples[\,x\,][\,y\,] = (\,predV[\,x\,][\,y\,] + predH[\,x\,][\,y\,] + 1) \gg 1,$$

Where H is a height of the template, W is a width of the template, (x, y) are sample coordinates, >> is a right shift operator, log 2 is a logarithmic function, and p[ ][ ] indicates neighboring samples at a corresponding coordinate.

In an example, when the block being coded or the template used in TIMD is determined to be non-dyadic, the block is coded according to prediction sample values at a positions (x, y) (predSamples[x][y]) derived according to:

$$predV[\,x\,][\,y\,] =$$
$$(((1 \ll \lfloor\log2(H)\rfloor) - 1 - y)*p[\,x\,][-1] + (y+1)*p[-1][\,H\,]) \ll$$
$$\lfloor\log2(W)\rfloor,$$
$$predH[\,x\,][\,y\,] =$$
$$(((1 \ll \lfloor\log2(W)\rfloor) - 1 - x)*p[-1][\,y\,] + (x+1)*p[\,W\,][-1]) \ll$$
$$\lfloor\log2(H)\rfloor, \text{ and}$$
$$predSamples[\,x\,][\,y\,] = (\,predV[\,x\,][\,y\,] + predH[\,x\,][\,y\,] +$$
$$(1 \ll \lfloor\log2(W)\rfloor)*((1 \ll \lfloor\log2(H)\rfloor)) \gg (\lfloor\log2(W)\rfloor + \lfloor\log2(H)\rfloor + 1),$$

Where H is a height of the template, W is a width of the template, (x, y) are sample coordinates, >> is a right shift operator, << is a left shift operators, log 2 is a logarithmic function, p[ ][ ] indicates neighboring samples at a corresponding coordinate, and $\lfloor\,\rfloor$ is a floor function.

In an example, when the block being coded or the template used in TIMD is determined to be non-dyadic, the block is coded according to prediction sample values at a positions (x, y) (predSamples[x][y]) derived according to:

$$predV[\,x\,][\,y\,] =$$
$$(((1 \ll \lceil\log2(H)\rceil) - 1 - y)*p[\,x\,][-1] + (y+1)*p[-1][\,H\,]) \ll$$
$$\lceil\log2(W)\rceil,$$
$$predH[\,x\,][\,y\,] =$$
$$(((1 \ll \lceil\log2(W)\rceil) - 1 - x)*p[-1][\,y\,] + (x+1)*p[\,W\,][-1]) \ll$$
$$\lceil\log2(H)\rceil, \text{ and}$$
$$predSamples[\,x\,][\,y\,] = (\,predV[\,x\,][\,y\,] + predH[\,x\,][\,y\,] +$$
$$(1 \ll \lceil\log2(W)\rceil)*((1 \ll \lceil\log2(H)\rceil)) \gg (\lceil\log2(W)\rceil + \lceil\log2(H)\rceil + 1),$$

Where H is a height of the template, W is a width of the template, (x, y) are sample coordinates, >> is a right shift operator, << is a left shift operators, log 2 is a logarithmic function, p[ ][ ] indicates neighboring samples at a corresponding coordinate, and $\lceil\,\rceil$ is a ceiling function.

It should be noted that the method 2700 can be implemented in an apparatus for processing video data comprising a processor and a non-transitory memory with instructions thereon, such as video encoder 2900, video decoder 3000, and/or encoder 3100. In such a case, the instructions upon execution by the processor, cause the processor to perform the method 2700. Further, the method 2700 can be performed by a non-transitory computer readable medium comprising a computer program product for use by a video coding device. The computer program product comprises computer executable instructions stored on the non-transitory computer readable medium such that when executed by a processor cause the video coding device to perform the method 2700.

Figure 28:
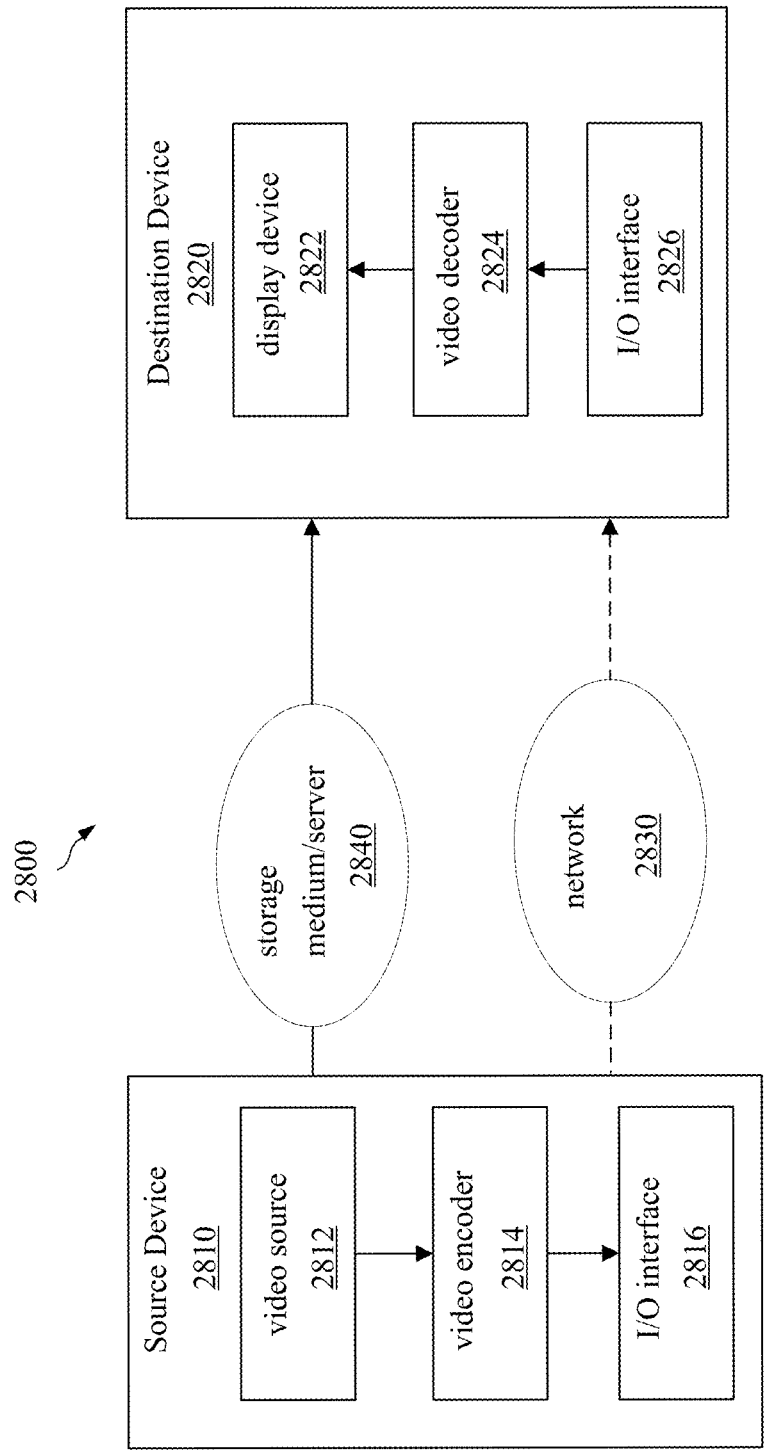
FIG. 28 is a block diagram that illustrates an example video coding system.

FIG. 28 is a block diagram that illustrates an example video coding system 2800 that may utilize the embodiments of this disclosure. As shown in FIG. 28, video coding system 2800 may include a source device 2810 and a destination device 2820. Source device 2810 generates encoded video data which may be referred to as a video encoding device. Destination device 2820 may decode the encoded video data generated by source device 2810 which may be referred to as a video decoding device.

Source device 2810 may include a video source 2812, a video encoder 2814, and an input/output (I/O) interface 2816. Video source 2812 may include a source such as a video capture device, an interface to receive video data from a video content provider, and/or a computer graphics system for generating video data, or a combination of such sources. The video data may comprise one or more pictures. Video encoder 2814 encodes the video data from video source 2812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2816 may include a modulator/demodulator (modem) and/or a transmitter. The encoded video data may be transmitted directly to destination device 2820 via I/O interface 2816 through network 2830. The encoded video data may also be stored onto a storage medium/server 2840 for access by destination device 2820.

Destination device 2820 may include an I/O interface 2826, a video decoder 2824, and a display device 2822. I/O interface 2826 may include a receiver and/or a modem. I/O interface 2826 may acquire encoded video data from the source device 2810 or the storage medium/server 2840. Video decoder 2824 may decode the encoded video data. Display device 2822 may display the decoded video data to a user. Display device 2822 may be integrated with the destination device 2820, or may be external to destination device 2820, which can be configured to interface with an external display device.

Video encoder 2814 and video decoder 2824 may operate according to a video compression standard, such as the HEVC standard, VVC standard, and other current and/or further standards.

Figure 29:
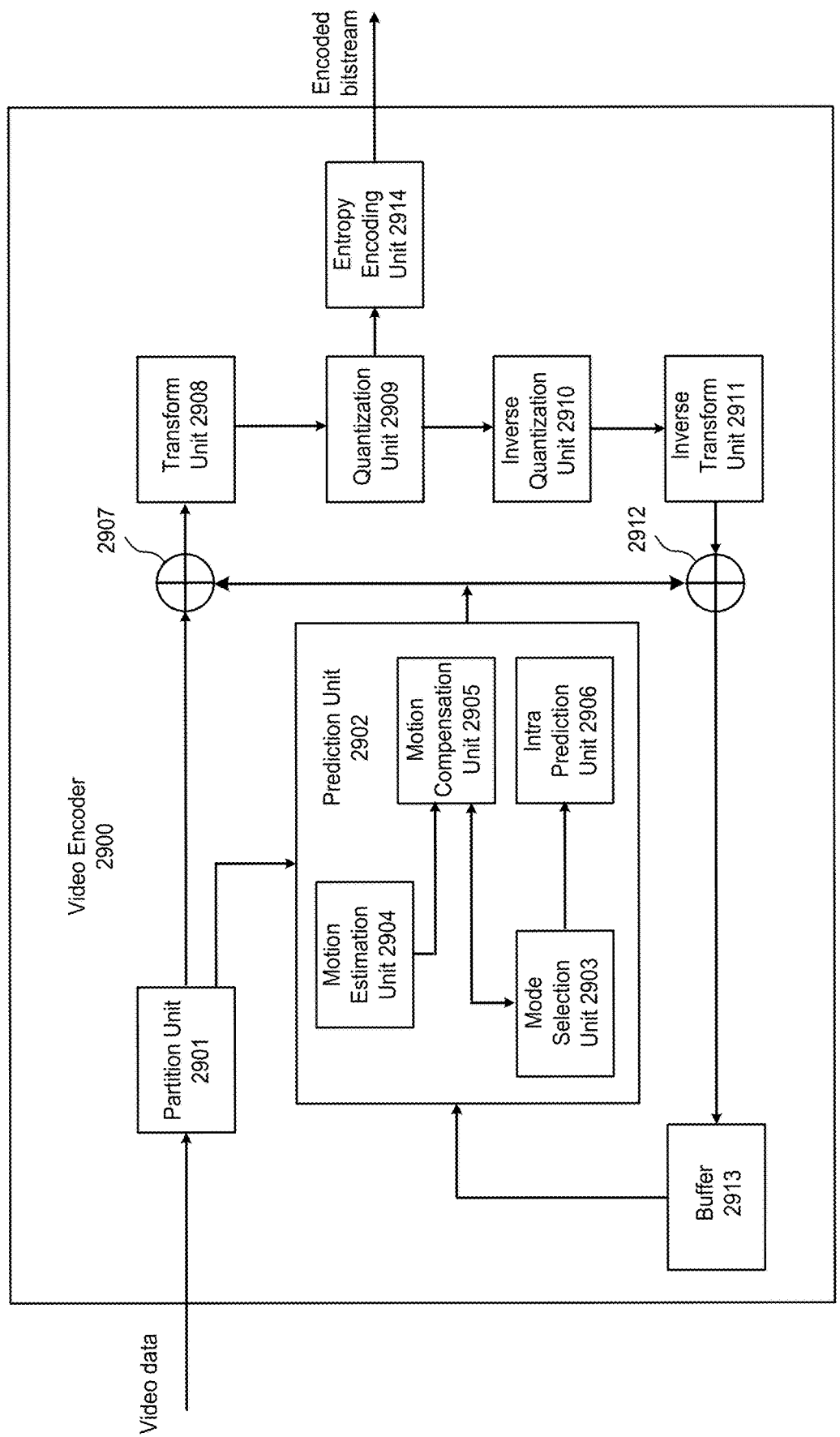
FIG. 29 is a block diagram that illustrates an example encoder.

FIG. 29 is a block diagram illustrating an example of video encoder 2900, which may be video encoder 2814 in the system 2800 illustrated in FIG. 28. Video encoder 2900 may be configured to perform any or all of the embodiments of this disclosure. In the example of FIG. 29, video encoder 2900 includes a plurality of functional components. The embodiments described in this disclosure may be shared among the various components of video encoder 2900. In some examples, a processor may be configured to perform any or all of the embodiments described in this disclosure.

The functional components of video encoder 2900 may include a partition unit 2901; a prediction unit 2902, which may include a mode selection unit 2903, a motion estimation unit 2904, a motion compensation unit 2905, and an intra prediction unit 2906; a residual generation unit 2907; a transform processing unit 2908; a quantization unit 2909; an inverse quantization unit 2910; an inverse transform unit 2911; a reconstruction unit 2912; a buffer 2913; and an entropy encoding unit 2914.

In other examples, video encoder 2900 may include more, fewer, or different functional components. In an example, prediction unit 2902 may include an intra block copy (IBC) unit. The IBC unit may perform prediction in an IBC mode in which at least one reference picture is a picture where the current video block is located.

Furthermore, some components, such as motion estimation unit 2904 and motion compensation unit 2905 may be highly integrated, but are represented in the example of FIG. 29 separately for purposes of explanation.

Partition unit 2901 may partition a picture into one or more video blocks. Video encoder 2900 and video decoder 3000 may support various video block sizes.

Mode selection unit 2903 may select one of the coding modes, intra or inter, e.g., based on error results, and provide the resulting intra or inter coded block to a residual generation unit 2907 to generate residual block data and to a reconstruction unit 2912 to reconstruct the encoded block for use as a reference picture. In some examples, mode selection unit 2903 may select a combination of intra and inter prediction (CIIP) mode in which the prediction is based on an inter prediction signal and an intra prediction signal. Mode selection unit 2903 may also select a resolution for a motion vector (e.g., a sub-pixel or integer pixel precision) for the block in the case of inter prediction.

To perform inter prediction on a current video block, motion estimation unit 2904 may generate motion information for the current video block by comparing one or more reference frames from buffer 2913 to the current video block. Motion compensation unit 2905 may determine a predicted video block for the current video block based on the motion information and decoded samples of pictures from buffer 2913 other than the picture associated with the current video block.

Motion estimation unit 2904 and motion compensation unit 2905 may perform different operations for a current video block, for example, depending on whether the current video block is in an I slice, a P slice, or a B slice.

In some examples, motion estimation unit 2904 may perform uni-directional prediction for the current video block, and motion estimation unit 2904 may search reference pictures of list 0 or list 1 for a reference video block for the current video block. Motion estimation unit 2904 may then generate a reference index that indicates the reference picture in list 0 or list 1 that contains the reference video block and a motion vector that indicates a spatial displacement between the current video block and the reference video block. Motion estimation unit 2904 may output the reference index, a prediction direction indicator, and the motion vector as the motion information of the current video block. Motion compensation unit 2905 may generate the predicted video block of the current block based on the reference video block indicated by the motion information of the current video block.

In other examples, motion estimation unit 2904 may perform bi-directional prediction for the current video block, motion estimation unit 2904 may search the reference pictures in list 0 for a reference video block for the current video block and may also search the reference pictures in list 1 for another reference video block for the current video block. Motion estimation unit 2904 may then generate reference indexes that indicate the reference pictures in list 0 and list 1 containing the reference video blocks and motion vectors that indicate spatial displacements between the reference video blocks and the current video block. Motion estimation unit 2904 may output the reference indexes and the motion vectors of the current video block as the motion information of the current video block. Motion compensation unit 2905 may generate the predicted video block of the current video block based on the reference video blocks indicated by the motion information of the current video block.

In some examples, motion estimation unit 2904 may output a full set of motion information for decoding processing of a decoder. In some examples, motion estimation unit 2904 may not output a full set of motion information for the current video. Rather, motion estimation unit 2904 may signal the motion information of the current video block with reference to the motion information of another video block. For example, motion estimation unit 2904 may determine that the motion information of the current video block is sufficiently similar to the motion information of a neighboring video block.

In one example, motion estimation unit 2904 may indicate, in a syntax structure associated with the current video block, a value that indicates to the video decoder 3000 that the current video block has the same motion information as another video block.

In another example, motion estimation unit 2904 may identify, in a syntax structure associated with the current video block, another video block and a motion vector difference (MVD). The motion vector difference indicates a difference between the motion vector of the current video block and the motion vector of the indicated video block. The video decoder 3000 may use the motion vector of the indicated video block and the motion vector difference to determine the motion vector of the current video block.

As discussed above, video encoder 2900 may predictively signal the motion vector. Two examples of predictive signaling techniques that may be implemented by video encoder 2900 include advanced motion vector prediction (AMVP) and merge mode signaling.

Intra prediction unit 2906 may perform intra prediction on the current video block. When intra prediction unit 2906 performs intra prediction on the current video block, intra prediction unit 2906 may generate prediction data for the current video block based on decoded samples of other video blocks in the same picture. The prediction data for the current video block may include a predicted video block and various syntax elements.

Residual generation unit 2907 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2907 may not perform the subtracting operation.

Transform processing unit 2908 may generate one or more transform coefficient video blocks for the current video block by applying one or more transforms to a residual video block associated with the current video block.

After transform processing unit 2908 generates a transform coefficient video block associated with the current video block, quantization unit 2909 may quantize the transform coefficient video block associated with the current video block based on one or more quantization parameter (QP) values associated with the current video block.

Inverse quantization unit 2910 and inverse transform unit 2911 may apply inverse quantization and inverse transforms to the transform coefficient video block, respectively, to reconstruct a residual video block from the transform coefficient video block. Reconstruction unit 2912 may add the reconstructed residual video block to corresponding samples from one or more predicted video blocks generated by the prediction unit 2902 to produce a reconstructed video block associated with the current block for storage in the buffer 2913.

After reconstruction unit 2912 reconstructs the video block, the loop filtering operation may be performed to reduce video blocking artifacts in the video block.

Entropy encoding unit 2914 may receive data from other functional components of the video encoder 2900. When entropy encoding unit 2914 receives the data, entropy encoding unit 2914 may perform one or more entropy encoding operations to generate entropy encoded data and output a bitstream that includes the entropy encoded data.

Figure 30:
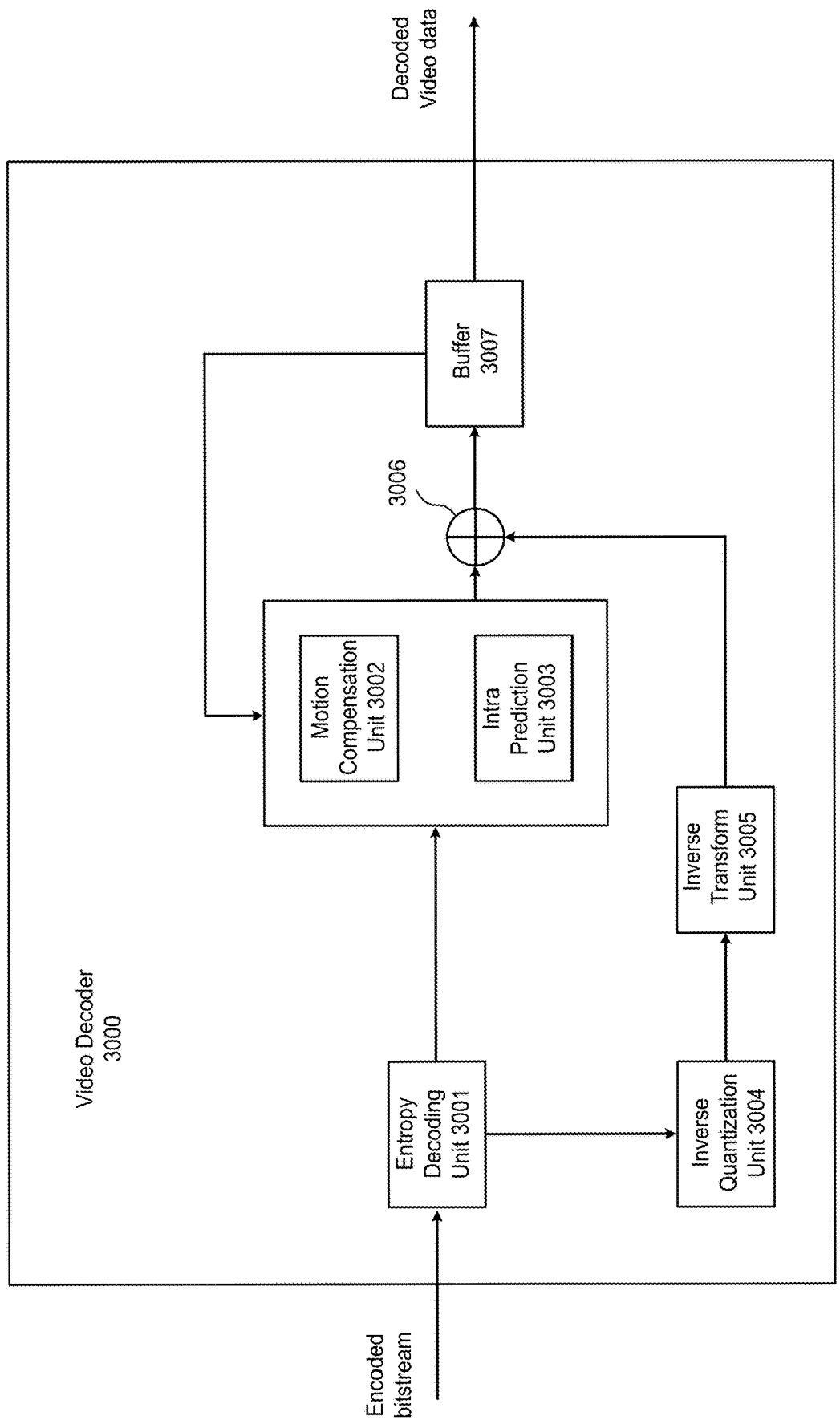
FIG. 30 is a block diagram that illustrates an example decoder.

FIG. 30 is a block diagram illustrating an example of video decoder 3000 which may be video decoder 2824 in the system 2800 illustrated in FIG. 28.

The video decoder 3000 may be configured to perform any or all of the embodiments of this disclosure. In the example of FIG. 30, the video decoder 3000 includes a plurality of functional components. The embodiments described in this disclosure may be shared among the various components of the video decoder 3000. In some examples, a processor may be configured to perform any or all of the embodiments described in this disclosure.

In the example of FIG. 30, video decoder 3000 includes an entropy decoding unit 3001, a motion compensation unit 3002, an intra prediction unit 3003, an inverse quantization unit 3004, an inverse transformation unit 3005, a reconstruction unit 3006, and a buffer 3007. Video decoder 3000 may, in some examples, perform a decoding pass generally reciprocal to the encoding pass described with respect to video encoder 2900 (FIG. 29).

Entropy decoding unit 3001 may retrieve an encoded bitstream. The encoded bitstream may include entropy coded video data (e.g., encoded blocks of video data). Entropy decoding unit 3001 may decode the entropy coded video data, and from the entropy decoded video data, motion compensation unit 3002 may determine motion information including motion vectors, motion vector precision, reference picture list indexes, and other motion information. Motion compensation unit 3002 may, for example, determine such information by performing the AMVP and merge mode.

Motion compensation unit 3002 may produce motion compensated blocks, possibly performing interpolation based on interpolation filters. Identifiers for interpolation filters to be used with sub-pixel precision may be included in the syntax elements.

Motion compensation unit 3002 may use interpolation filters as used by video encoder 2900 during encoding of the video block to calculate interpolated values for sub-integer pixels of a reference block. Motion compensation unit 3002 may determine the interpolation filters used by video encoder 2900 according to received syntax information and use the interpolation filters to produce predictive blocks.

Motion compensation unit 3002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 3003 may use intra prediction modes for example received in the bitstream to form a prediction block from spatially adjacent blocks. Inverse quantization unit 3004 inverse quantizes, i.e., de-quantizes, the quantized video block coefficients provided in the bitstream and decoded by entropy decoding unit 3001. Inverse transform unit 3005 applies an inverse transform.

Reconstruction unit 3006 may sum the residual blocks with the corresponding prediction blocks generated by motion compensation unit 3002 or intra prediction unit 3003 to form decoded blocks. If desired, a deblocking filter may also be applied to filter the decoded blocks in order to remove blockiness artifacts. The decoded video blocks are then stored in buffer 3007, which provides reference blocks for subsequent motion compensation/intra prediction and also produces decoded video for presentation on a display device.

Figure 31:
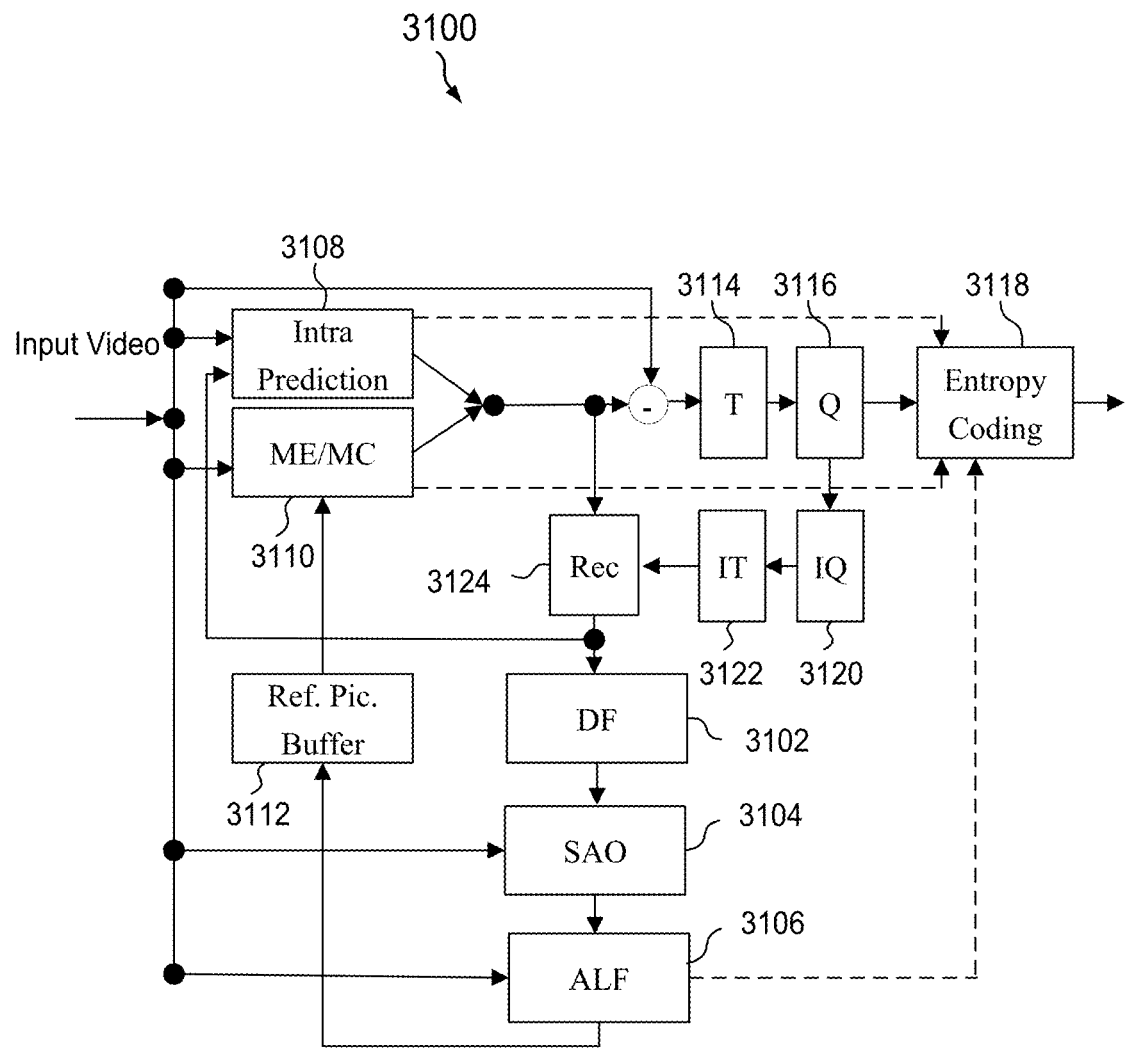
FIG. 31 is a schematic diagram of an example encoder.

FIG. 31 is a schematic diagram of an example encoder 3100. The encoder 3100 is suitable for implementing the techniques of VVC. The encoder 3100 includes three in-loop filters, namely a deblocking filter (DF) 3102, a sample adaptive offset (SAO) 3104, and an adaptive loop filter (ALF) 3106. Unlike the DF 3102, which uses predefined filters, the SAO 3104 and the ALF 3106 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 3106 is located at the last processing stage of each picture and can be regarded as a tool trying to catch and fix artifacts created by the previous stages.

The encoder 3100 further includes an intra prediction component 3108 and a motion estimation/compensation (ME/MC) component 3110 configured to receive input video. The intra prediction component 3108 is configured to perform intra prediction, while the ME/MC component 3110 is configured to utilize reference pictures obtained from a reference picture buffer 3112 to perform inter prediction. Residual blocks from inter prediction or intra prediction are fed into a transform (T) component 3114 and a quantization (Q) component 3116 to generate quantized residual transform coefficients, which are fed into an entropy coding component 3118. The entropy coding component 3118 entropy codes the prediction results and the quantized transform coefficients and transmits the same toward a video decoder (not shown). Quantization components output from the quantization component 3116 may be fed into an inverse quantization (IQ) components 3120, an inverse transform component 3122, and a reconstruction (REC) component 3124. The REC component 3124 is able to output images to the DF 3102, the SAO 3104, and the ALF 3106 for filtering prior to those images being stored in the reference picture buffer 3112.

A listing of solutions preferred by some examples is provided next.

The following solutions show examples of embodiments discussed herein.

1. A video processing method (e.g., method 2700 depicted in FIG. 27), comprising: determining, for a conversion between a block of a video and a bitstream of the video, whether or how a template based intra-coding is applied to the block based on a rule; and performing the conversion according to a result of the determining; wherein the rule is responsive to whether the block is dyadic.

2. The method of solution 1, wherein the rule specifies that the template based intra-coding is disabled responsive to the block being a non-dyadic block.

3. The method of any of solutions 1-2, wherein the rule further specifies whether a syntax element indicative of application of the template based intra-coding to the block is selectively indicated in the bitstream based on whether the block is dyadic.

4. The method of any of solutions 1-3, wherein the rule specifies that a prediction method or a cost of a template used for the template based intra-coding depend on whether the block is dyadic.

5. The method of solution 4, wherein the rule specifies that a width M' of an above template used to calculate the cost is different from a width M of the block, wherein M and M' are positive integers.

6. A video processing method, comprising: determining, for a conversion between a block of a video and a bitstream of the video, a feature D for a template based intra-coding and performing the conversion according to a result of the determining; wherein, the block has dimensions W pixels×H pixels, and wherein the feature D depends on whether the block is non-dyadic.

7. The method of solution 6, wherein D is a DC prediction value for a template for the template based intra-coding.

8. The method of solution 6, wherein D is a gradient value for a template for the template based intra-coding.

9. The method of any of solutions 6-8, wherein the rule specifies that responsive to the block being non-dyadic or a template used for the template based intra-coding being non-dyadic, D is derived using spatially consecutive multiple samples within the template.

10. The method of any of solutions 6-8, wherein the rule specifies that responsive to the block being non-dyadic or a template used for the template based intra-coding being non-dyadic, D is derived using pre-specified specific samples within the template.

11. A method of video processing, comprising: determining, for a conversion between a current block of a video and a bitstream of the video, that a characteristics of a wide-angle intra-prediction of the current block depends on whether the current block is dyadic or whether a template based intra-prediction is used for coding the current block according to a rule; and performing the conversion based on the determining.

12. The method of solution 11, wherein the rule specifies that the bitstream indicates a first intra coding mode and the wide-angle intra-prediction uses a second intra coding mode that is derived from the first intra coding mode due to the current block being non-dyadic with dimensions W×H, where W, H are positive integers.

13. The method of any of solutions 1-12, wherein, the block has a dimension of W×H, and unavailable samples neighboring to a template used for the template based intra prediction are determined responsive to whether W or H is dyadic.

14. A method of video processing, comprising: determining, for a conversion between a current block of a video having W×H dimension and a bitstream of the video, that unavailable neighboring samples for applying a cross-component linear prediction, CCLM, mode to a template used for the template based intra prediction are determined responsive to whether W or H is dyadic; and performing the conversion based on the determining.

15. The method of solution 14, wherein the cross-component prediction mode comprises a CCLM-left, or a CCLM-above or a Multi-Model CCLM.

16. A method of video processing, comprising: determining, for a conversion between a current block of a video having W×H dimension and a bitstream of the video, that unavailable neighboring samples for applying a planar intra prediction to a template used for the template based intra prediction are determined responsive to whether W or H is dyadic; and performing the conversion based on the determining.

17. The method of any of solutions 1-16, wherein the conversion includes generating the bitstream from the video.

18. The method of any of solutions 1-16, wherein the conversion includes generating the video from the bitstream.

19. A method of storing a bitstream on a computer-readable medium, comprising generating a bitstream according to a method recited in any one or more of solutions 1-18 and storing the bitstream on the computer-readable medium.

20. A computer-readable medium having a bitstream of a video stored thereon, the bitstream, when processed by a processor of a video decoder, causing the video decoder to generate the video, wherein the bitstream is generated according to a method recited in one or more of solutions 1-18.

21. A video decoding apparatus comprising a processor configured to implement a method recited in one or more of solutions 1 to 18.

22. A video encoding apparatus comprising a processor configured to implement a method recited in one or more of solutions 1 to 18.
23. A computer program product having computer code stored thereon, the code, when executed by a processor, causes the processor to implement a method recited in any of solutions 1 to 18.
24. A computer readable medium on which a bitstream complying to a bitstream format that is generated according to any of solutions 1 to 18.
25. A method, an apparatus, a bitstream generated according to a disclosed method or a system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
   performing a conversion between a video block of a video and a bitstream of the video according to a coding rule, wherein the video block is coded by an intra mode, and a dimension of the video block is W×H,
   wherein the coding rule specifies that whether a template-based intra mode derivation (TIMD) is applied for the video block is dependent on whether the video block is a non-dyadic block, wherein the video block is a non-dyadic block when at least one of W and H is a non-dyadic number.

2. The method of claim 1, wherein a syntax element associated with the TIMD is included in the bitstream when the video block is a dyadic block, wherein the video block is a dyadic block when both of W and H are non-dyadic numbers, and
   wherein the syntax element associated with the TIMD is not included in the bitstream when the video block is a non-dyadic block and the syntax element associated with the TIMD is inferred to be 0.

3. The method of claim 1, wherein the TIMD is applied for the video block, and wherein the method further comprises calculating a cost in the TIMD using an above template of the video block and using a left template of the video block, wherein a width (W') of the above template is equal to $2^{\lfloor log_2 W \rfloor}$ or $2^{\lceil log_2 W \rceil}$, and wherein a height (H') of the left template is equal to $2^{\lfloor log_2 H \rfloor}$ or $2^{\lceil log_2 H \rceil}$.

4. The method of claim 1, wherein a) a feature (D) of a template used in the TIMD is determined based on a reduced width (W1) or a reduced height (H1) when the video block is a non-dyadic block and the TIMD is applied for the video block, where W1 is less than W and H1 is less than H, and wherein the feature D is a direct current (DC) prediction value for the template;

b) the feature D of the template used in the TIMD is determined based on spatially consecutive multiple samples within the template when the video block is a non-dyadic block and the TIMD is applied for the video block, wherein the spatially consecutive multiple samples in a selected above row is starting from a same x-coordinate being equal to or greater than xCurr, and the spatially consecutive multiple samples in a selected left column is starting from a same y-coordinate being equal to yCurr, where xCurr is a horizontal coordinate of a top left sample of the video block, yCurr is a vertical coordinate of a top left sample of the video block; or c) the feature D of the template used in the TIMD is determined based on spatially consecutive multiple samples within the template when the video block is a non-dyadic block and the TIMD is applied for the video block, wherein a total number of samples to be used in the TIMD is a dyadic number, at least two of the samples in a selected above row are not located next to each other, and at least two of the samples in a selected left column are not located next to each other.

5. The method of claim 1, wherein when the video block is a non-dyadic block, a feature (D) of a template used in the TIMD is determined by:

$$D = \frac{P + Q + \text{offset}}{N},$$

wherein $$P = \sum_{k=0}^{W'-1} S(k + xCurr, yCurr - RefLy),$$

$$Q = \sum_{k=0}^{H'-1} S(xCurr - RefLx, yCurr + k), \text{ and}$$

$$N = W' + H'$$

where D is a DC prediction value, offset is an integer value, S indicates a sample value at a corresponding location, k is a sample index, xCurr is a horizontal coordinate of a top left sample of the video block, yCurr is a vertical coordinate of a top left sample of the video block, RefLy indicates a reference line row, RefLx indicates a reference line column, W' is a width associated with the video block, and H' is a height associated with the video block, and
wherein H' is a dyadic height smaller than H or W' is a dyadic width smaller than W.

6. The method of claim 1, wherein when the video block is a non-dyadic block, a feature (D) of a template used in the TIMD is determined based on a dyadic number of neighbor samples selected according to a step size function,
wherein if W is a non-dyadic number, S(k×F+xCurr+xOff, yCurr−RefLy) is used to calculate D, or if H is a non-dyadic number, S(xCurr−RefLx, k×F+yCurr+yOff) is used to calculate D, where F is a step size and k is an index for the samples to be used, xOff is an offset in an x direction, yOff is an offset in a y direction.

7. The method of claim 1, wherein the coding rule further specifies that the intra mode is adjusted depending on whether the video block is a non-dyadic block, wherein when the video block is a non-dyadic block, the bitstream includes a codeword indicating a wide angle intra prediction used to code the video block, and wherein the codeword indicates a signaled intra prediction (sigpredMode), which can be converted to a final wide angle intra prediction (finalpredMode).

8. The method of claim 7, wherein finalpredMode is a function of sigpredMode, a width W of the video block, and a height H of the video block,
wherein finalPredMode=SigpredMode in condition A, wherein condition A is that W is equal to H,
wherein finalPredMode=SigpredMode+M in condition B, wherein M is an integer, condition B is that W>H and sigpredMode is less than a threshold mode (ThresMode), and
wherein ThresMode is an angle equal to $$\operatorname*{argmin}_{\alpha}\{\tan\alpha \geq H/W\},$$

and angle equal to $$\operatorname*{argmax}_{\alpha}\{\tan\alpha \leq H/W\},$$

a number of intra prediction modes used in TIMD, a function of $\lfloor \log_2 W \rfloor$ and $\lfloor \log_2 H \rfloor$, a function of $\lceil \log_2 W \rceil$ and $\lceil \log_2 H \rceil$, or a combination thereof.

9. The method of claim 1, wherein when the video block is a non-dyadic block, the TIMD is applied for the video block, wherein a template used in the TIMD has a width of W and a height of H,
wherein a length of samples left of the template that are required in an intra-prediction process for the template is dependent on whether W and/or H is a dyadic number, and
wherein a length of samples above the template that are required in the intra-prediction process for the template is dependent on whether W and/or H is a dyadic number.

10. The method of claim 1, wherein when the video block is a non-dyadic block, the TIMD is applied for the video block, wherein a template used in the TIMD has a width of W and a height of H, and
wherein when the intra mode is a cross-component prediction mode, a length of samples left of the template that are required in a cross-component linear model (CCLM) is dependent on whether W and/or H is a dyadic number, and a length of samples above the template that are required in the CCLM is dependent on whether W and/or H is a dyadic number.

11. The method of claim 1, wherein when the video block is a non-dyadic block, the TIMD is applied for the video block,
wherein a template used in the TIMD has a width of W and a height of H, and
wherein when the intra mode is a planar intra-prediction mode, the planar intra-prediction mode is applied based on whether W and/or H is a dyadic number.

12. The method of claim 11, wherein if both W and H are dyadic numbers, the planar intra-prediction mode is applied by a first way in which no division operation is used in the planar intra-prediction mode, and if at least one of W and H is a non-dyadic number, the planar intra-prediction mode is applied by a second way in which at least one division operation is used in the planar intra-prediction mode,
wherein in the second way, a prediction sample value predSamples[x][y] at position (x, y) is derived by:

a) $predV[\ x\ ][\ y\ ] =$
$$\bigl((H-1-y)*p[\ x\ ][-1]+(y+1)*p[-1][\ H\ ]\bigr)*W,$$
$$predH[\ x\ ][\ y\ ] = \bigl((W-1-x)*p[-1][\ y\ ]+$$
$$(x+1)*p[\ W\ ][-1]\bigr)*H, \text{ and } predSamples[\ x\ ][\ y\ ] =$$
$$(\ predV[\ x\ ][\ y\ ]+predH[\ x\ ][\ y\ ]+W*H)/(W*H*2);$$

b) $predV[\ x\ ][\ y\ ] =$
$$\bigl((H-1-y)*p[\ x\ ][-1]+(y+1)*p[-1][\ H\ ]+H/2\bigr)/H,$$
$$predH[\ x\ ][\ y\ ] =$$
$$\bigl((W-1-x)*p[-1][\ y\ ]+(x+1)*p[\ W\ ][-1]+W/2/W,$$
$$predSamples[\ x\ ][\ y\ ] = (\ predV[\ x\ ][\ y\ ]+predH[\ x\ ][\ y\ ]+1) \gg 1;$$

c) $predV[\ x\ ][\ y\ ] =$
$$\bigl((H-1-y)*p[\ x\ ][-1]+(y+1)*p[-1][\ H\ ]+H/2\bigr)/H,$$
$$predH[\ x\ ][\ y\ ] =$$
$$\bigl((W-1-x)*p[-1][\ y\ ]+(x+1)*p[\ W\ ][-1]+W/2\ \bigr) \gg \log2(W),$$
$$predSamples[\ x\ ][\ y\ ] = (\ predV[\ x\ ][\ y\ ]+predH[\ x\ ][\ y\ ]+1) \gg 1; \text{ or}$$

d) $predV[\ x\ ][\ y\ ] =$
$$\bigl((H-1-y)*p[\ x\ ][-1]+(y+1)*p[-1][\ H\ ]+H/2\bigr) \gg \log2(H),$$
$$predH[\ x\ ][\ y\ ] =$$
$$\bigl((W-1-x)*p[-1][\ y\ ]+(x+1)*p[\ W\ ][-1]+W/2\ \bigr)/W,$$
$$predSamples[\ x\ ][\ y\ ] = (\ predV[\ x\ ][\ y\ ]+predH[\ x\ ][\ y\ ]+1) \gg 1,$$

where H is a height of the template, W is a width of the template, (x, y) are sample coordinates, and p[ ][ ] indicates neighboring samples at a corresponding coordinate.

13. The method of claim 1, wherein the conversion includes encoding the video block into the bitstream.

14. The method of claim 1, wherein the conversion includes decoding the video block from the bitstream.

15. An apparatus for processing video data comprising a processor and a non-transitory memory with instructions thereon, wherein the instructions upon execution by the processor, cause the processor to:
perform a conversion between a video block of a video and a bitstream of the video according to a coding rule, wherein the video block is coded by an intra mode, and a dimension of the video block is W×H,
wherein the coding rule specifies that whether a template-based intra mode derivation (TIMD) is applied for the video block is dependent on whether the video block is a non-dyadic block, wherein the video block is a non-dyadic block when at least one of W and H is a non-dyadic number.

16. The apparatus of claim 15, wherein a syntax element associated with the TIMD is included in the bitstream when the video block is a dyadic block, wherein the video block is a dyadic block when both of W and H are non-dyadic numbers, and wherein the syntax element associated with the TIMD is not included in the bitstream when the video block is a non-dyadic block and the syntax element associated with the TIMD is inferred to be 0.

17. The apparatus of claim 15, wherein the TIMD is applied for the video block, and wherein the instructions further cause the processor to calculate a cost in the TIMD using an above template of the video block and using a left template of the video block, wherein a width (W') of the above template is equal to $2^{\lfloor log_2 W \rfloor}$ or $2^{\lceil log_2 W \rceil}$, and wherein a height (H') of the left template is equal to $2^{\lfloor log_2 H \rfloor}$ or $2^{\lceil log_2 H \rceil}$.

18. The apparatus of claim 15, wherein a feature (D) of a template used in the TIMD is determined based on a reduced width (W1) or a reduced height (H1) when the video block is a non-dyadic block and the TIMD is applied for the video block, where W1 is less than W and H1 is less than H, and wherein the feature D is a direct current (DC) prediction value for the template.

19. A method for storing a bitstream of a video, comprising:

generating the bitstream of the video according to a coding rule, wherein a video block of the video is coded by an intra mode, and a dimension of the video block is W×H; and storing the bitstream in a non-transitory computer-readable recording medium, wherein the coding rule specifies that whether a template-based intra mode derivation (TIMD) is applied for the video block of the video is dependent on whether the video block is a non-dyadic block, wherein the video block is a non-dyadic block when at least one of W and H is a non-dyadic number.

20. The method of claim 19, wherein a syntax element associated with the TIMD is included in the bitstream when the video block is a dyadic block, wherein the video block is a dyadic block when both of W and H are non-dyadic numbers, and wherein the syntax element associated with the TIMD is not included in the bitstream when the video block is a non-dyadic block and the syntax element associated with the TIMD is inferred to be 0.

* * * * *